US012744997B2

(12) United States Patent
Nick et al.

(10) Patent No.: US 12,744,997 B2
(45) Date of Patent: Sep. 22, 2026

(54) METHODS FOR TRANSMITTING DATA VIA FREE SPACE SPATIOTEMPORAL PATTERNS IN A DATACENTER

(71) Applicant: Microsoft Technology Licensing, LLC, Redmond, WA (US)

(72) Inventors: Teresa A. Nick, Towson, MD (US); Winston Allen Saunders, Seattle, WA (US); Maria Leena Kyllikki Viitaniemi, Seattle, WA (US); Nicholas Andrew Keehn, Kirkland, WA (US); Eric C. Peterson, Woodinville, WA (US); Christian L. Belady, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 18/542,430

(22) Filed: Dec. 15, 2023

(65) Prior Publication Data

US 2024/0179402 A1 May 30, 2024

Related U.S. Application Data

(63) Continuation-in-part of application No. 18/072,527, filed on Nov. 30, 2022, and a continuation-in-part of (Continued)

(51) Int. Cl.

*H04B 10/114* (2013.01)
*G06F 3/14* (2006.01)

(Continued)

(52) U.S. Cl.

CPC .......... *H04N 23/66* (2023.01); *G06F 3/1423* (2013.01); *G06K 7/10722* (2013.01); *G06K 7/1417* (2013.01); *H04N 23/695* (2023.01)

(58) Field of Classification Search

CPC ........................... H04B 10/114; H04B 10/116
See application file for complete search history.

(56) References Cited

U.S. PATENT DOCUMENTS 10,171,165 B2 1/2019 Aoyama et al.
10,225,014 B2 3/2019 Oshima et al.

(Continued)

FOREIGN PATENT DOCUMENTS

WO WO2015/188948 A1 12/2015
WO 2017/119619 A1 7/2017
WO WO2018/110373 A1 6/2018

OTHER PUBLICATIONS

NPL_Hao-Yu Lan, et al.; "High-Speed Integrated Micro-LED Array for Visible Light Communication"; Optics Letters, vol. 45, No. 8; pp. 2203-2206; Apr. 15, 2020.

(Continued)

*Primary Examiner* — Shi K Li

(74) *Attorney, Agent, or Firm* — Ray Quinney & Nebeker P.C.; John O. Carpenter

(57) ABSTRACT

A system may include a first node having a first display device configured to display a first spatiotemporal pattern. A system may include a second node having a second display device configured to display a second spatiotemporal pattern. A system may include a camera. A system may include a means for selectively imaging one of the first spatiotemporal pattern and the second spatiotemporal pattern with the camera.

25 Claims, 31 Drawing Sheets

Related U.S. Application Data application No. 18/072,532, filed on Nov. 30, 2022, now Pat. No. 12,316,377.

(51) Int. Cl.

| | |
|---|---|
| ***G06K 7/10*** | (2006.01) |
| ***G06K 7/14*** | (2006.01) |
| ***H04N 23/66*** | (2023.01) |
| ***H04N 23/695*** | (2023.01) |

(56) References Cited

U.S. PATENT DOCUMENTS

| | | | | |
|---|---|---|---|---|
| 10,455,006 | B2 | 10/2019 | Aoyama et al. | |
| 2010/0110088 | A1 | 5/2010 | Lee | |
| 2012/0039605 | A1* | 2/2012 | Zhu | H04J 14/0232 398/58 |
| 2014/0205136 | A1 | 7/2014 | Oshima | |
| 2015/0104184 | A1* | 4/2015 | Jeffrey | H04L 9/3271 398/130 |
| 2016/0226585 | A1 | 8/2016 | Sibecas | |
| 2016/0294472 | A1* | 10/2016 | Palmer | H04B 7/0617 |
| 2018/0191437 | A1* | 7/2018 | Cha | H04B 10/116 |
| 2020/0287624 | A1 | 9/2020 | Darbi | |
| 2020/0359085 | A1* | 11/2020 | Tsutsui | H04B 7/0456 |
| 2020/0396377 | A1 | 12/2020 | Mondal | |
| 2023/0047142 | A1 | 2/2023 | Ooi | |
| 2023/0344515 | A1* | 10/2023 | Walker | H04B 10/1143 |
| 2024/0147785 | A1 | 5/2024 | Wang | |
| 2024/0176976 | A1 | 5/2024 | Saunders | |
| 2024/0178918 | A1 | 5/2024 | Saunders | |

OTHER PUBLICATIONS

NPL_International Search Report dated Feb. 8, 2024; PCT/US2023/35845 filed Oct. 25, 2023.

NPL_Kun Xie, et al.; "Real-Time Streaming Communication with Optical Codes"; IEEE Access, vol. 4; pp. 284-298; Jan. 4, 2016.

NPL_Monia Ghobadi, et al.; "ProjecToR: Agile Reconfigurable Data Center Interconnect"; Proceedings of the 2016 ACM SIGCOMM Conference; pp. 216-229; Aug. 22, 2016.

NPL_Srikanth Kandula, et al.; "Flyways to De-Congest Data Center Networks"; ACM Workshop on Hot Topics in Networks; pp. 1-6; Aug. 1, 2009.

U.S. Appl. No. 18/072,527, filed Nov. 30, 2022.

U.S. Appl. No. 18/072,532, filed Nov. 30, 2022.

Final Office Action mailed on Oct. 4, 2024, in U.S. Appl. No. 18/072,532, 9 pages.

Hamza, et al., "Wireless Communication in Data Centers: A Survey", IEEE Communications Surveys & Tutorials, vol. 18, Issue No. 03, 2016, pp. 1572-1595.

International Preliminary Report on Patentability received for PCT Application No. PCT/US2023/035843, mailed on Jun. 12, 2025, 08 pages.

International Preliminary Report On Patentability received for PCT Application No. PCT/US2023/035845, mailed on Jun. 12, 2025, 08 pages.

International Search Report and Written Opinion received for PCT Application No. PCT/US2023/035843, Feb. 5, 2024, 12 pages.

Non-Final Office Action mailed on Jul. 3, 2025, in U.S. Appl. No. 18/072,527 13 Pages.

Hao-Yu Lan, et al.; "High-Speed Integrated Micro-LED Array for Visible Light Communication"; Optics Letters, vol. 45, No. 8; pp. 2203-2206; Apr. 15, 2020.

International Search Report dated Feb. 8, 2024; PCT/US2023/35845 filed Oct. 25, 2023, 9 pages.

Kun Xie, et al.; "Real-Time Streaming Communication with Optical Codes"; IEEE Access, vol. 4; pp. 284-298; Jan. 4, 2016.

Monia Ghobadi, et al.; "ProjecToR: Agile Reconfigurable Data Center Interconnect"; Proceedings of the 2016 ACM SIGCOMM Conference; pp. 216-229; Aug. 22, 2016.

Srikanth Kandula, et al.; "Flyways to De-Congest Data Center Networks"; ACM Workshop on Hot Topics in Networks; pp. 1-6; Aug. 1, 2009.

Non-Final Office Action issued in U.S. Appl. No. 18/072,532, mailed on Jun. 17, 2024, 9 Pages.

Final Office Action mailed on Oct. 27, 2025, in U.S. Appl. No. 18/072,527, 08 pages.

Notice of Allowance mailed on Jan. 29, 2025, in U.S. Appl. No. 18/072,532, 05 Pages.

Notice of Allowance mailed on Feb. 25, 2026, in U.S. Appl. No. 18/072,527, 07 pages.

Notice of Allowance mailed on Mar. 31, 2026, in U.S. Appl. No. 18/072,527, 05 pages.

* cited by examiner

614 t = 0 t = 1 t = 0 t = 1 t = 2 t = 0 t = 1 t = 2 t = 0 t = 1 t = 2 t = 3

METHODS FOR TRANSMITTING DATA VIA FREE SPACE SPATIOTEMPORAL PATTERNS IN A DATACENTER

CROSS-REFERENCE TO RELATED APPLICATIONS

This application is 1) a continuation-in-part of U.S. patent application Ser. No. 18/072,527, filed Nov. 30, 2022, and 2) a continuation-in-part of U.S. patent application Ser. No. 18/072,532, filed Nov. 30, 2022, which are hereby incorporated by reference in their entireties.

BACKGROUND

Datacenters typically include routers, switches, bridges, and other physical network devices that interconnect a large number of servers, network storage devices, and other types of computing devices. Typically, the different physical network devices transmit data to other physical network devices through a cable or fiber connection.

BRIEF SUMMARY

In some aspects, the techniques described herein relate to a datacenter computing system including: a first node having a first display device configured to display a first spatiotemporal pattern; a second node having a second display device configured to display a second spatiotemporal pattern; a camera; and a means for selectively imaging one of the first spatiotemporal pattern and the second spatiotemporal pattern with the camera.

In some aspects, the techniques described herein relate to a datacenter computing system including: a display device configured to display a first spatiotemporal pattern with a first display duration and a second spatiotemporal pattern after the first spatiotemporal pattern with a second display duration; a first camera; a second camera; and a synchronization controller in data communication with the display device and with the first camera and second camera, wherein the synchronization controller is configured to: instruct the first camera to capture the first spatiotemporal pattern during the first display duration, and instruct the second camera to capture the second spatiotemporal pattern during the second display duration.

In some aspects, the techniques described herein relate to a datacenter computing system including: an outer cylinder including: a first plurality of processors, a first plurality of display devices, and a first plurality of cameras; and an inner cylinder including: a second plurality of display devices, and a second plurality of cameras.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIGS. 29-1 and 29-2 illustrate temporal multiplexing of spatiotemporal patterns.

FIGS. 30-1 and 30-2 illustrate reconfiguration of a spatiotemporal communication network.

DETAILED DESCRIPTION

Figure 1A:
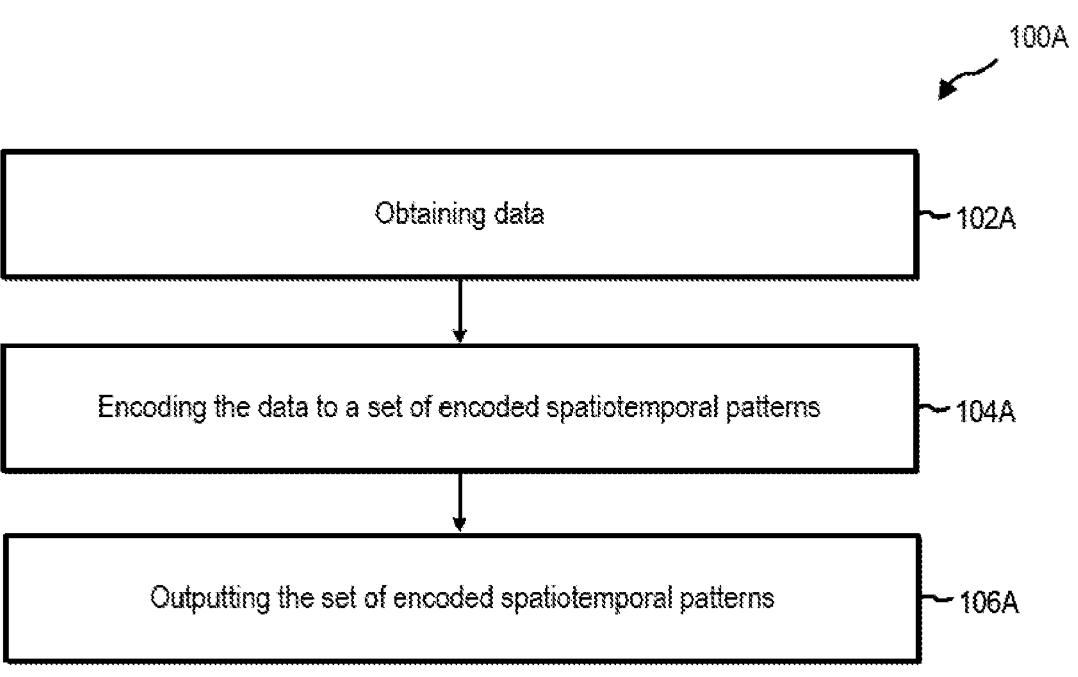
FIGS. 1A-1E are flowcharts illustrating a method of encoding data in a datacenter.

This disclosure generally relates to data transmission in a datacenter. A datacenter typically contains physical computer nodes, servers, routers, switches, storage devices, security elements such as firewalls, and cabling between these elements. A node can host one or more virtual machines to provide web searching, website hosting, system updates, application development and testing, or other suitable computing services to users.

One of the biggest problems in a datacenter space is network congestion. Fiber has certain fixed bandwidth restrictions and hence cable connections are usually designed to provide high enough total bandwidth to match the maximum data throughput. However, not all the connections are needed all the time, and not all servers are sending or receiving data at the maximum rate, wasting some of the resources. On the other hand, if a connection is designed for less than the maximum data throughput, the connection could not handle a data burst (e.g., a high-bandwidth transmission over a short period of time) that requires the maximum data throughput. Internet traffic can be especially bursty, flooding a network and throttling communications between nodes. While there are central controllers in the form of routers and compute cluster software-based resource managers, these are no match for a flood of internet traffic because at least some of which may not control packet transmission at the source (e.g., at the nodes) without compounding the traffic jam with their own signals.

Furthermore, as networks become more interconnected, more fiber is needed. Fiber connections have other problems as well. If a fiber becomes faulty, detecting the issue and then finding the faulty cable and replacing it requires time and effort. Furthermore, when network configurations change, rewiring the datacenter can take several weeks.

Furthermore, the Open System Interconnection (OSI) model provides the common basis for network interconnectivity. It also inserts up to twelve physical or software component layers between applications. Data passage through this framework requires time-consuming serialization and deserialization of data. In addition, multiple touchpoints provide opportunities for data corruption, theft, and throttling. An adaptable and constantly dynamic communication channel is therefore needed, that simplifies data transmission and where the bandwidth may be adapted based on requirements. At least one embodiment described herein, may provide an adaptable and/or dynamic communication channel that simplifies data transmission such that the bandwidth may be adapted based on requirements. At least one embodiment described herein, may provide faster and more power efficient data transfer than a fiber connection as refresh rates and/or resolution in displays and projectors improve.

FIGS. 1A-1D include flowcharts illustrating methods 100A, 100B, 100C, 100D of encoding data in a datacenter, which are simultaneously described for ease of description. The methods 100A, 100B, 100C, 100D include obtaining data to be encoded at stage 102A, 102B, 102C, 102D. The data may be of a particular data type. For example, the data type can be numeric, alphanumeric, binary, kanji, any other type of data, or combinations thereof. In some embodiments, obtaining data to be encoded may include obtaining the data from a first sending node, as further discussed in connection to FIGS. 3A-3B. In some embodiments, the data includes data and header information. For example, it may include one or more of data, destination information, sender information, timing, error correction code, and any other information typically stored in a packet header. In some embodiments, the data includes only the data without any header information.

In some embodiments, a sending node may be a server including virtual machines that provides web searching, website hosting, system updates, application development and testing, or other suitable computing services to users. In some embodiments, one or more applications may reside on the node. For example, the application may be a word processor, a media player, an email application, an accounting software, any other type of application that is designed to carry out specific tasks, or combinations thereof.

In some embodiments, obtaining data may include obtaining data from a storage device residing at the first sending node. For example, a storage device may include an HDD, SSD, optical storage devices, any other type of non-volatile storage device for storing data for long- or short-term retention, or combinations thereof. In some embodiments, obtaining data may include obtaining data from a memory device residing at the first sending node. For example, a memory device may be a ROM, RAM, DRAM, SRAM, or other suitable volatile memory device for storing data temporarily.

Figure 1B:
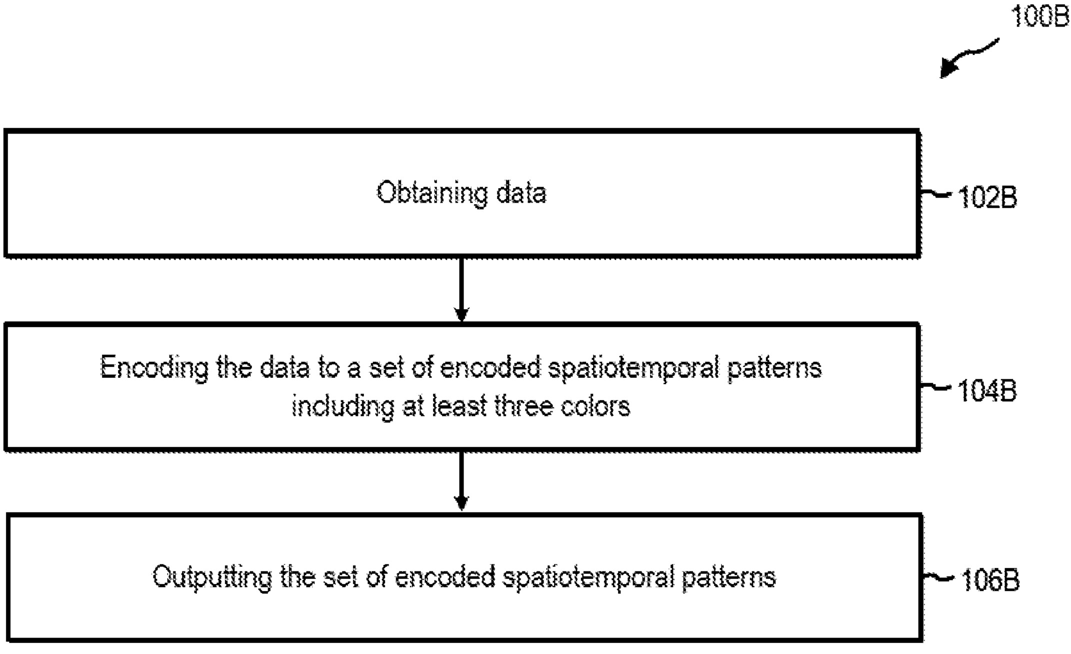
Figure 1C:
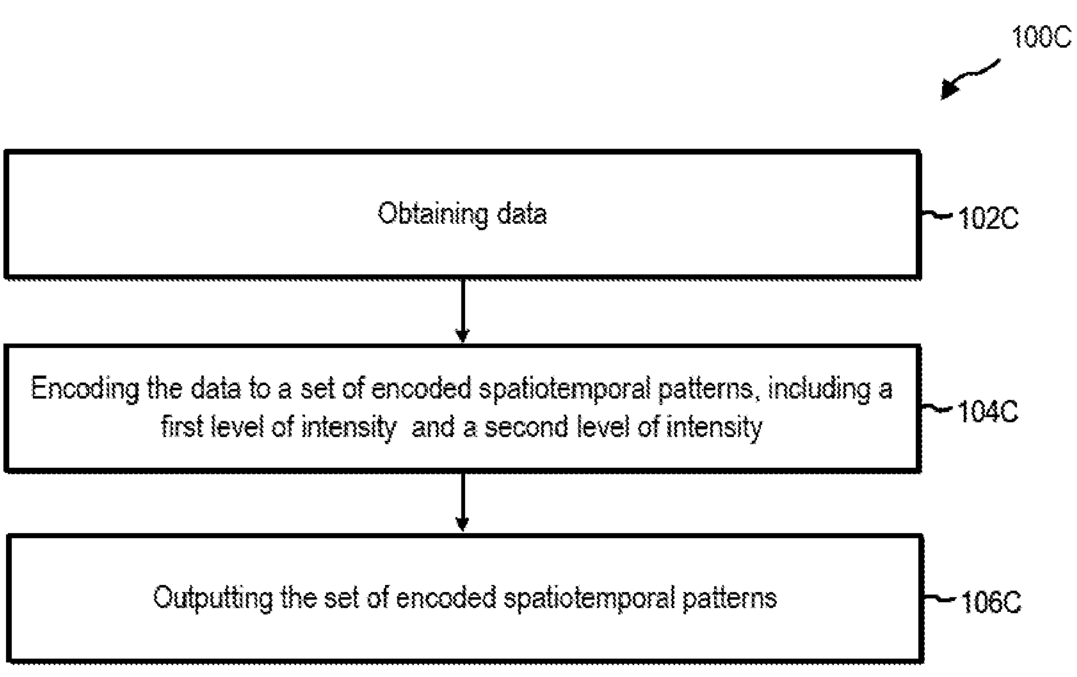
Figure 1D:
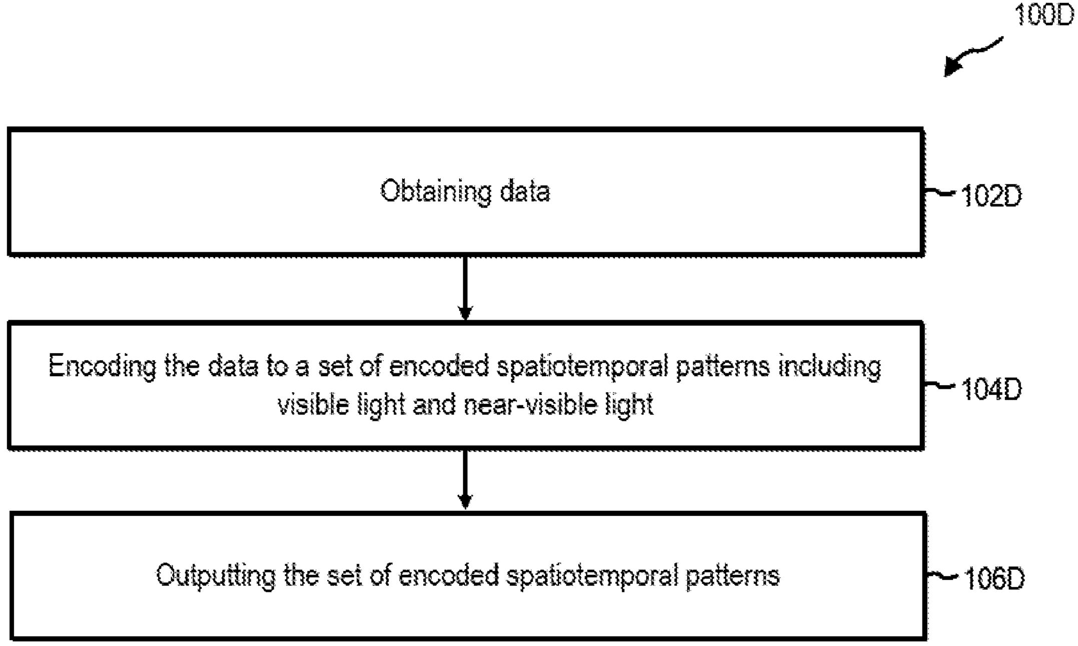
Figure 1E:
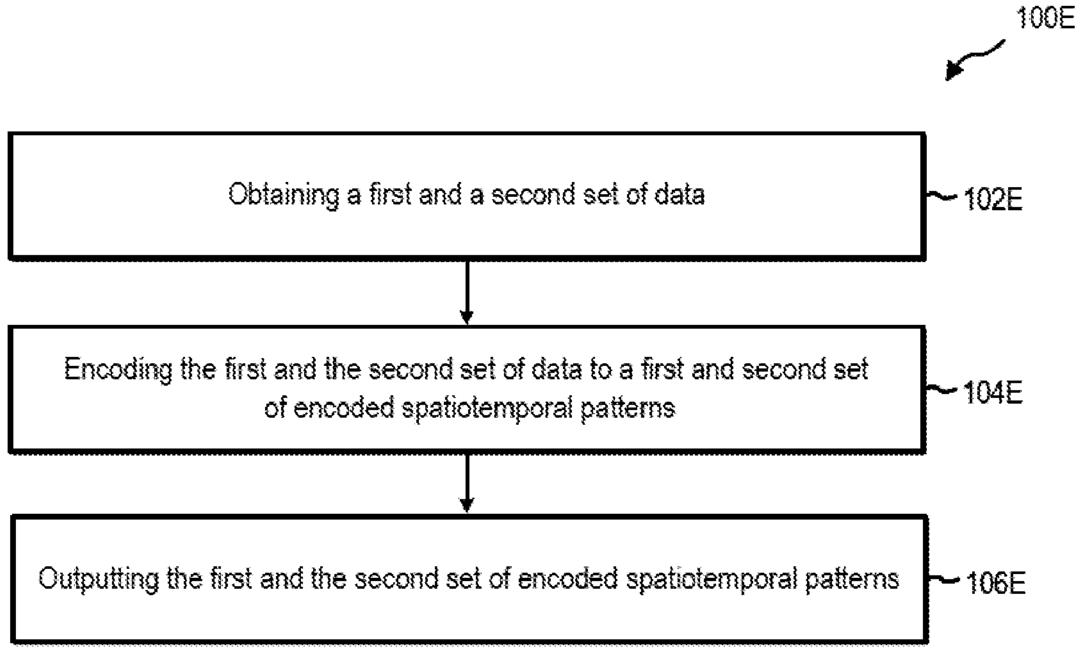

FIG. 1E is a flowchart illustrating a method 100E of encoding data in a datacenter. As shown in FIG. 1E, the method 100E includes obtaining a first set of data and a second set of data to be encoded at stage 102E. In some embodiments, a first set of data and a second set of data may be obtained from a first sending node, as further discussed in connection with FIG. 21. In some embodiments, obtaining two different sets of data includes obtaining a first set of data from a first sending node and obtaining a second set of data from a second sending node, as further discussed in connection with FIG. 22.

The method 100A includes encoding the data to a set of encoded spatiotemporal patterns at stage 104A. A spatiotemporal pattern may be a pattern observed in both space and time. In some embodiments, the spatiotemporal pattern may be formed of visible light. For example, a light having a wavelength from 400 to 700 nanometers. In some embodiments, the spatiotemporal pattern may be formed of near-visible light. For example, a light having a wavelength from 780 nanometers to 1 mm (Infrared) or a light having a wavelength from 100 to 400 nanometers (ultraviolet). In some embodiments, the spatiotemporal pattern may be formed of other spatial signals, also referred as non-visible signals. For example, non-visible spatial signals produced as spatiotemporal patterns may be formed by electromagnetic waves, microwaves, and/or sound waves. In some embodiments, the set of encoded spatiotemporal pattern includes only one spatiotemporal pattern. In some embodiments, the set of encoded spatiotemporal pattern includes two or more patterns.

The set of encoded spatiotemporal patterns may include one or more spatiotemporal patterns. In some embodiments, each spatiotemporal pattern in the set of encoded spatiotemporal patterns is a data packet, wherein each spatiotemporal pattern is transmitted in a sequence.

Encoding the data to a set of encoded spatiotemporal patterns may include encoding a first and second set of data to a first set and a second set of encoded spatiotemporal patterns (as shown in FIG. 1E at stage 104E) and/or the encoded spatiotemporal patterns may include at least three colors (as shown in FIG. 1B at stage 104B), a first level of intensity and a second level of intensity (as shown in FIG. 1C at stage 104C), visible and near-visible light (as shown in FIG. 1D at stage 104D), or combinations thereof. In some embodiments, the set (or first and second set) of encoded spatiotemporal patterns include two colors. In some embodiments, the set (or first and second set) of encoded spatiotemporal patterns include one color.

In some embodiments, the data is not serialized before it is encoded, instead the data can be sent as non-serialized data in a matrix form. One possible benefit of transmitting non-serialized data is that there is no need to go through multiple physical or software component layers between applications, saving time on serialization, deserialization, and data transmission. Another possible benefit of transmitting non-serialized data is that data corruption, data theft, data throttling, other possibilities, or combinations thereof may be minimized.

In some embodiments, encoding to a set of encoded spatiotemporal patterns includes encoding the data into code symbols. The code symbols may be organized into the encoded spatiotemporal patterns. For example, an encoded spatiotemporal pattern may include 7×7 code symbols, as further discussed in connection with FIG. 5. In another example, an encoded spatiotemporal pattern may include 6×9 code symbols, as further discussed in connection with FIG. 11. In a further example, an encoded spatiotemporal pattern may be otherwise organized, including encoding into shapes that do not have straight edges or typical geometric shapes.

In some embodiments, encoding the data into a code symbol may further include a step of encoding the data into a bit stream and further encoding the bit stream into code symbols. A bit stream typically includes one or more bits that may have a value of, for example, 1 or 0.

In some embodiments, spatiotemporal patterns may include one or more colors. In some embodiments, the spatiotemporal patterns may include one or more colors producible by visible light (e.g., light having a wavelength from 400 to 700 nanometers). In some embodiments, a first color may be a color 'ON', and a second color may be a color 'OFF'. For example, in a two-color system, the first color may be white (color 'ON'), and the second color may be black (color 'OFF'). In another example, in a two-color system, the first color may be red (color 'ON') and the second color may be green (color 'ON'). In yet another example, in a three-color system, the first color may be green ('color 'ON'), the second color may be red (color 'ON'), and the third color may be black (color 'OFF'). In yet another example, in a three-color system, the first color may be blue (color 'ON'), the second color may be red (color 'ON'), and the third color may be green (color 'ON'). In some embodiments where the set of encoded spatiotemporal pattern includes at least three colors, at least two of the at least three colors are used for encoding the data. For example, at least two of the at least three colors provide values (such as 1 and 0) that are encodable by the encoder for encoding the data.

In some embodiments where the set of encoded spatiotemporal patterns include at least three colors, all three or more colors may be used for encoding the data. For example, instead of using a typical two-bit encoding system (1 and 0), the system could use three or more bit-indicators, where each color represents a unique bit (such as a three-color system or a four-color system when using three or four bit-indicators, respectively). In at least one embodiment, where at least three different colors are used for encoding data, one possible benefit of using higher than two-bit encoding allows data to be encoded more efficiently and outputting the encoded data more rapidly than with a two-bit encoding system. Another possible benefit of using three or more colors is to provide flexibility on bandwidth, as the more colors used provides higher bandwidth for the data transmission.

In some embodiments where the set of encoded spatiotemporal patterns includes a first intensity level and a second intensity level, the two different intensity levels are used for encoding the data. For example, the first level of intensity and the second level of intensity provide values (such as 1 and 0) that are encodable by the encoder for encoding the data. For example, the set of encoded spatiotemporal patterns may include a red color in a first intensity level, having a value of 1, and a red color in a second intensity level, having a value of 0, as further discussed in connection to FIG. 7. One possible benefit of using two or more levels of intensity is to provide flexibility on bandwidth, as using two or more levels of intensity provides higher bandwidth for the data transmission.

In some embodiments, where the set of encoded spatiotemporal patterns includes a first intensity level and a second intensity level and at least two colors, the two colors are used for encoding the data. For example, a first color and a second color provide values (such as 1 and 0 in a two- or more-bit system) that are encodable by the encoder for encoding the data. For example, the set of encoded spatiotemporal patterns may include a red color having a value of 1, and a blue color having a value of 0, as further discussed in connection to FIG. 8.

In some embodiments, where the set of encoded spatiotemporal patterns includes both visible and near-visible light, at least two colors are used for encoding the data and the near-visible light is used as header information. For example, a first color and a second color provide values (such as 1 and 0) that are encodable by the encoder for encoding the data. For example, the set of encoded spatiotemporal patterns may include white color having a of value 1, and black color having a value of 0, as further discussed in connection to FIG. 10.

In some embodiments where the set of encoded spatiotemporal patterns includes at least three colors, at least one of the at least three colors is used for providing header information without the need to include the header information in the encoded data itself, and at least two of the at least three different colors are used for encoding the data. For example, header information may include the recipient for the data, the sender of the data, routing information, priority level information, any other header information, or combinations thereof. In some embodiments where the set of encoded spatiotemporal patterns includes at least three colors, at least one of the at least three colors may include header information indicating the intended recipient for the data, as further discussed in connection to FIG. 5. One possible advantage of using a color to identify the intended recipient is that it provides a much faster way for the receiving node to decide if the data is meant for it or if it can ignore at least a portion of the data without the need for decoding the set of encoded spatiotemporal patterns to read the header information in the data. In some embodiments, at least one of the at least three colors may include header information indicating a level of priority for the data, as further discussed in connection to FIG. 5.

In some embodiments where the set of encoded spatiotemporal patterns include a first level of intensity and a second level of intensity, at least one intensity level is used for providing header information without the need to include the header information in the encoded data itself, and at least two colors are used for encoding the data. In some embodiments where the set of encoded spatiotemporal patterns include a first level of intensity and a second level of intensity, at least one color is used for providing header information without the need to include the header information in the encoded data itself, and the first level of intensity and the second level of intensity are used for encoding the data. For example, header information may include the recipient for the data, the sender of the data, routing information, priority level information, any other header information, or combinations thereof.

Although the header information may indicate a requirement for a use of a header, the claims are not limited to such a use. In some embodiments, the set of encoded spatiotemporal patterns do not include header information. In some embodiments, the data to be encoded does not include a header but does include header information.

In some embodiments, at least one of the code symbols in an encoded spatiotemporal pattern may include a different level of intensity than another code symbol. For example, the different level of intensity may include header information that indicates the intended recipient of at least a portion of the data, as further discussed in connection to FIG. 6. In some embodiments, the different level of intensity may include header information that indicates a level of priority for the data, as further discussed in connection to FIG. 6.

In some embodiments, the spatiotemporal patterns may further include near-visible light patterns, such as infrared (IR) light (e.g., light having a wavelength from 780 nanometers to 1 millimeter), or ultraviolet (UV) light (e.g., light having a wavelength from 100 to 400 nanometers). In some embodiments, the use of near-visible light may indicate the intended recipient for the encoded data, as further discussed in connection to FIG. 9. In some embodiments, the use of near-visible light may indicate the level of priority for the data, as further discussed in connection to FIG. 9. In some embodiments, the near-visible light may be used for encoding the data.

In some embodiments, the encoded spatiotemporal pattern may include a shape factor. For example, the shape factor may indicate the intended recipient for the data, as further discussed in connection to FIG. 11. In another example, the shape factor may indicate the level of priority for the data, as further discussed in connection to FIG. 11. In a further example, the shape factor may be used for encoding the data.

In some embodiments, the encoded spatiotemporal pattern may include a location factor. For example, the location factor may indicate the intended recipient for the data, as further discussed in connection to FIG. 11. In another example, the location factor may indicate the level of priority for the data, as further discussed in connection to FIG. 11. In some embodiments, the encoded spatiotemporal pattern may include a size factor, as further discussed in connection with FIG. 13. In a further example, the size factor may be used for encoding the data. One possible benefit of using a different size of spatiotemporal pattern is to provide flexibility on bandwidth, as using a bigger size spatiotemporal pattern provides higher bandwidth for the data transmission.

In some embodiments, the encoded spatiotemporal pattern may include a timing factor, as further discussed in connection with FIGS. 12A-12B. For example, the timing factor may indicate the intended recipient for the data, as further discussed in connection to FIGS. 12A-12B. In some embodiments, the encoded spatiotemporal patterns may move in space relative to time, as further discussed in connection with FIG. 17A-17C.

The methods 100A-100D include outputting the set of encoded spatiotemporal patterns at stage 106A-106D. The method 100E includes outputting the first and the second set of encoded spatiotemporal patterns at stage 106E. In some embodiments, outputting the set (or the first and the second set for FIG. 1E) of encoded spatiotemporal patterns further includes displaying the outputted set of encoded spatiotemporal patterns.

In some embodiments, the set of encoded spatiotemporal patterns may be displayed by at least one display device able to display, reflect, or pass and reflect light. For example, a display device able to reflect light may include a projector screen, and a display device able to pass and reflect light may include a rear projecting screen. Furthermore, a display device able to display light may include a computer screen, a TV monitor, or any other display device able to display light. In some embodiments, the set of encoded spatiotemporal patterns may be displayed by a display device that is not optimized for human vision. For example, as technology improves, spatiotemporal patterns may be displayed by a display device capable of displaying microwaves, infrared, ultraviolet, x-rays, gamma rays or any other wavelengths in the electromagnetic spectrum.

One limit of a display device able to display or projector able to project is the device refresh rate. A typical TV refresh rate is between 60-120 Hz, while a projector may reach 120-240 Hz. Gaming monitors typically need to have a high refresh rate, some reaching 360 Hz. Currently, the highest non-commercially available known experimental monitor has a refresh rate of 10 kHz, but it is expected that these rates will increase in the future, as technology improves. One possible advantage of having a higher refresh rate on at least one embodiment of a display device is that more data may be output faster and may therefore increase the bandwidth of the communication channel.

In some embodiments, outputting the set of encoded spatiotemporal patterns further include displaying at least a portion of the set of encoded patterns to a display device with a two-way screen. A two-way screen, such as a projector screen, enables information transmission both away from the sending projector and the sending node, and back at the sending node and the associated obtaining device as further discussed in connection to FIG. 4. In some embodiments, the two-way screen may include a pair of one-way screens facing opposite (or substantially opposite) directions. One possible advantage of using two-way screens is that it enables the sending node to verify that the data transmission was sent successfully (e.g., without any corruption, overlap with other transmission, or any other aberrations). In some embodiments, a sending node may observe from the two-way screen that there is extra bandwidth available in the form of blank screen space and expand its transmission size to increase the transmission rate.

In some embodiments, the projector screen is a rear projection screen, wherein the projected image is viewable on both sides of the screen. The rear projector screen can both reflect the light and pass the light. The reflection of the light occurs on the same side of the screen where the projector is located, whereas when the screen passes the light, the image is viewable on the opposite side of the screen. This increases the receiving node pool. One possible advantage of using rear projection screens is that it enables the sending node to verify that the data transmission was sent successfully (e.g., without any corruption, overlap with other transmission, or any other aberrations). Another possible advantage of using rear projection screen is that it may enable a larger pool of sending nodes and receiving nodes to send and receive data. For example, data may be transmitted from the sending node to a receiving node, wherein the receiving node may be anywhere behind, adjacent, or in front of the sending node. In some embodiments, a sending node may observe from the rear projection screen that there is extra bandwidth available in the form of blank screen space and expand its transmission size to increase the transmission rate.

In some embodiments, outputting the set of encoded spatiotemporal patterns further includes displaying the outputted set of encoded spatiotemporal patterns on two or more display devices, as further discussed in connection with FIGS. 3A-3B.

In some embodiments, two or more sets of encoded spatiotemporal patterns are outputted. In some embodiments, the two or more sets of encoded spatiotemporal patterns overlap at least partially, as further discussed in connection with FIG. 15.

Figure 2A:
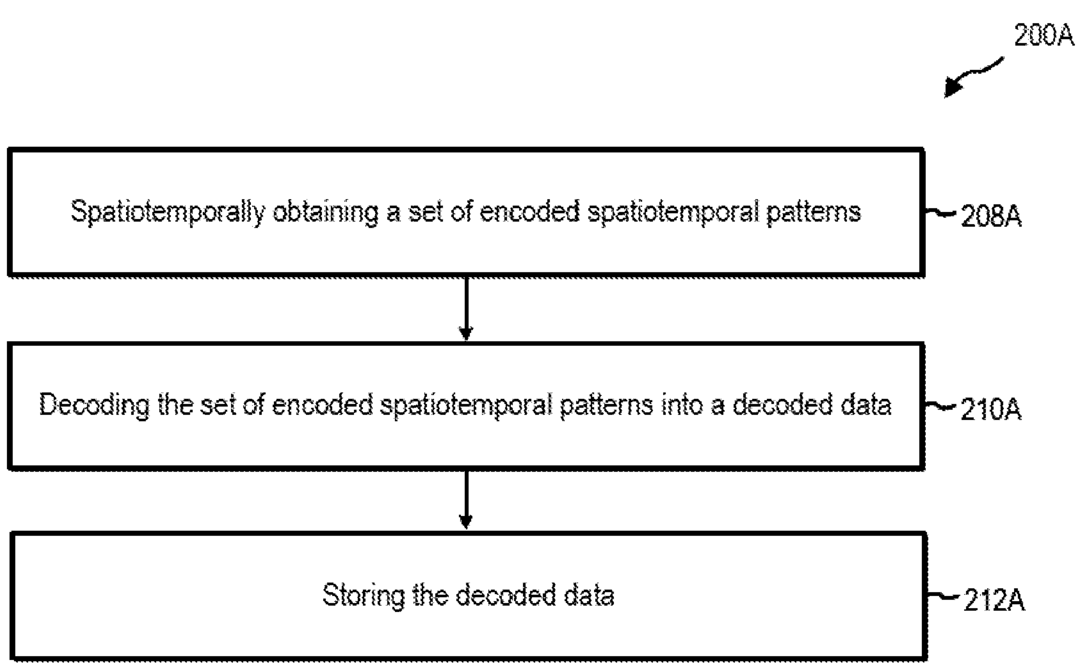
FIGS. 2A-2E are flowcharts illustrating a method of decoding data in a datacenter.
Figure 2B:
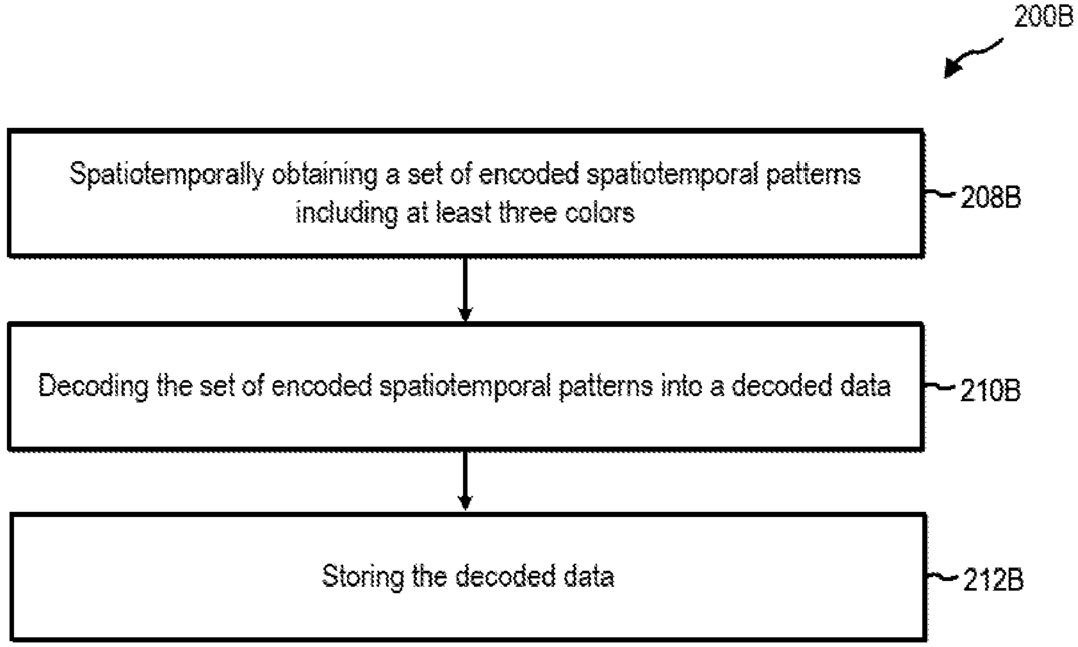
Figure 2C:
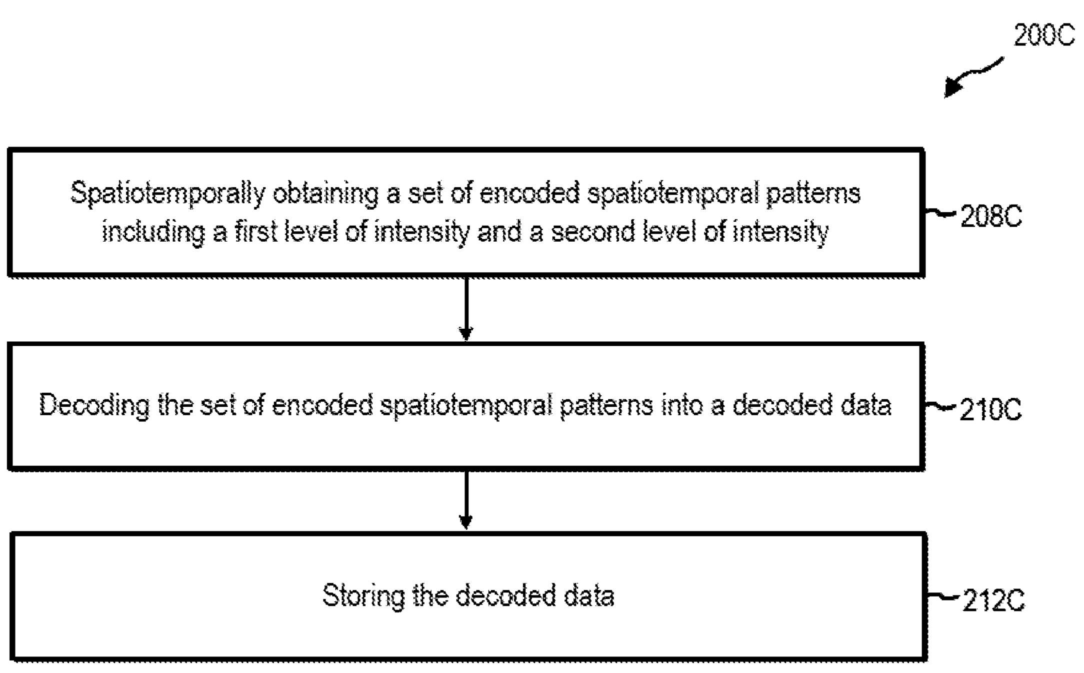
Figure 2D:
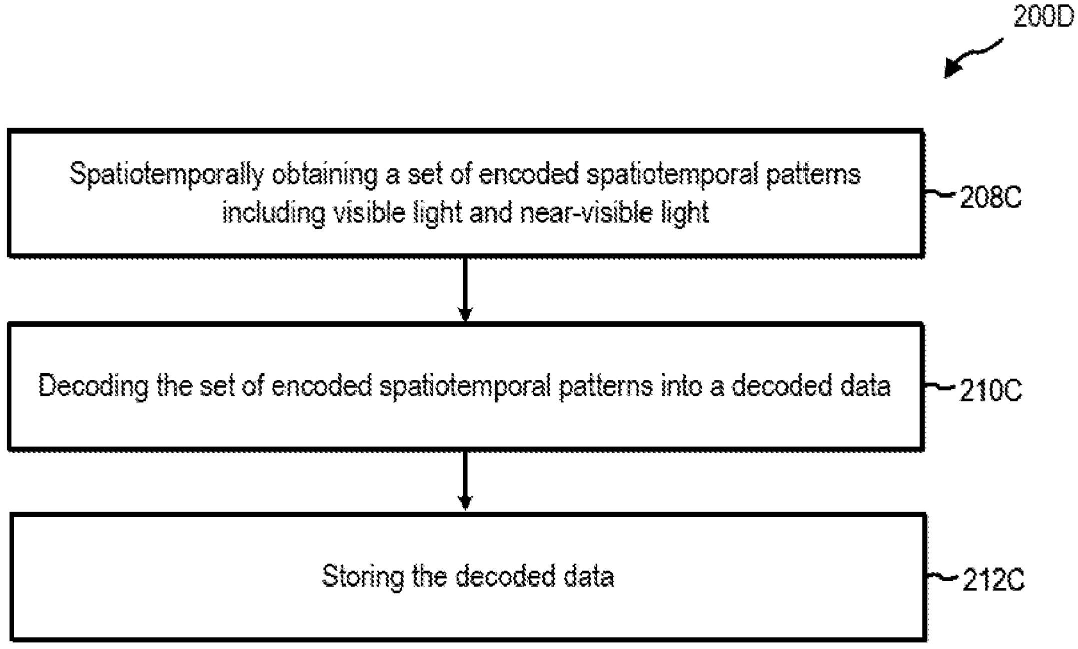
Figure 2E:
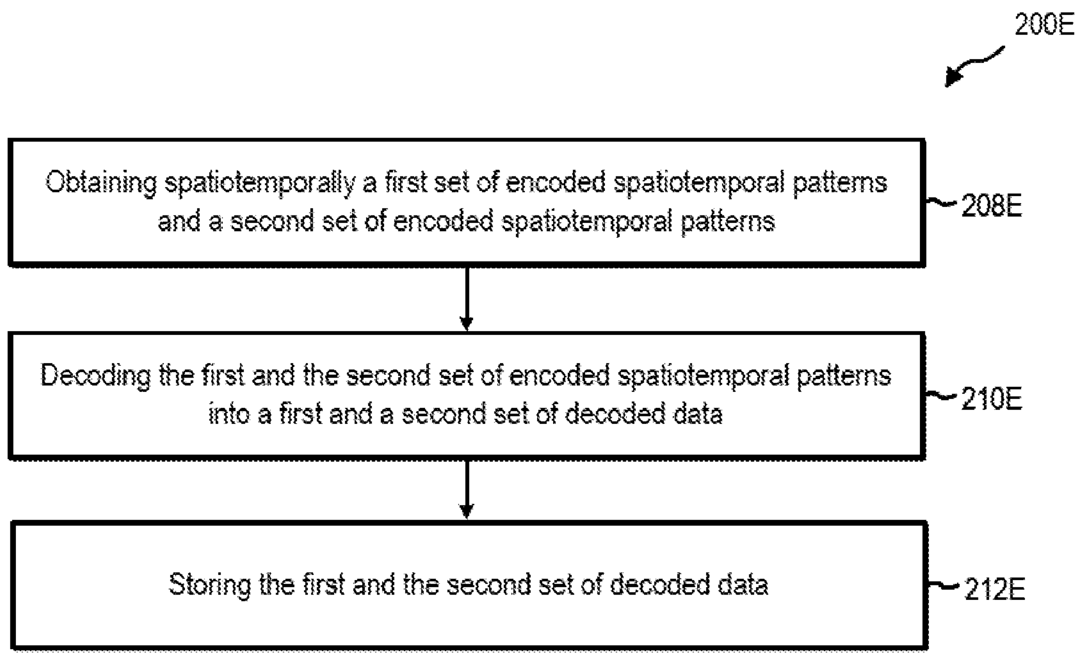

FIGS. 2A-2E include flowcharts illustrating methods 200A, 200B, 200C, 200D, 200E of decoding data (such as the data encoded by one or more of methods 100A, 100B, 100C, 100D, 100E) in a datacenter, which are simultaneously described for ease of description. The methods 200A, 200B, 200C, 200D include spatiotemporally obtaining a set (or a first set and a second set in FIG. 2E) of encoded spatiotemporal patterns (e.g., the set of encoded spatiotemporal patterns encoded by method 100A, 100B, 100C, 100D, 100E) at stage 208A, 208B, 208C, 208D, 208E. Spatiotemporally obtaining a set of encoded spatiotemporal patterns may include spatiotemporally obtaining a first set and a second set of encoded spatiotemporal patterns (as shown in FIG. 2E at stage 208E) and/or the spatiotemporal patterns may include at least three colors (as shown in FIG. 2B at stage 208B), a first level of intensity and a second level of intensity (as shown in FIG. 2C at stage 208C), visible and near-visible light (as shown in FIG. 2D at stage 208D), or combinations thereof. In some embodiments, the set (or first and second set) of encoded spatiotemporal patterns includes two colors. In some embodiments, the set (or first and second set) of encoded spatiotemporal patterns includes one color.

In some embodiments, spatiotemporally obtaining a set of encoded spatiotemporal patterns include spatiotemporally obtaining the set of encoded spatiotemporal patterns outputted by at least one display device able to display, reflect, or pass and reflect light, as described herein. In some embodiments, spatiotemporally obtaining a set (or first and second set) of encoded spatiotemporal patterns include spatiotemporally obtaining (e.g., capturing, detecting, identifying), via an obtaining device. For example, an obtaining device may be a camera, a video camera, an image sensor, a photodiode, or any other device capable of obtaining spatiotemporal images, either alone or in combination with other devices.

In some embodiments, an obtaining device may capture at least the same (or greater) framerate(s) as the display device is capable of outputting to reduce or prevent data loss. In some embodiments, the obtaining device may have a higher framerate than the display device, which may facilitate data transmission at the maximum framerate of the display device.

In some embodiments, there may be more than one obtaining device obtaining the set of encoded spatiotemporal patterns, as further discussed in connection to FIGS. 3A-3B. For example, in some embodiments, where data is intended to be broadcast to multiple nodes, the first sending node may output the data, and multiple receiving nodes may obtain the broadcast data simultaneously from a display device (e.g., a single display device), without the need for the data to go through a central router. In some embodiments, only one (e.g., a single) obtaining device may be used for only one (e.g., a single) display device (e.g., a 1:1 ratio of obtaining device to display device). In some embodiments, there may be two or more obtaining devices for a single display device, as further discussed in connection with FIGS. 3A-3B. In some embodiments, the obtaining device can capture both visible light and near-visible (such as IR and UV) light. In some embodiments, there may be a first obtaining device that is able to capture visible light and a second obtaining device that is able to capture near-visible light.

The method 200A-200E then includes decoding the set (or first and second sets in FIG. 2E) of encoded spatiotemporal patterns into decoded data at stage 210A-210D. In some embodiments, decoding the set of encoded spatiotemporal patterns includes decoding at least three colors, as shown in stage 210B. In some embodiments, decoding the set of encoded spatiotemporal patterns includes decoding a first level of intensity and a second level of intensity as shown in stage 210C. In some embodiments, the decoding the set of encoded spatiotemporal patterns includes decoding visible and near-visible light, as shown in stage 210D. In some embodiments, decoding the set of encoded spatiotemporal patterns includes decoding two colors. In some embodiments, decoding the set of encoded spatiotemporal patterns includes decoding one color. The method 200E then includes decoding the first and the second set of decoded data at stage 210E.

In some embodiments, the decoded data is non-serialized data in a matrix form. One possible benefit of transmitting non-serialized data is that there is no need to go through multiple physical or software component layers between applications, saving time on data transmission. Another possible benefit of transmitting non-serialized data is that data corruption, data theft, and data throttling possibilities may be minimized.

In some embodiments, decoding the one or more sets of encoded spatiotemporal patterns into decoded data includes decoding one or more of the encoded spatiotemporal patterns disclosed herein.

In some embodiments, decoding the set of encoded spatiotemporal patterns into decoded data includes decoding code symbols into decoded data. The code symbols may be organized into the encoded spatiotemporal patterns, as described herein. In some embodiments, decoding the code symbols into data may further include decoding the code symbols into a bit stream and decoding the bit stream into data, as described herein.

The method 200A-200D then includes storing the decoded data at stage 212A-212D. The method 200E then includes storing the first and the second set of decoded data at stage 212E. In some embodiments, storing the decoded data includes storing the data to a storage device residing at one or more receiving nodes, as further discussed in connection with FIGS. 3A-3B. For example, the first set of decoded data may be stored at a first receiving node and the second set of decoded data may be stored at a second receiving node. A storage device may include an HDD, SSD, optical storage devices, any other type of non-volatile storage device for storing data for long- or short-term retention, or combinations thereof. In some embodiments, storing the data may include storing the data to a memory device residing at the first receiving node. For example, a memory device may be a ROM, RAM, DRAM, SRAM, other suitable volatile memory device for storing data temporarily, or combinations thereof. In some embodiments, storing the decoded data further includes storing the decoded data into a buffer and further transmitting the data to yet another receiving node.

Figure 3A:
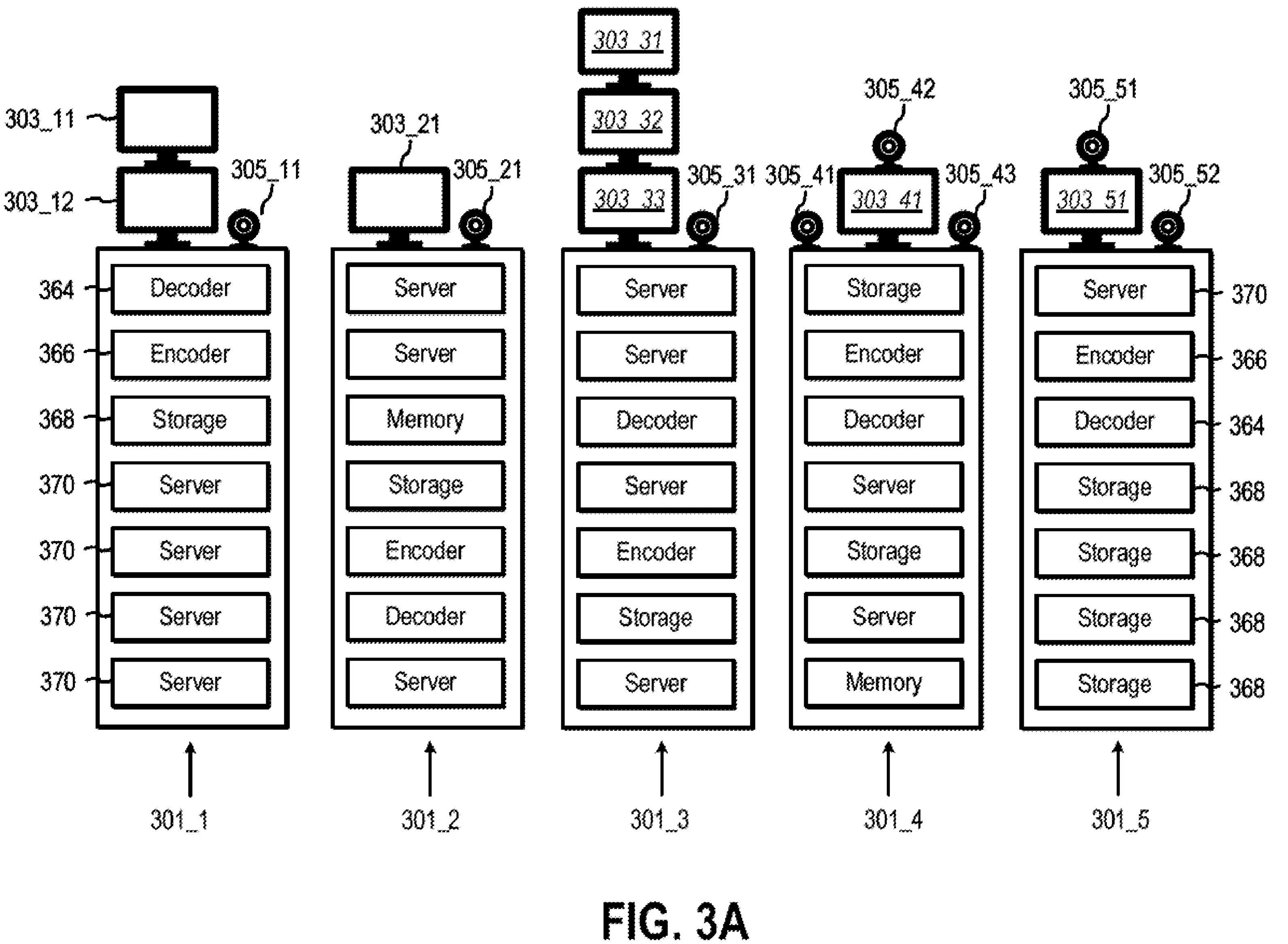
FIG. 3A is a front view of five racks including physical computer nodes in a datacenter, according to at least one embodiment.
Figure 3B:
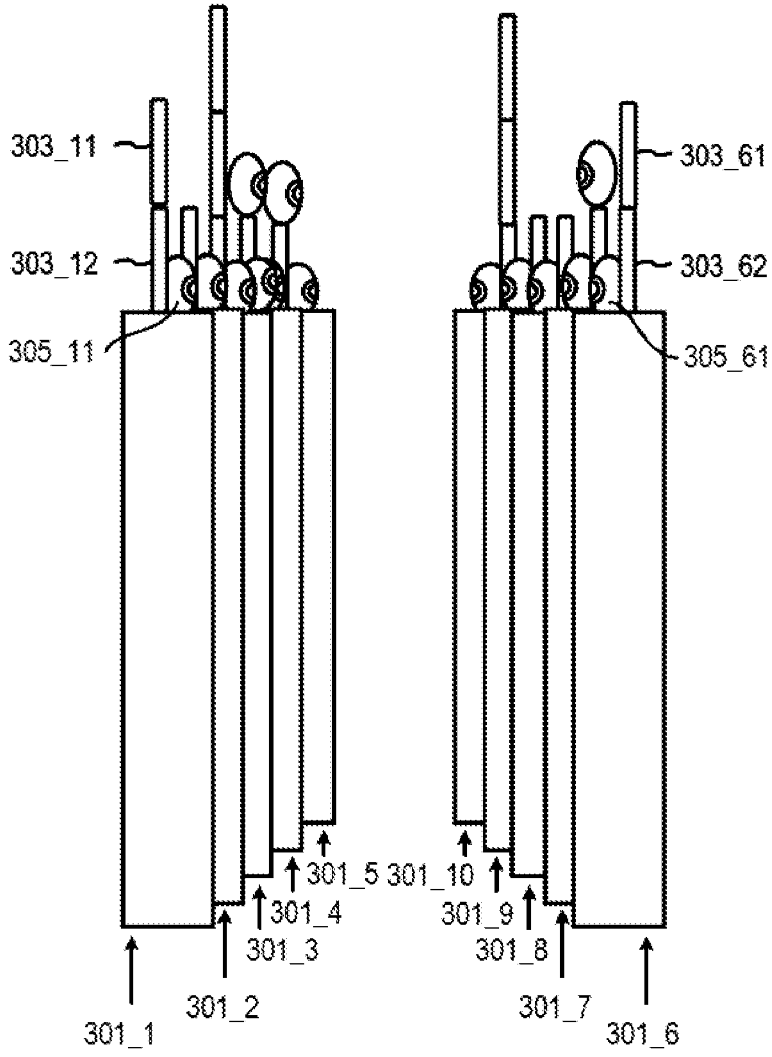
FIG. 3B is a side view of five racks including physical computer nodes, such as the racks shown in FIG. 3A, and additional five racks including physical computer nodes in a datacenter, according to at least one embodiment.

FIGS. 3A and 3B are an example of a datacenter according to at least one embodiment. As used herein, the term "datacenter" generally refers to interconnected nodes in a same physical location that connect a plurality of servers to one another and/or to external networks (e.g., the Internet) or to another datacenter in another physical location. The term "node" generally refers to a group of servers, storage devices, routers, switches, hubs, bridges, load balancers, security gateways, or firewalls. In some embodiments, a node may refer to a single device. Furthermore, a node may carry out processes, such as encoding and decoding of data. In some embodiments, an encoder and a decoder may be separate physical computing devices. In some embodiments, an encoder and a decoder may be processes carried out by one or more of the nodes. A "server" generally refers to a physical computing device configured to implement, for instance, one or more virtual machines or other suitable virtualized components.

FIG. 3A shows a front view of five racks (301_1, 301_2, 301_3, 301_4, 301_5) in a datacenter including a variation of physical nodes. For example, rack 301_1 includes a decoder 364, an encoder 366, a storage device 368, and four servers 370, and rack 301_5 includes a server 370, an encoder 366, a decoder 364, and four storage devices 368. In the embodiment shown in FIG. 3A, each rack includes seven physical nodes, but it should be understood that a rack can, in some embodiments, include more than seven or less than seven physical nodes. It should be understood that a rack could include any combination of different physical nodes and is not limited to the physical node examples provided. In addition, a node is connected to at least one display device and at least one obtaining device. For example, one or more nodes on rack 301_1 are connected to two display devices 303_11, 303_12 and one obtaining device 305_11, and one or more nodes on rack 301_5 are connected to one display device 303_51 and two obtaining devices 305_51, 305_52. In the example shown in FIG. 3A, one or more nodes on rack 301_2 are connected to one display device 303_21 and one obtaining device 305_21, one or more nodes on rack 303_1 are connected to three display devices 303_31, 303_32, 303_33 and one obtaining device 305_31, and one or more nodes on rack 301_4 are connected to one display device 303_41 and three obtaining devices 305_41, 305_42, 305_43.

In some embodiments, more than two display devices and/or more than two obtaining devices are connected to a single node. In some embodiments, two or more nodes may share one or more display devices and/or one or more obtaining devices. In some embodiments, the one or more display devices may point to multiple different directions. For example, a first display device may point to one direction and a second display device may point to a second direction, wherein the second direction may be between 90 degrees and 180 degrees from the first direction. In another example, a display device may rotate around 360 degrees and adjust the direction based on the receiving node's obtaining device's location in the datacenter. An obtaining device may capture visible light, near-visible light, non-visible spatial signals, or two or more of visible light, near-visible light, and non-visible spatial signals. In some embodiments, one or more sending nodes and/or one or more receiving nodes may be servers including virtual machines that provide web searching, website hosting, system updates, application development and testing, other suitable computing services to users, or combinations thereof. In some embodiments, one or more applications may reside on the node. For example, the application may be a word processor, a media player, an email application, an accounting software, any other type of application that is designed to carry out specific tasks, or combinations thereof.

In some embodiments the obtaining device may point to multiple different directions. For example, the obtaining device may rotate around 360 degrees and adjust the direction based on the sending node's display location in the datacenter.

FIG. 3B shows a side view of five racks 301_1, 301_2, 301_3, 301_4, 301_5, such as the racks shown in FIG. 3A, and an additional five racks 301_6, 301_7, 301_8, 301_9, 301_10 in a datacenter including a variation of different physical nodes. In one embodiment, obtaining device 305_11 (shown as a camera) is connected to one or more nodes on rack 301_1 and faces display device 303_61 (shown as a computer screen) which is connected to one or more nodes on rack 301_6. For example, a server node residing in rack 301_6 may transmit data to a storage device node residing in rack 301_1. The server node on rack 301_6 may transmit the data to an encoder residing in one or more of the nodes on rack 301_6. The encoder may encode the data to one or more sets of encoded spatiotemporal patterns, such as the encoded spatiotemporal patterns discussed in connection with FIGS. 5-20. The encoder may transmit the one or more sets of encoded spatiotemporal patterns to display device 303_61 and the display device 303_61 displays the set of encoded spatiotemporal patterns. The obtaining device 305_11 (e.g., a camera) captures the set of encoded spatiotemporal patterns from the display device 303_61 and transmits the captured set of encoded spatiotemporal patterns to a decoder residing in one of the nodes on rack 301_1. The decoder decodes the set of encoded spatiotemporal patterns into the data and delivers it to a storage device node in rack 301_1 for storing. Similarly, one or more of the nodes residing on rack 301_2 may have data transmission with one or more of the nodes residing on rack 301_7, one or more of the nodes residing on rack 301_3 may have data transmission with one or more of the nodes residing on rack 301_8, one or more of the nodes residing on rack 301_4 may have data transmission with one or more of the nodes residing on rack 301_9, and one or more of the nodes residing on rack 301_5 may have data transmission with one or more of the nodes residing on rack 301_10.

In some embodiments, one sending node may have simultaneous data transmission with two or more receiving nodes. For example, the sending node on rack 301_6 may output two or more sets of encoded spatiotemporal patterns on display device 303_61, obtaining device 305_11 may obtain a first set of encoded spatiotemporal patterns from display device 303_61 and obtaining device 305_21 may obtain a second set of encoded spatiotemporal patterns from display device 303_61.

Figure 4:
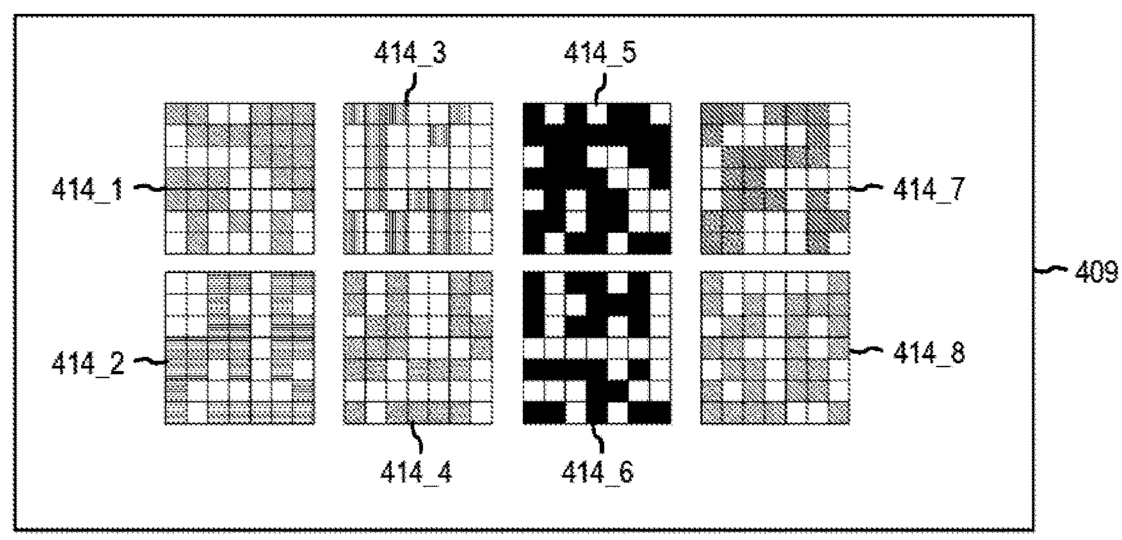
FIG. 4 is an example, according to at least one embodiment, of a datacenter.
Figure 4:
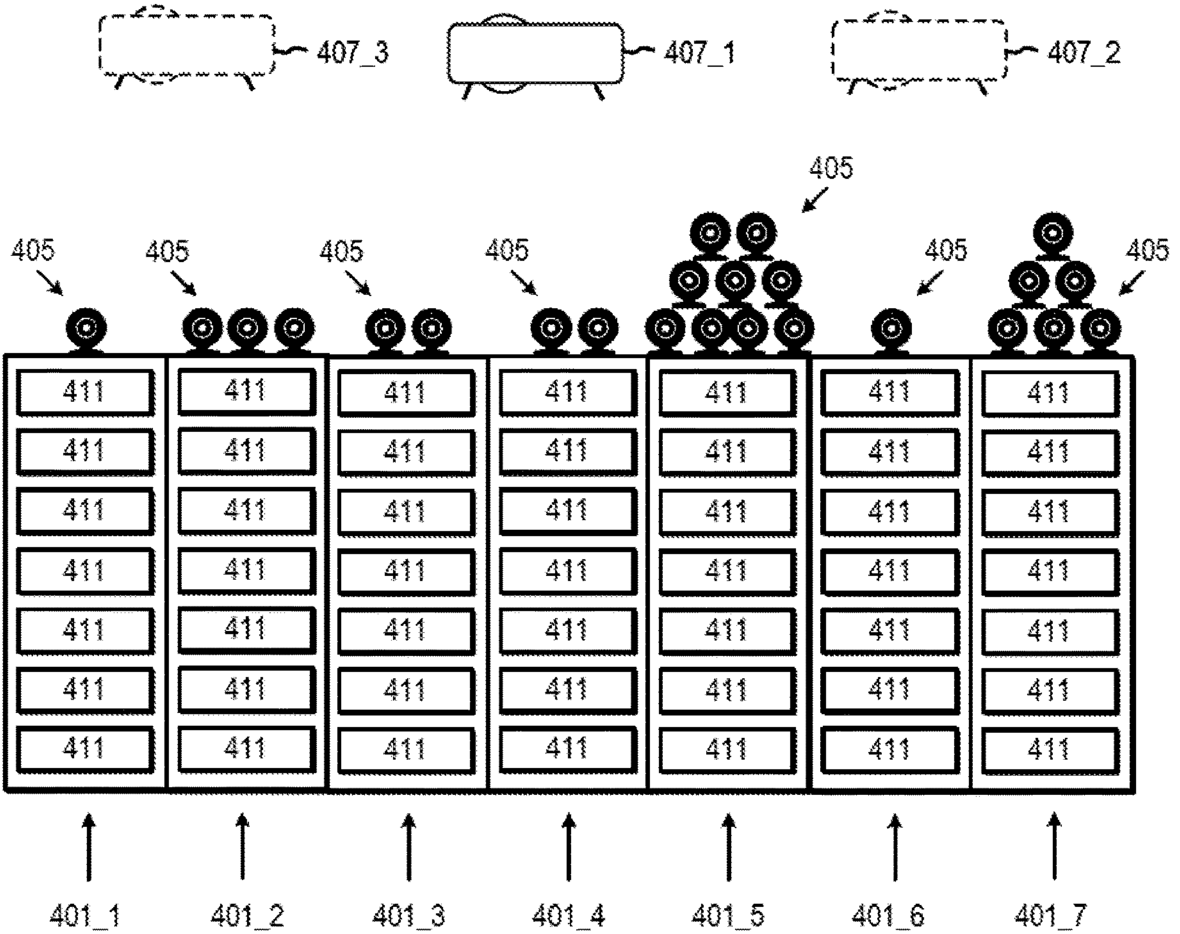

FIG. 4 is an example, according to at least one embodiment, of a datacenter. The datacenter includes a plurality of racks (401_1, 401_2, 4013, 401_4, 401_5, 401_6, 401_7) including a plurality of different nodes 411, such as the nodes (364, 366, 368, 370) discussed in connection to FIG. 3A-3B. The datacenter further includes one or more projectors (407_1, 407_2, and 407_3), one or more projector screens 409 and a plurality of obtaining devices 405. A sending node 411 may be connected to one or more projectors (407_1, 407_2, and 407_3). For example, a node 411 residing in rack 401_1 can send data encoded into a spatiotemporal pattern, such as 414_1, to any of the other nodes residing on racks 401_2, 401_3, 401_4, 401_5, 401_6 and 401_7, by sending the encoded data to one of the projectors 407_1, 407_2 and 407_3. The projector may then project the spatiotemporal pattern to the projector screen 409. The one or more projectors may be configured to project spatiotemporal patterns to the projector screen 409. For example, projector 407_3 may project spatiotemporal patterns 414_1 and 414_2, projector 407_1 may project spatiotemporal patterns 4143, 414_4, 414_5, and 414_6, and projector 407_2 may project spatiotemporal patterns 414_7 and 414_8. In another example, projector 407_1 may project all spatiotemporal patterns in the projector screen 409. One or more obtaining devices 405 may be configured to obtain the spatiotemporal patterns from the projector screen 409. In some embodiments, the obtaining device 405 obtains the spatiotemporal pattern from the projector screen 409 and delivers it for a decoder to decode the spatiotemporal pattern into a decoded data. In some embodiments, the decoder delivers the data to a receiving node 411. In some embodiments, the decoder delivers the data to a sending node 411 to verify that the data was sent correctly, as further discussed in connection to FIG. 23. One possible benefit of using a projector and projector screen for data transmission is that an individual sending node may reach a plurality of different nodes, each of which is capable to receive the data through an obtaining device. Another possible benefit of using a projector and projector screen is that a node can broadcast data to multiple nodes simultaneously from a screen, without the need for the data to go through a central router.

Figure 5:
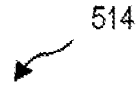
FIG. 5 illustrates an encoded spatiotemporal pattern having code symbols with at least three different colors, according to at least one embodiment.
Figure 5:
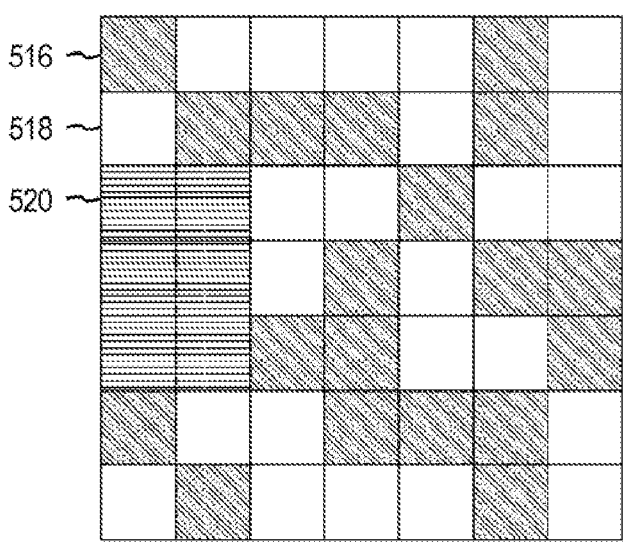

FIG. 5 is an example, according to at least one embodiment, of an encoded spatiotemporal pattern 514 having code symbols with at least three different colors. The encoded spatiotemporal pattern 514 includes three different colors; a first color 516, a second color 518, and a third color 520. In some embodiments, all three (or more) different colors are used for encoding and decoding the data. In one embodiment, two of the at least three colors may be used for encoding and/or decoding the data and the third color may be used as header information. For example, the header information may identify the receiver for the data and/or the header information may indicate the level of priority for the data. In some embodiments, only single code symbol may be used for header information. In some embodiments, two or more code symbols may be used for header information.

For example, in FIG. 5 the first color 516 may be black, the second color 518 may be white and the third color 520 may be blue. Yet in another example, the first color 516 may be red, the second color 518 may be green and the third color 520 may be blue. In an example, the third color 520 is blue and may indicate the intended recipient. In one embodiment, a different color may indicate a different receiving node. For example, if the third color is blue, the data is meant for a first receiving node, and if the third color is red, the data is meant for a second receiving node. One possible advantage of using a color to identify the intended recipient is to provide a much faster way for the receiving node to decide if the data is meant for it or if it can ignore at least a portion of the data without the need for decoding the set of encoded spatiotemporal pattern to read potential header information. This is beneficial in situations where multiple receiving nodes obtain at least a portion of the set of the encoded spatiotemporal patterns.

In some embodiments, the third color 520 may be used to indicate the level of priority for the data transmission (e.g., at least a portion of data transmission of the entirety of the data being sent, at least a portion of data transmission of the data being sent). For example, if the third color 520 is blue, the level of priority is normal for the data, and if the third color 520 is red, the level of priority for the data is high. One possible advantage of using a color to indicate the level of priority for the data is to easily identify urgent data transmissions in case more than one set of encoded spatiotemporal patterns are output by a display device (e.g., a projection screen) simultaneously. The first receiving node may then decode the higher level of priority set of encoded spatiotemporal patterns first before it decodes the normal level of priority set of encoded spatiotemporal patterns.

Even if the spatiotemporal pattern examples here mainly concentrate on visible light spatiotemporal patterns, it should be noted that the patterns may be formed by any other spatial signals, as previously discussed.

Figure 6:
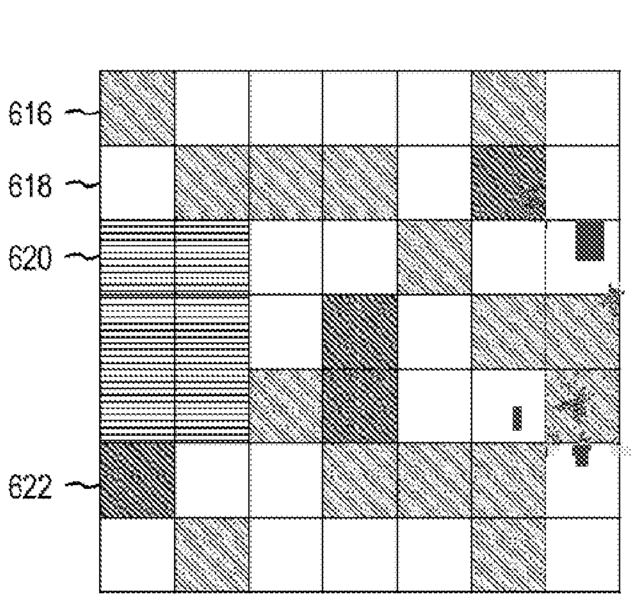
FIG. 6 illustrates an encoded spatiotemporal pattern having code symbols with at least two different intensity levels with three colors, according to at least one embodiment.

FIG. 6 is an example, according to at least one embodiment, of an encoded spatiotemporal pattern 614 having code symbols with at least two different intensity levels and three colors. The encoded spatiotemporal pattern 614 includes three different colors having a first intensity level; a first color 616, a second color 618, and a third color 620. The encoded spatiotemporal pattern 614 further includes a first color having a second intensity level 622. For example, in FIG. 6, the first color 616 may be red, having a first level of intensity, the second color 618 may be green, having a first level of intensity, the third color 620 may be blue, having a first level of intensity, and a red color having a second level of intensity 622. Hence, code symbols 616 and 622 in FIG. 6 are the same color but have different intensity levels. In some embodiments, the encoded spatiotemporal pattern could have more than one color having a second level of intensity. In some embodiments, the encoded spatiotemporal pattern could have more than two different levels of intensity for one or more of the three or more colors.

In some embodiments, all three (or more) different colors having a first intensity level are used for encoding and decoding the data, and at least one of the at least three or more different colors having a second intensity level may be used as header information. For example, the header information may identify the receiver for the data and/or the header information may indicate the level of priority for the data.

The first color with the second level of intensity 622 may indicate the intended recipient. In one embodiment, different intensity indicates a different receiving node. For example, if the intensity level for the first color is low, the data is meant for a first receiving node, and if the intensity level for the first color is high, the data is meant for a second receiving node. One possible advantage of using an intensity to identify the intended recipient is that it provides a much faster way for the receiving node to decide if the data is meant for them or if they can ignore it without the need for decoding the set of encoded spatiotemporal pattern to read the header information. This is beneficial in situations where there are multiple receiving nodes obtaining the set of encoded spatiotemporal patterns.

In some embodiments, the intensity level may be used to indicate the level of priority for the data transmission. For example, if the intensity level is medium, the level of priority is normal for the data, and if the intensity level is high, the level of priority for the data is high. One possible advantage of using a intensity to indicate the level of priority for the data is to easily identify urgent data transmissions in case more than one set of encoded spatiotemporal patterns are outputted on a screen simultaneously. The first receiving node will then decode the higher level of priority set of encoded spatiotemporal patterns first before it decodes the normal level of priority set of encoded spatiotemporal patterns.

Figure 7:
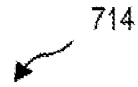
FIG. 7 illustrates an encoded spatiotemporal pattern having code symbols with at least two different intensity levels with one color, according to at least one embodiment.
Figure 7:
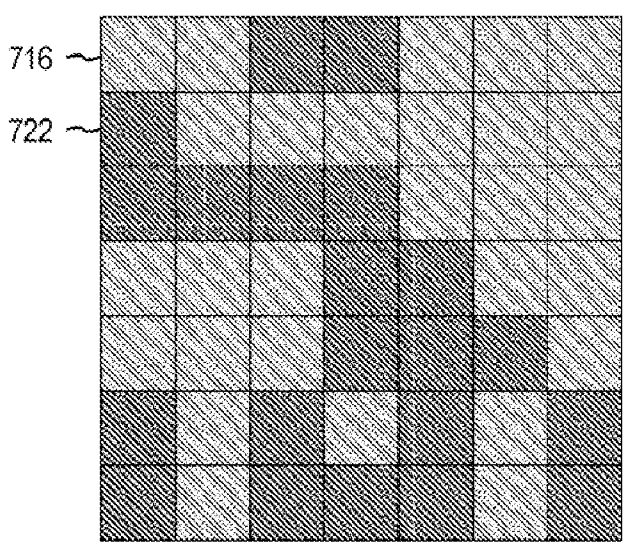

FIG. 7 is an example, according to at least one embodiment, of an encoded spatiotemporal pattern 714 having code symbols with at least two different intensity levels with one color. The encoded spatiotemporal pattern 714 includes one color having a first intensity level 716 and the same color having a second intensity level 722. For example, in FIG. 7, the color having the first intensity level 716 and a second intensity level 722 could be red. In some embodiments, the two different intensity levels are used for encoding and decoding the data, and the color is used as header information. For example, a first level of intensity may have a value of 1 and a second level of intensity may have a value of 0.

In some embodiments, the header information may identify the receiver for the data and/or the header information may indicate the level of priority for the data. For example, the color red may indicate that the data is for a first receiving node and the color blue may indicate that the data is for a second receiving node. One possible advantage of using a color to identify the intended recipient, is that it provides a much faster way for the receiving node to decide if the data is meant for them or if they can ignore it without the need for decoding the set of encoded spatiotemporal patterns to read the header information. This is beneficial in situations where there are multiple receiving nodes obtaining the set of encoded spatiotemporal patterns.

Figure 8:
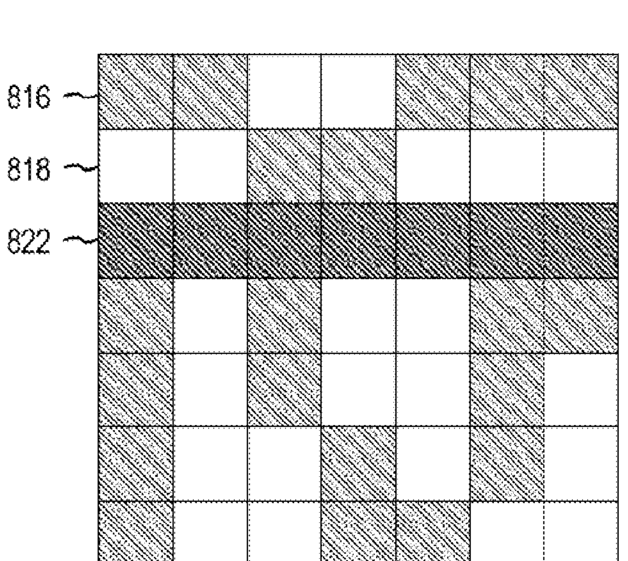
FIG. 8 is an encoded spatiotemporal pattern having code symbols with at least two different intensity levels with two colors, according to at least one embodiment.

FIG. 8 is an example, according to at least one embodiment, of an encoded spatiotemporal pattern 814 having code symbols with at least two different intensity levels and two colors. The encoded spatiotemporal pattern 814 includes one color having a first intensity level 816 and the same color having a second intensity level 822. The encoded spatiotemporal pattern 814 further includes a second color having a first intensity level 818. For example, the first color may be green, and the second color may be white. In some embodiments, the first color with two different intensity levels is used for encoding and decoding the data and the second color is used as header information. For example, the first color with the first level of intensity 816 may have a value of 1 and the first color with the second level of intensity 822 may have a value of 0.

In some embodiments, the two colors having a first intensity level (e.g., first intensity level 816, 818) are used for encoding and decoding the data, and the second intensity level 822 is used as header information. The header information may identify the receiver for the data and/or the level of priority for the data. For example, in FIG. 8, if the second intensity level is low, the data is meant for the first receiving node, and if the second intensity level is high (e.g., higher than the first intensity level), the data is meant for second receiving node.

Figure 9:
FIG. 9 illustrates an encoded spatiotemporal pattern having code symbols with visible and near-visible light and at least three colors, according to at least one embodiment.
Figure 9:
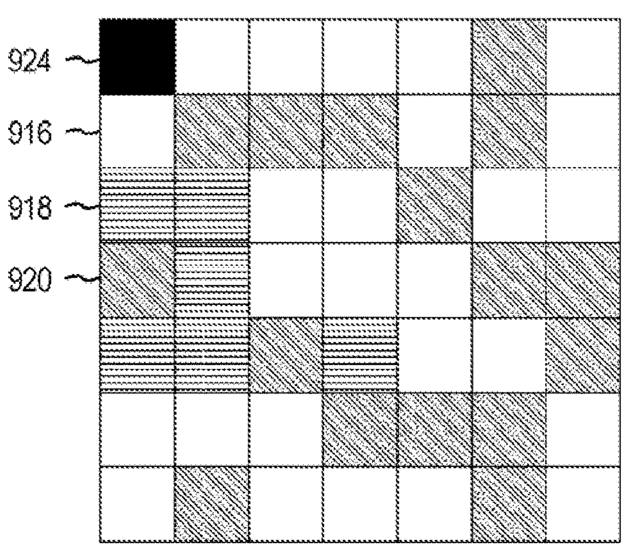

FIG. 9 is an example, according to at least one embodiment, of an encoded spatiotemporal pattern 914 having code symbols with visual and near-visual light. The encoded spatiotemporal pattern 914 includes three different colors: a first color 916, a second color 918, and a third color 920. The encoded spatiotemporal pattern 914 further includes a near-visible light (such as UV or IR) code symbol 924. For example, in FIG. 9, the first color 916 may be white, the second color 918 may be orange, the third color 920 may be blue, and a near-visible light code symbol 924 that may be activated as ON or OFF. In some embodiments, a TV screen may implement a visible and near-visible light source on the display. For example, a single pixel may be activated with a visible light or with near-visible light based on the need. In some embodiments, the encoded spatiotemporal pattern could have more than one near-visible light code symbols.

In some embodiments, the at least three or more different colors are used for encoding and decoding the data and at least one near-visible light code symbol may be used as header information. The header information may identify the receiver for the data and/or may indicate the level of priority for the data.

In some embodiments, the encoded spatiotemporal pattern 914 includes two different colors and two different levels of intensity together with near-visible light. For example, the encoded spatiotemporal pattern 914 includes a first color having a first intensity level 916, a second color having a first intensity level 918, a second color having a second intensity level 920, and near-visible light 924.

In some embodiments, the two colors together with the two different levels of intensity are used for encoding and decoding the data and the near-visible light code symbol is used as header information. The header information may identify the receiver for the data and/or may indicate the level of priority for the data.

In some embodiments, the at least three or more different colors may be used for encoding and decoding the data and at least one near-visible light code symbol may be used as header information. For example, the header information may identify the receiver for the data and/or may indicate the level of priority for the data.

In the embodiment shown in FIG. 9, the near-visible light code symbol 924 may indicate the intended recipient. In one embodiment, the near-visible light code symbol may indicate a different receiving node. For example, if the near-visible light is in 'ON' mode, the data is meant for a first receiving node, and if the near-visible light is in 'OFF' mode, the data is meant for a second receiving node. In another example, if the near-visible light is UV light, the data is meant for a first receiving node, and if the near-visible light is IR light, the data is meant for a second receiving node, and if the near-visible light is in 'OFF' mode, the data is meant for a third receiving node. In yet another example, if the near-visible light forms a certain pattern, such as a straight vertical line within the set of encoded visible pattern, the data is meant for a first receiving node, and if the near visible light forms a square within the set of encoded visible pattern, the data is meant for a second receiving node.

One possible advantage of using a near-visible light code symbol 924 to identify the intended recipient is that it is much faster for the receiving node to decide if the data is meant for them or if they can ignore it without the need for decoding the set of encoded spatiotemporal pattern to read the header information. This is beneficial in situations there are multiple receiving nodes recording or obtaining data.

In some embodiments, the near-visible light code symbol 924 may be used to indicate the level of priority for the data transmission. For example, if the near-visible light code symbol 924 is 'OFF', the level of priority is normal for the data, and if the near-visible light code symbol 924 is 'ON', the level of priority for the data is high. One possible advantage of using a near-visible light code symbol 924 to indicate the level of priority for the data is to easily identify urgent data transmissions in case more than one set of encoded spatiotemporal patterns are outputted on a display device simultaneously. The first receiving node may then decode the higher level of priority set of encoded spatiotemporal patterns first before it decodes the normal level of priority set of encoded spatiotemporal patterns.

Figure 10:
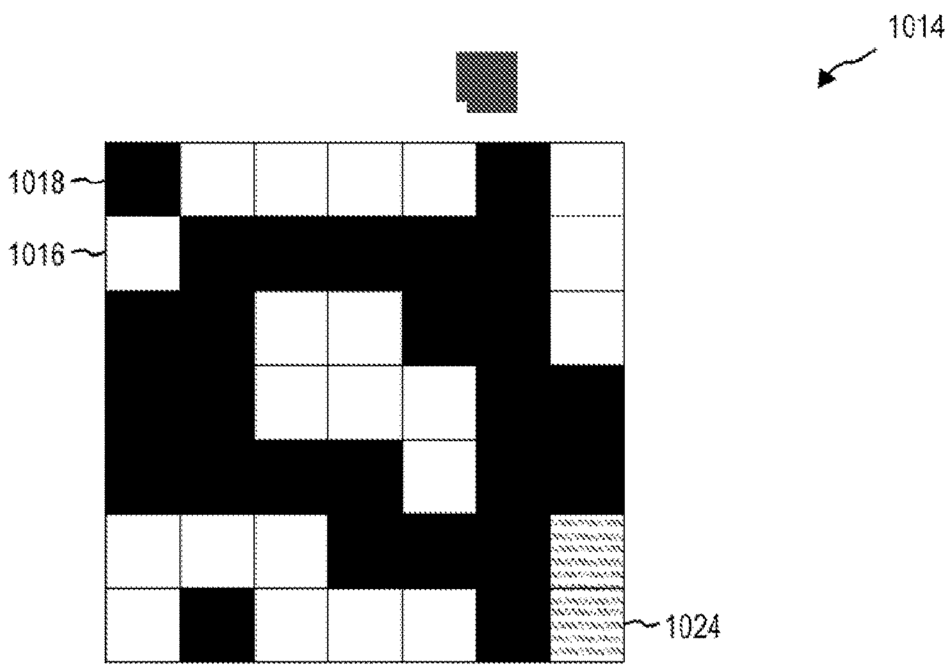
FIG. 10 illustrates an encoded spatiotemporal pattern including both visible and near-visible light and at least two colors, according to at least one embodiment.

FIG. 10 is an example, according to at least one embodiment, of an encoded spatiotemporal pattern 1014 including both visible and near-visible light and at least two colors. For example, the encoded spatiotemporal pattern 1014 may include a first color 1016, a second color 1018, and a near-visible light code symbol 1024. In some embodiments, the first color 1016 and the second color 1018 are used for encoding the data. For example, the first color 1016 and the second color 1018 provide values (such as 1 and 0) that are encodable by the encoder for encoding the data. In the embodiment shown in FIG. 10, the encoded spatiotemporal pattern 1014 may have a first color 1016 that is white with a value of 1 and a second color 1018 that is black with a value of 0.

In some embodiments, the near-visible light code symbol 1024 is used as header information. The header information may identify the receiver for the data and/or may indicate the level of priority for the data, as previously explained in connection to FIG. 9.

Figure 11:
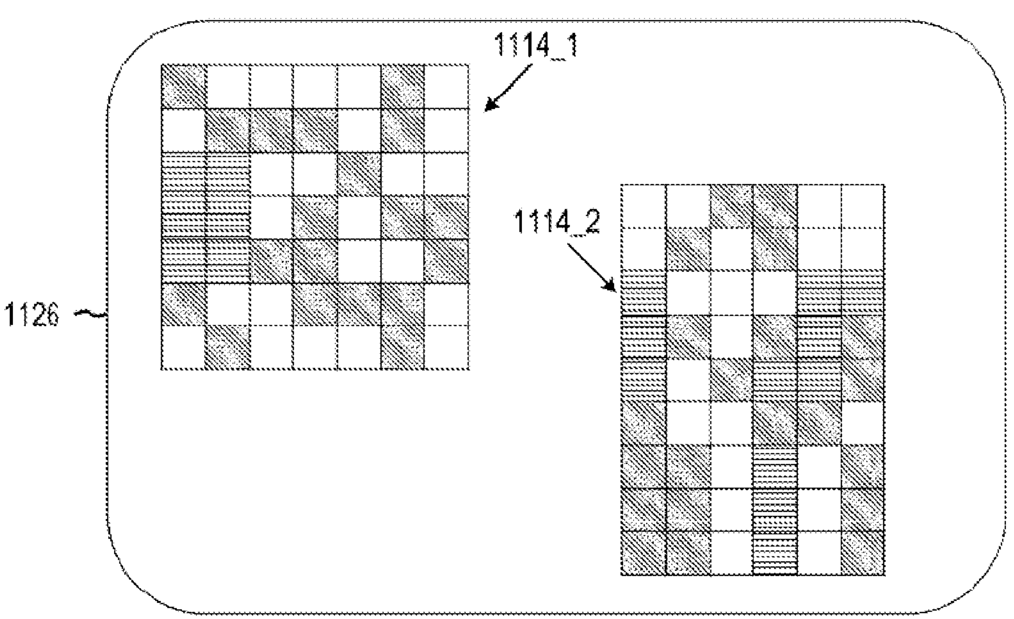
FIG. 11 illustrates two sets of encoded spatiotemporal patterns having a different location and/or different shape, according to at least one embodiment.

FIG. 11 is an example, according to at least one embodiment, of two sets of an encoded spatiotemporal patterns having a different location and/or different shape. The first set of the encoded spatiotemporal pattern 1114_1 has a 7×7 code symbol and the second set of the encoded spatiotemporal pattern 1114_2 has a 6×9 code symbol. In some embodiments, the shape of the set of the encoded spatiotemporal pattern may be used as header information. For example, the header information may identify the receiver for the data and/or may indicate the level of priority for the data.

In the embodiment shown in FIG. 11, the shape of the encoded spatiotemporal pattern 1114 may indicate the intended recipient. In one embodiment, the shape of the encoded spatiotemporal pattern may indicate a different receiving node. For example, in FIG. 11, the encoded spatiotemporal pattern 1114_1 is shaped as a square, meaning that the data is meant for a first receiving node and the encoded spatiotemporal pattern 1114_2 is shaped as a rectangle, meaning that the data is meant for a second receiving node. In another example, if the shape of the encoded spatiotemporal pattern is a hexagon, the data is meant for a first receiving node, if the shape of the encoded spatiotemporal pattern is a triangle, the data is meant for a second receiving node, and if the shape of the encoded spatiotemporal pattern is a circle, the data is meant for a third receiving node.

One possible advantage of using a shape to identify the intended recipient is that it is a much faster way for the receiving node to decide if the data is meant for them or if they can ignore it without the need for decoding the set of encoded spatiotemporal patterns to read the header information. This is beneficial in situations there are multiple receiving nodes recording or obtaining the encoded spatiotemporal pattern.

In some embodiments, the shape may be used to indicate the level of priority for the data transmission. For example, if the shape is square, the level of priority is normal for the data, and if the shape is not square, the level of priority for the data is high. One possible advantage of using a shape to indicate the level of priority for the data is to easily identify urgent data transmissions in case more than one set of encoded spatiotemporal patterns are outputted on a screen simultaneously. The first receiving node may then decode the higher level of priority set of encoded spatiotemporal patterns first before it decodes the normal level of priority set of encoded spatiotemporal patterns.

In some embodiments, the location of the set of encoded spatiotemporal patterns on the output device may be used as header information. For example, the header information may identify the receiver for the data and/or the header information may indicate the level of priority for the data.

In the embodiment shown in FIG. 11, the location of the encoded spatiotemporal pattern may indicate the intended recipient. For example, in FIG. 11, the encoded spatiotemporal pattern 11141 is located on the top left corner of the display, meaning that the data is meant for a first receiving node, and the encoded spatiotemporal pattern 1114_2 is located at the bottom right corner, meaning that the data is meant for a second receiving node. In another example, if the location of the encoded spatiotemporal pattern is in the middle of the display, the data is meant for a first receiving node, if the location of the encoded spatiotemporal pattern is on the top right corner, the data is meant for a second receiving node, and if the location of the encoded spatiotemporal pattern is on the bottom left corner, the data is meant for a third receiving node.

One possible advantage of using a location to identify the intended recipient is a much faster way for the receiving node to decide if the data is meant for them or if they can ignore it without the need for decoding the set of encoded spatiotemporal pattern to read the header information. This is beneficial in situations there are multiple receiving nodes recording or obtaining the encoded spatiotemporal pattern.

In some embodiments, the location may be used to indicate the level of priority for the data transmission. For example, if the location is near the bottom of the screen, the level of priority is normal for the data, and if the location is near the top of the screen the level of priority for the data is high. In some embodiments, other locations may be used to indicate priority levels. In some embodiments, the locations may change. One possible advantage of using a location to indicate the level of priority for the data is to easily identify urgent data transmissions in case more than one set of encoded spatiotemporal patterns are outputted on a screen simultaneously. The first receiving node may then decode the higher level of priority set of encoded spatiotemporal patterns first before it decodes the normal level of priority set of encoded spatiotemporal patterns.

In some embodiments, the two or more sets of encoded spatiotemporal patterns may originate from a first sending node. In some embodiments, the two or more sets of encoded spatiotemporal patterns may originate from two or more sending nodes. In some embodiments, the two or more sets of encoded spatiotemporal patterns are intended for a first receiving node. In some embodiments, the two or more sets of encoded spatiotemporal patterns are intended for two or more receiving nodes.

Figure 12:
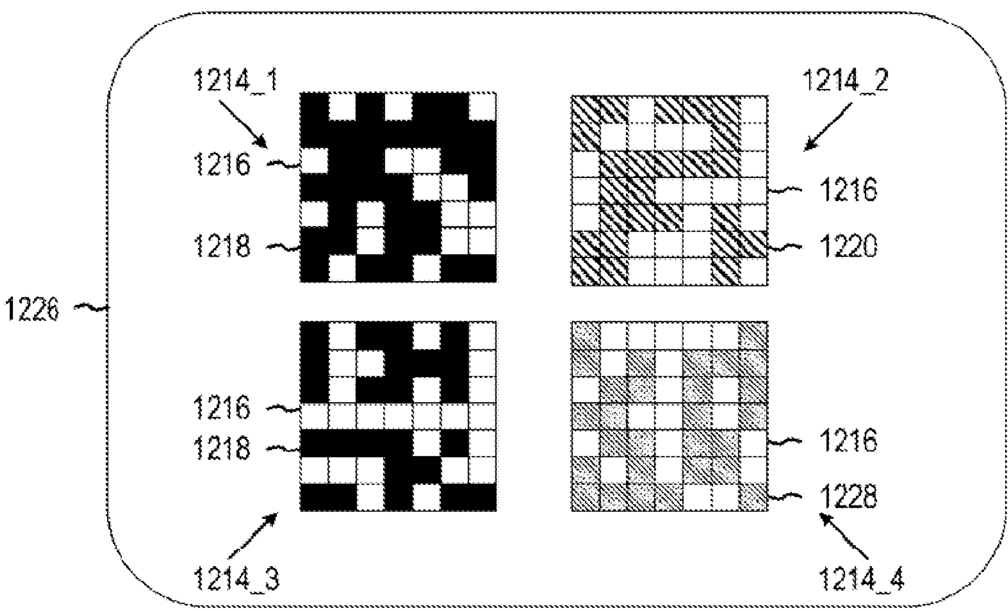
FIG. 12 is an example, according to at least one embodiment, of four sets of encoded spatiotemporal patterns transmitted simultaneously.

FIG. 12 is an example, according to at least one embodiment, of two or more sets of encoded spatiotemporal patterns transmitted simultaneously. FIG. 12 shows four different data sets that have been encoded to spatiotemporal patterns. The first spatiotemporal pattern 1214_1 consists of a first color 1216 and a second color 1218, the second spatiotemporal pattern 1214_2 consists of a first color 1216 and a third color 1220, the third spatiotemporal pattern 1214_3 consists of a first color 1216 and a second color 1218, and the fourth spatiotemporal pattern consists of a first color 1216 and a fourth color 1220. For example, the first color may be 'OFF' (i.e., no color is displayed in that area), the second color may be red, the third color may be green and the fourth color may be blue (e.g., pattern 1214_1 consists of the color red and 'OFF', 1214_2 consists of the color green and 'OFF', 1214_3 consists of the color red and 'OFF', and 1214_4 consists of the color blue and 'OFF'). In some embodiments, a first sending node may transmit all four data sets. In some embodiments, a first sending node may transmit one or more of the data sets and a second sending node may transmit one or more of the data sets. In some embodiments, each of the four data sets are intended to a separate receiving node. In some embodiments, all four data sets are intended to one and the same receiving node.

In the embodiment shown in FIG. 12, each of the four spatiotemporal patterns includes two different colors. In some embodiments, a different color may indicate a different receiving node. For example, the second color 1218 is red, so the spatiotemporal pattern 1214_1 and 1214_3 are meant for a first receiving node, the third color 1220 is green, so the spatiotemporal pattern 1214_2 is meant for a second receiving node, and the fourth color 1228 is blue, so the spatiotemporal pattern 1214_4 is meant for third receiving node. One possible advantage of using a color to identify the intended recipient is to provide a much faster way for the receiving node to decide if the data is meant for it or if it can ignore at least a portion of the data without the need for decoding the set of encoded spatiotemporal pattern to read potential header information. This is beneficial in situations where multiple receiving nodes obtain at least a portion of the set of the encoded spatiotemporal patterns. For example, when the first receiving node receives the spatiotemporal patterns, it only needs to decode 1214_1 and 1214_3 as only those are intended for the first receiving node. Similarly, when the second receiving node receives the spatiotemporal patterns, it only needs to decode 1214_2 as only that one is intended for the second receiving node, and similarly the third receiving node only needs to decode 1214_4.

In some embodiments, color may be used to indicate the level of priority for the data transmission (e.g., at least a portion of data transmission of the entirety of the data being sent). For example, when the color is blue, the level of priority is normal for the data, if the color is red, the level of priority for the data is high, and if the color is green, the level of priority for the data is low. One possible advantage of using a color to indicate the level of priority for the data is to easily identify urgent data transmissions in case more than one set of encoded spatiotemporal patterns are output by a display device (e.g., a projection screen, or a monitor) simultaneously. The receiving node may then decode the higher level of priority set of encoded spatiotemporal patterns first before it decodes the normal level of priority set of encoded spatiotemporal patterns. For example, in FIG. 12, the receiving node would be able to detect that 1214_1 and 1214_3 have higher priority and should be decoded first, while 1214_4 has a low priority and should be decoded last.

Figure 13:
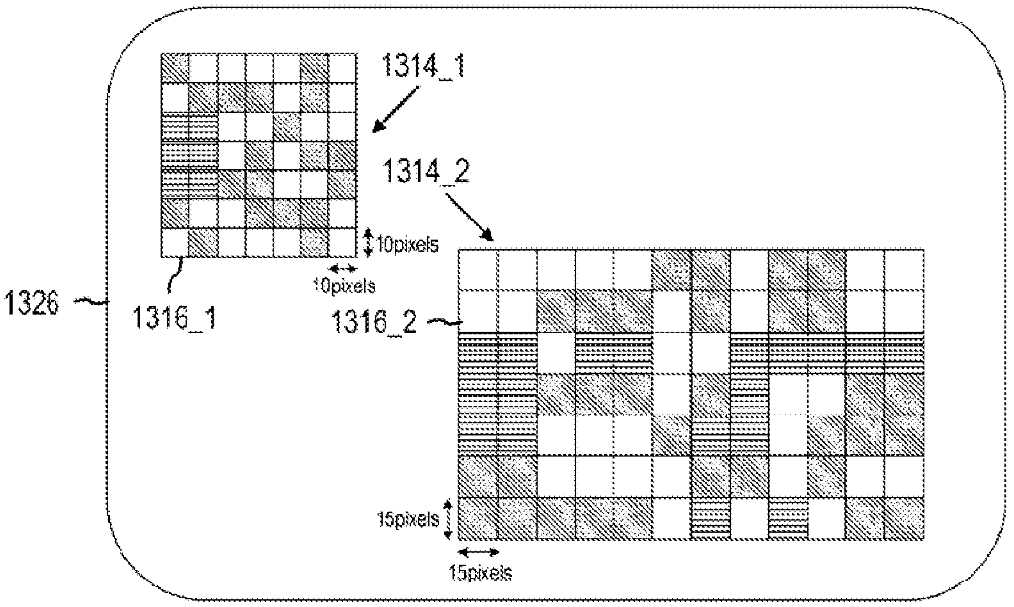
FIG. 13 illustrates two sets of encoded spatiotemporal patterns having a different size, according to at least one embodiment.

FIG. 13 is an example, according to at least one embodiment, of two sets of encoded spatiotemporal patterns having a different size. The first set of encoded spatiotemporal patterns 1314_1 has a 7×7 code symbol and the second set of encoded spatiotemporal patterns 1314_2 has a 12×7 code symbol. In some embodiments, the amount of data encoded for a given pattern is smaller. In FIG. 13, the spatiotemporal pattern 1314_1 is smaller than spatiotemporal pattern 1314_2, hence the spatiotemporal pattern 1314_1 transmits smaller amount of data than the spatiotemporal pattern 1314_2. In some embodiments, the size of the spatiotemporal pattern (e.g., the amount of code symbols it has) on a spatiotemporal pattern may be used as header information. In some embodiments, the header information may identify the receiver for the data. For example, the spatiotemporal pattern having 7×7 code symbols may be meant for a first receiving node and the spatiotemporal pattern having 12×7 code symbols may be meant for a second receiving node. In some embodiments, the header information may indicate the level of priority for the data. For example, a spatiotemporal pattern having least amount of code symbols may have lower priority than a spatiotemporal pattern having the biggest amount of code symbols. One possible benefit of using various size spatiotemporal patterns is to allow higher priority data to be received by a given receiving node for processing, thereby allowing a sending node to dynamically adjust encoded data being processed by a given node.

In the embodiment shown in FIG. 13, the size of the code symbol on a spatiotemporal pattern may indicate the intended recipient. In one embodiment, the size of the code symbol on a spatiotemporal pattern may indicate a different receiving node. For example, in FIG. 13, the size of an individual code symbol 1316_1 in the encoded spatiotemporal pattern 1314_1 is 10×10 pixels, meaning that the data is meant for a first receiving node, and the size of an individual code symbol 1316_2 is 15×15 pixels, meaning that the data encoded in 1314_2 is meant for a second receiving node. In another embodiments, the size of an individual code symbol 1316_1 could be 5×5 pixels on a display, and the size of an individual code symbol 1316_2 could be 10×10 pixels on a display. One possible advantage of using a size to identify the intended recipient is a much faster way for the receiving node to decide if the data is meant for them or if they can ignore it without the need for decoding the set of encoded spatiotemporal pattern to read the header information. This is beneficial in situations there are multiple receiving nodes recording or obtaining the encoded spatiotemporal pattern.

In some embodiments, the size may be used to indicate the level of priority for the data transmission. For example, if the size of an individual code symbol 1316_1 is small, the level of priority is normal for the data, and if the size of an individual code symbol 1316_2 is large the level of priority for the data is high. One possible advantage of using a size to indicate the level of priority for the data is to easily identify urgent data transmissions in case more than one set of encoded spatiotemporal patterns are outputted on a screen simultaneously. The first receiving node may then decode the higher level of priority set of encoded spatiotemporal patterns first before it decodes the normal level of priority set of encoded spatiotemporal patterns.

In some embodiments, the size of an individual code symbol can be adjusted based on bandwidth needs. For example, the encoded spatiotemporal pattern 1314_1 may have been adjusted to occupy a smaller size area in the display in order to accommodate other simultaneous data transmissions having higher priority.

In some embodiments, the two or more sets of encoded spatiotemporal patterns may originate from a first sending node. In some embodiments, the two or more sets of encoded spatiotemporal patterns may originate from two or more sending nodes. In some embodiments, the two or more sets of encoded spatiotemporal patterns are intended for a first receiving node. In some embodiments, the two or more sets of encoded spatiotemporal patterns are intended for two or more receiving nodes.

Figure 14A:
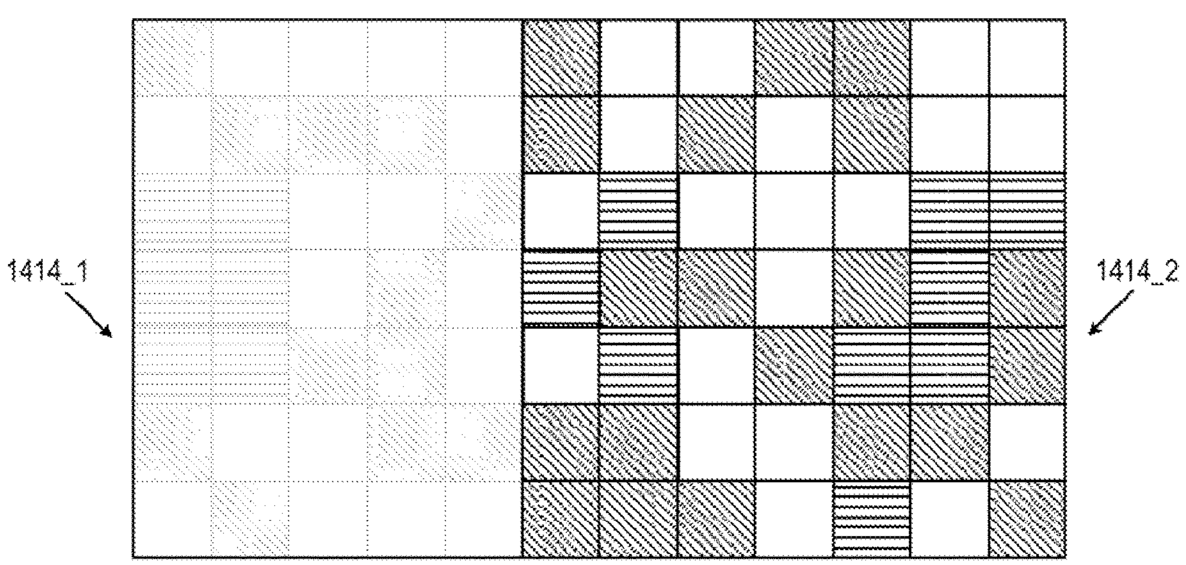
FIGS. 14A-14B illustrate two sets of encoded spatiotemporal patterns displayed at different times, according to at least one embodiment.
Figure 14B:
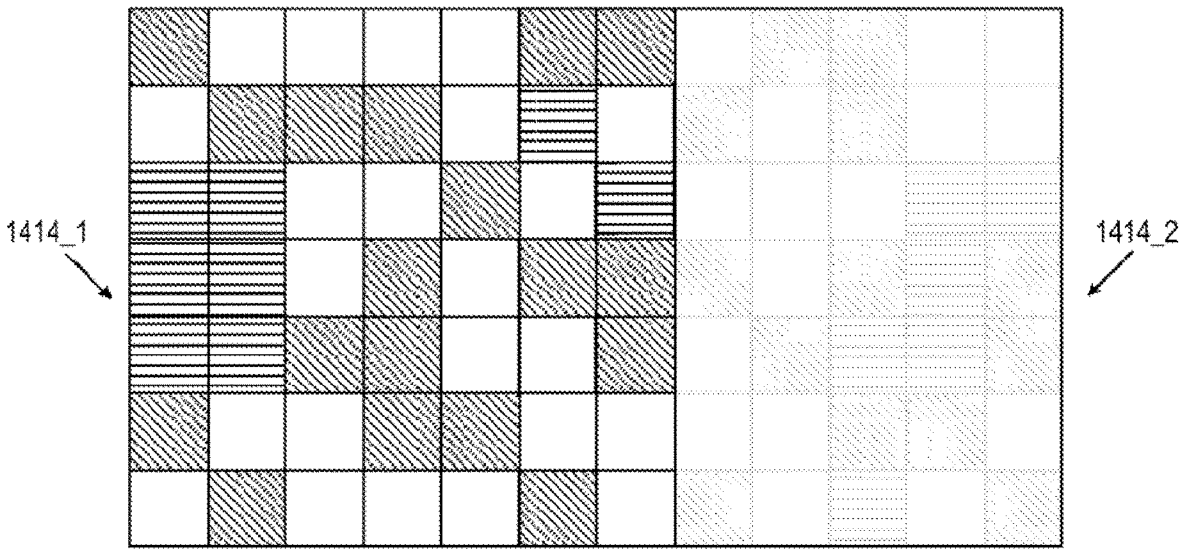

FIGS. 14A and 14B are an example, according to at least one embodiment, of two sets of encoded spatiotemporal patterns displayed at different times. The first set of encoded spatiotemporal patterns 1414_1 has a 7×7 code symbol and the second set of encoded spatiotemporal patterns 1414_2 has a 7×7 code symbol. In some embodiments, the transmission time of an encoded spatiotemporal pattern may be used as header information. For example, the header information may identify the receiver for the data.

In the embodiments shown in FIGS. 14A and 14B, the timing of which of the two encoded spatiotemporal patterns, 1414_1 and 1414_2, is visible on the display at a specific time, t=0 (FIG. 14A) and t=1 (FIG. 14B) may indicate the intended recipient. For example, in FIG. 14A, at t=0, the encoded spatiotemporal pattern 1414_1 is not visible while the encoded spatiotemporal pattern 1414_2 is visible, meaning that the data encoded into the set of encoded spatiotemporal pattern 1414_2 is meant for a first receiving node, but the data encoded into the set of encoded spatiotemporal pattern 1414_1 is not meant for the first receiving node.

In FIG. 14B, at t=1, the encoded spatiotemporal pattern 1414_1 is visible while the encoded spatiotemporal pattern 1414_2 is not visible, meaning that the data encoded into the set of encoded spatiotemporal pattern 1414_1 is meant for a second receiving node, but the data encoded into the set of encoded spatiotemporal pattern 1414_2 is not meant for the second receiving node. One possible advantage of using a timing to identify the intended recipient is a much faster way for the receiving node to decide if the data is meant for them or if they can ignore it without the need for decoding the set of encoded spatiotemporal pattern to read the header information. This is beneficial in situations there are multiple receiving nodes recording or obtaining the encoded spatiotemporal pattern.

In some embodiments, the timing of transmission is synchronized between a sending and receiving node by synchronizing the internal clocks of a sending node and a receiving node or by mutual synchronization to a third clock. In some embodiments, the timing of the transmission is initiated by using a marker, such as a starting pattern displayed before the transmission is started, or by node population phase-locking to a series of equally timed clock signals or signal oscillations with pre-determined maximum number of acceptable missed signal cycles before retry or error.

In some embodiments, the two or more sets of encoded spatiotemporal patterns may originate from a first sending node. In some embodiments, the two or more sets of encoded spatiotemporal patterns may originate from two or more sending nodes. In some embodiments, the two or more sets of encoded spatiotemporal patterns are intended for a first receiving node. In some embodiments, the two or more sets of encoded spatiotemporal patterns are intended for two or more receiving nodes.

In some embodiments, if images are captured more quickly than the images are displayed, then t=0, 1, etc. may be determined by the location of the displayed pattern. For example, information may move (e.g., to the right) a distance (e.g., a couple pixels) for each new frame to indicate the passage of time.

Figure 15:
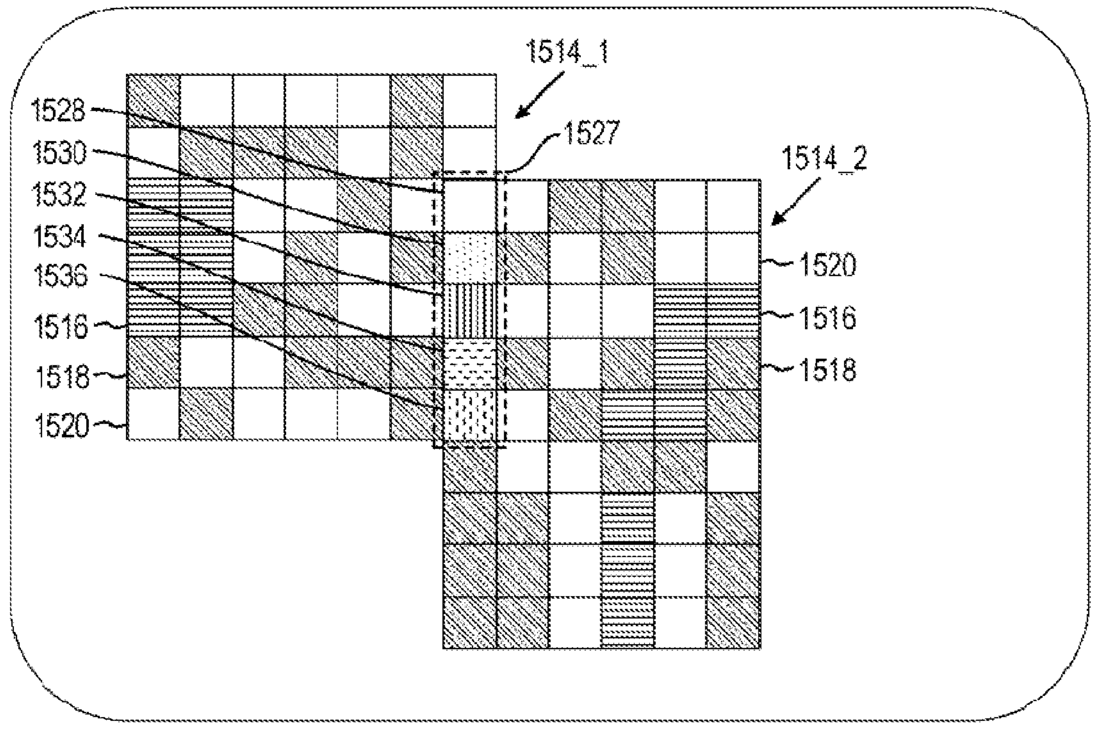
FIG. 15 illustrates two sets of encoded spatiotemporal patterns that partially overlap, according to at least one embodiment.

FIG. 15 is an example, according to at least one embodiment, of two sets of encoded spatiotemporal patterns that partially overlap. In the embodiment shown in FIG. 15, the first set of an encoded spatiotemporal pattern 1514_1 has 7×7 code symbols and the second set of an encoded spatiotemporal pattern 1514_2 has 6×9 code symbols. The first set of an encoded spatiotemporal pattern 1514_1 and the second set of an encoded spatiotemporal pattern 1514_2 partially overlap as shown by the dashed rectangle 1527. This overlap in data transmission is generally called multiplexing. Spatiotemporal multiplexing in this context is used for describing how more than one streams of encoded spatiotemporal patterns (e.g., two set of data) may be transmitted simultaneously over the spatiotemporal communication channel.

Each of the two encoded spatiotemporal patterns, 1514_1 and 1514_2, includes three different colors; a first color 1516, a second color 1518, and a third color 1520. For example, in FIG. 15, the first color 1516 may be red, the second color 1518 may be green, and the third color 1520 may be blue. In the embodiment shown in FIG. 15, five of the code symbols (e.g., code symbols 1528, 1530, 1532, 1534, 1536) overlap each other. Code symbol 1528 is the same color as code symbol 1520, hence, the decoder will be able to conclude that the code symbol 1528 on both the 1514_1 set and the 1514_2 set of encoded spatiotemporal patterns should be the same color as 1520. Code symbol 1530 has a fourth color, which is different than the three known colors (e.g., colors 1516, 1518, 1520) for each encoded set of data individually. For example, the encoder may use the fourth color 1530 to encode a combination of the first color 1516 on the first set of the encoded spatiotemporal pattern 1514_1 and a second color 1518 on the second set of the encoded spatiotemporal pattern 1514_2. Code symbol 1532 has a fifth color, which is different than the three known colors (e.g., colors 1516, 1518, 1520). For example, the encoder may use the fifth color to encode a combination of the first color 1516 on the first set of the encoded spatiotemporal pattern 1514_1 and the third color 1530 on the second set of the encoded spatiotemporal pattern 1514_2. Code symbol 1534 has a sixth color, which is different than the three known colors (e.g., colors 1516, 1518, 1520). For example, the encoder may use the sixth color to encode a combination of the second color 1518 on the first set of the encoded spatiotemporal pattern 1514_1 and the first color 1516 on the second set of the encoded spatiotemporal pattern 1514_2. Code symbol 1536 has a seventh color, which is different than the three known colors (e.g., colors 1516, 1518, 1520). For example, the encoder may use the seventh color to encode a combination of the third color 1530 on the first set of the encoded spatiotemporal pattern 1514_1 and the first color 1516 on the second set of the encoded spatiotemporal pattern 1514_2. A table of one possible combination of colors for encoding and decoding is provided below:

| Color of the code symbol on first set of encoded spatiotemporal pattern | Color of the code symbol on second set of encoded spatiotemporal pattern | Color on overlap |
|---|---|---|
| red | red | red |
| red | green | white |
| red | blue | yellow |
| green | red | black |
| green | green | green |
| green | blue | orange |
| blue | red | purple |
| blue | green | brown |
| blue | blue | blue |

One possible advantage of overlapping two or more sets of encoded spatiotemporal patterns is that more sets of encoded spatiotemporal patterns may be displayed simultaneously in a smaller display area than if each set is displayed separately. Hence, this may increase the bandwidth of the communication channel. This overlapping of two or more sets of encoded spatiotemporal patterns may be called spatiotemporal multiplexing. In some embodiments, the two or more sets of encoded spatiotemporal patterns overlap completely.

In some embodiments, the two or more at least partially overlapping sets of encoded spatiotemporal patterns may originate from a first sending node. In some embodiments, the two or more at least partially overlapping sets of encoded spatiotemporal patterns may originate from two or more sending nodes. In some embodiments, the two or more at least partially overlapping sets of encoded spatiotemporal patterns are intended for a first receiving node. In some embodiments, the two or more at least partially overlapping sets of encoded spatiotemporal patterns are intended for two or more receiving nodes.

Figure 16:
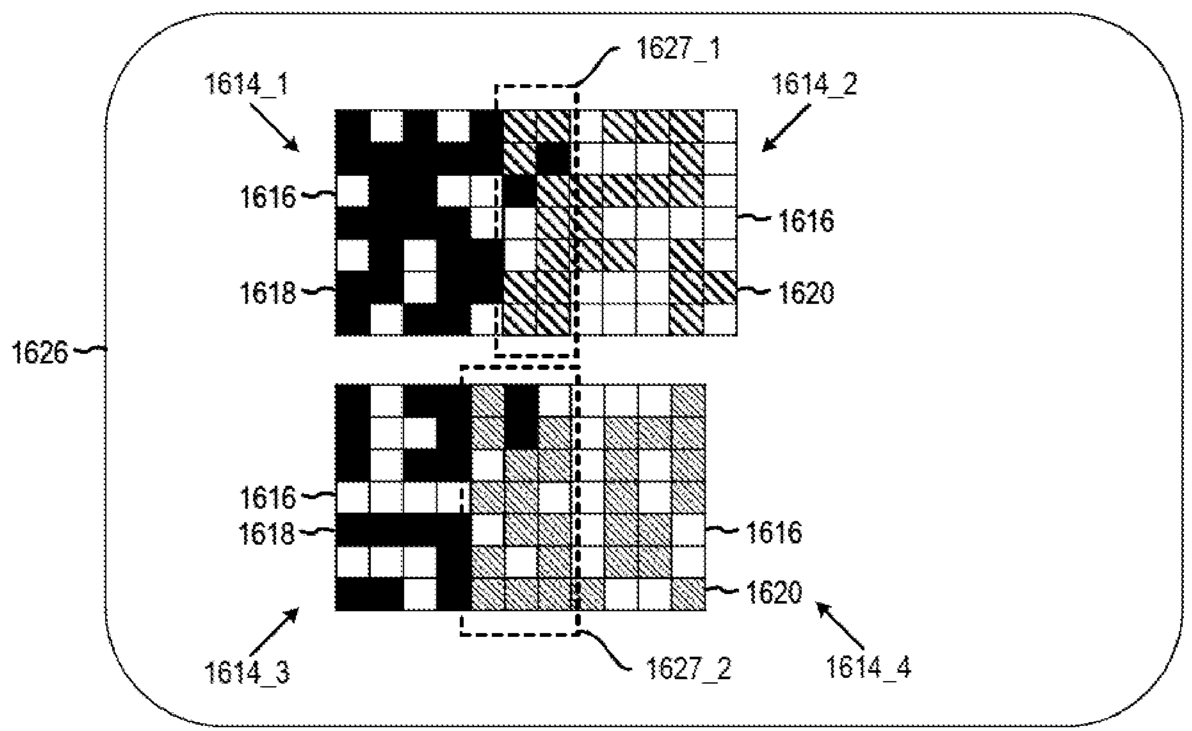
FIG. 16 illustrates four sets of encoded spatiotemporal patterns that partially overlap, according to at least one embodiment.

FIG. 16 is an example, according to at least one embodiment, of two or more sets of encoded spatiotemporal patterns that partially overlap. FIG. 16 shows four different data sets that have been encoded to spatiotemporal patterns (16141, 1614_2, 16143, 1614_4). The first spatiotemporal pattern 1614_1 consists of a first color 1616 and a second color 1618, the second spatiotemporal pattern 1614_2 consists of a first color 1616 and a third color 1620, the third spatiotemporal pattern 1614_3 consists of a first color 1616 and a second color 1618, and the fourth spatiotemporal pattern 1614_4 consists of a first color 1616 and a fourth color 1630. For example, the first color 1616 may be 'OFF' (i.e., no color is displayed in that area), the second color 1618 may be red, the third color 1620 may be green, and the fourth color 1630 may be blue (e.g., pattern 1614_1 consists of the color red and 'OFF', 1614_2 consists of the color green and 'OFF', 1614_3 consists of the color red and 'OFF', and 1614_4 consists of the color blue and 'OFF'). In some embodiments, a first sending node may transmit all four data sets. In some embodiments, a first sending node may transmit one or more of the data sets and a second sending node may transmit one or more of the data sets. In some embodiments, each of the four data sets are intended to a separate receiving node. In some embodiments, all four data sets are intended to one and the same receiving node.

In the embodiment shown in FIG. 16, the first spatiotemporal pattern 1614_1 and the second spatiotemporal pattern 1614_2 partially overlap, as demonstrated by a dashed rectangle 1627_1. Similarly, the third spatiotemporal pattern 1614_3 and the fourth spatiotemporal pattern 1614_4 partially overlap, as demonstrated by a dashed rectangle 1627_2. In one embodiment, each overlapping code symbol will reflect both colors of the code symbols on each of the spatiotemporal patterns. For example, if the overlapping code symbol from spatiotemporal pattern 1614_3 is red and the overlapping code symbol from spatiotemporal pattern 1614_3 is blue, then the reflected code symbol will reflect both red and blue. For the human eye, the code symbol reflecting both the red and the blue light may seem as purple, but an obtaining device will be able to detect both red and blue light from the same code symbol. Since the 1614_3 spatiotemporal pattern includes red color and the 1614_4 spatiotemporal pattern includes blue color, the encoder will be able to decode the overlapping code symbols correctly. One possible benefit of overlapping two or more spatiotemporal patterns is to provide flexibility on bandwidth, as partial overlapping provides more free space to the display or screen to output even more spatiotemporal patterns.

In some embodiments, two or more spatiotemporal patterns may overlap at least partially. In some embodiments, two or more spatiotemporal patterns may overlap completely. In some embodiments, all outputted spatiotemporal patterns may overlap with at least one other spatiotemporal pattern. In some embodiments, only some of the outputted spatiotemporal patterns may overlap.

In the embodiment shown in FIG. 16, each of the four spatiotemporal patterns includes two different colors. In some embodiments, a different color may indicate a different receiving node. For example, the second color 1618 is red, so the spatiotemporal patterns 1614_1 and 1614_3 are meant for a first receiving node, the third color 1620 is green, so the spatiotemporal pattern 1614_2 is meant for a second receiving node, and the fourth color 1630 is blue, so the spatiotemporal pattern 1614_4 is meant for a third receiving node. One possible advantage of using a color to identify the intended recipient is to provide a much faster way for the receiving node to decide if the data is meant for it or if it can ignore at least a portion of the data without the need for decoding the set of encoded spatiotemporal pattern to read potential header information. This is beneficial in situations where multiple receiving nodes obtain at least a portion of the set of the encoded spatiotemporal patterns. For example, when the first receiving node receives the spatiotemporal patterns, it only needs to decode 1614_1 and 1614_3 as only those are intended for the first receiving node. Similarly, when the second receiving node receives the spatiotemporal patterns, it only needs to decode 1614_2 as only that one is intended for the second receiving node, and similarly the third receiving node only needs to decode 1614_4.

In some embodiments, color may be used to indicate the level of priority for the data transmission (e.g., at least a portion of data transmission of the entirety of the data being sent). For example, when the color is blue, the level of priority is normal for the data, if the color is red, the level of priority for the data is high, and if the color is green, the level of priority for the data is low. One possible advantage of using a color to indicate the level of priority for the data is to easily identify urgent data transmissions in case more than one set of encoded spatiotemporal patterns are output by a display device (e.g., a projection screen, or a monitor) simultaneously. The receiving node may then decode the higher level of priority set of encoded spatiotemporal patterns first before it decodes the normal level of priority set of encoded spatiotemporal patterns. For example, in FIG. 16, the receiving node would be able to detect that 1614_1 and 1614_3 have higher priority and should be decoded first, while 1614_4 has a low priority and should be decoded last.

Figure 17A:
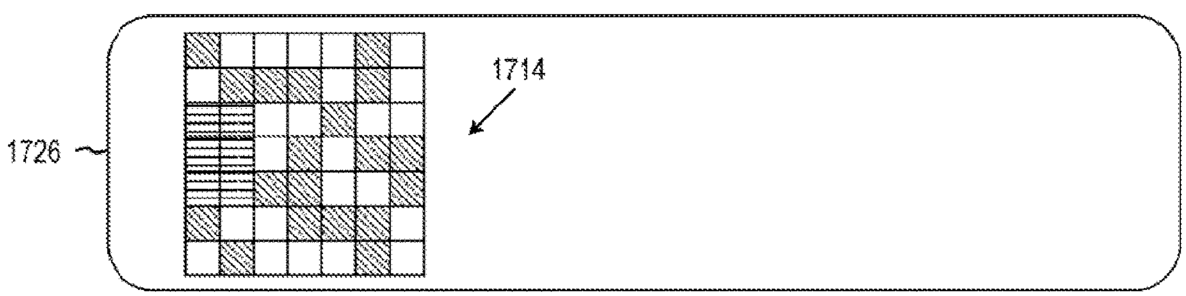
FIGS. 17A-17C illustrate a set of encoded spatiotemporal patterns moving in space relative to time, according to at least one embodiment.
Figure 17B:
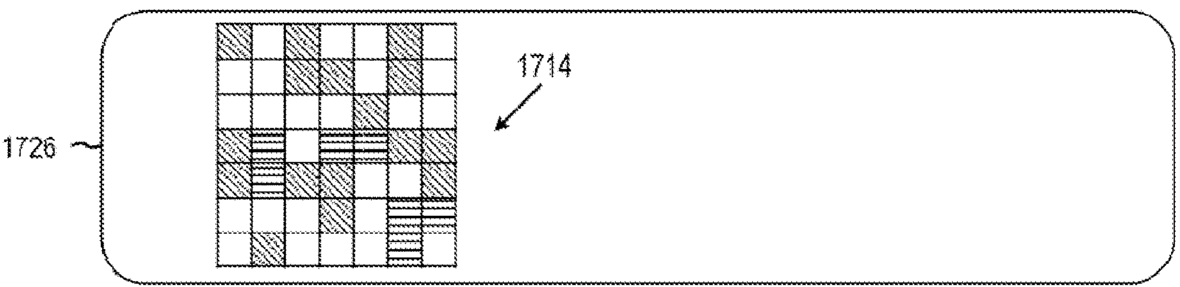
Figure 17C:
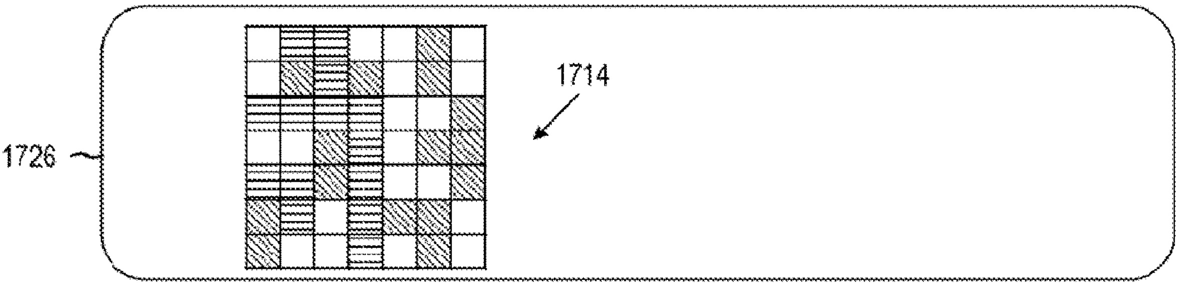

FIGS. 17A, 17B and 17C are an example, according to at least one embodiment, of a set of encoded spatiotemporal patterns moving in space relative to time. In some embodiments, the location of the spatiotemporal pattern relative to the screen indicates the packet sequence. In some embodiments each encoded spatiotemporal pattern in the set of an encoded spatiotemporal pattern may be displayed in a unique location on the display. For example, a first encoded spatiotemporal pattern in the set of spatiotemporal patterns is displayed in a first location, and a second encoded spatiotemporal pattern in the set of spatiotemporal patterns is displayed in a second location, wherein the first location and the second location are different. In some embodiments, each encoded spatiotemporal pattern in the set of encoded spatiotemporal patterns is displayed in a different location than any of the other encoded spatiotemporal patterns in the set of encoded spatiotemporal patterns. In some embodiments, every $n^{th}$ spatiotemporal pattern in the set of an encoded spatiotemporal pattern may share a same location, while each of the 1 to n−1 spatiotemporal patterns in the set of encoded spatiotemporal patterns have a unique location on the display.

In the embodiment shown in FIG. 17A at t=0, a first encoded spatiotemporal pattern in a set of encoded spatiotemporal patterns 1714 has a first location in relation to the display 1726. As shown in FIG. 17B at t=1, a second encoded spatiotemporal pattern in the set of an encoded spatiotemporal pattern 1714 has a second location in relation to the display 1726, wherein the first location and the second location are different. As shown in FIG. 17C at t=2, a third encoded spatiotemporal pattern in the set of an encoded spatiotemporal pattern 1714 has a third location in relation to the display 1726, wherein the first location, the second location, and the third location are all different. If the receiving node receives a first encoded spatiotemporal pattern and the third encoded spatiotemporal pattern in the set of encoded spatiotemporal patterns 1714, the receiving node can detect that they have missed the second encoded spatiotemporal pattern in the set of an encoded spatiotemporal pattern 1714.

In some embodiments, the encoded spatiotemporal patterns may move from a first position to a second position relative to time. In some embodiments, the encoded spatiotemporal patterns may move from the first position to the second position (left to right, right to left, up and down, down an up, top left to bottom right, bottom left to top right, etc.) relative to time. In some embodiments, the encoded spatiotemporal patterns may move seemingly random relative to time. As long as the decoder knows the intended movement of each encoded spatiotemporal pattern in relation to time, it can detect if they have missed one or more of the encoded spatiotemporal patterns. In some embodiments, the encoded spatiotemporal patterns may move in a predetermined pattern in space relative to time. In some embodiments, encoding the data to a set of encoded spatiotemporal patterns includes two or more of the different encoding mechanisms described in connection with FIG. 5-17.

Figure 18:
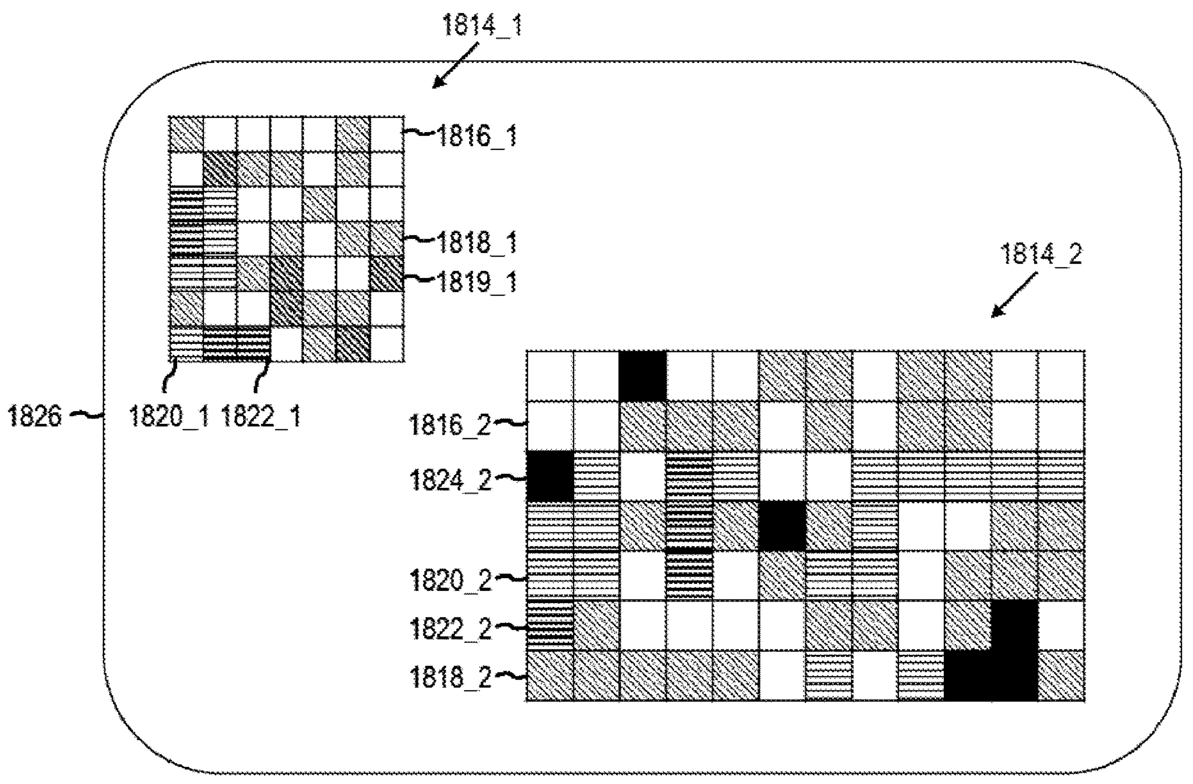
FIG. 18 illustrates two sets of encoded spatiotemporal patterns having a different location, shape, size and at least three different colors, two different intensity levels, and both visible and near-visible light, according to at least one embodiment.

FIG. 18 is an example, according to at least one embodiment, of two sets of encoded spatiotemporal patterns having a different location, shape, size, at least three different colors, two different intensity levels, and both visible and near-visible light. The first set of encoded spatiotemporal patterns 1814_1 has a 7×7 code symbol and the second set of encoded spatiotemporal patterns 1814_2 has a 12×7 code symbol. Each code symbol in the first set of encoded spatiotemporal patterns 1814_1 occupies a smaller size on a display or a projector screen than each code symbol in the second set of encoded spatiotemporal patterns 1814_2 occupies on the same display device.

The first set of encoded spatiotemporal patterns 18141 includes a first color in a first intensity level 1816_1, a second color in a first intensity level 1818_1, a second color in a second intensity level 1819_1, a third color in a first intensity level 1820_1, and a third color in a second intensity level 1822_1. The second set of encoded spatiotemporal patterns 18142 includes a first color in a first intensity level 1816_2, a second color in a first intensity level 1818_2, a third color in a first intensity level 1820_2, a third color in a second intensity level 1822_2, and a near-visible light 1824_2.

It should be understood that any combination of the different encoding mechanisms described in connection with FIGS. 5-14 may be used to encode and/or decode data. It should be noted that each set of encoded spatiotemporal patterns may use different combinations for encoding the data, for showing the intended recipient, for showing priority for the data transmission, other indications, or combinations thereof. For example, in the embodiment shown in FIG. 18, the second set of encoded spatiotemporal pattern 18142 is not using a second color in the second intensity level and the first set of encoded spatiotemporal pattern 1814_1 is not using the near-visible light.

Figure 19A:
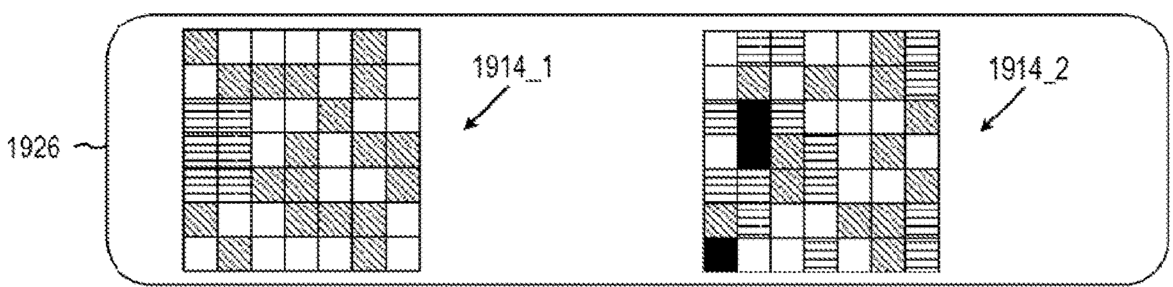
FIGS. 19A-19C illustrate two sets of encoded spatiotemporal patterns, including two or more different encoding mechanisms, according to at least one embodiment.
Figure 19B:
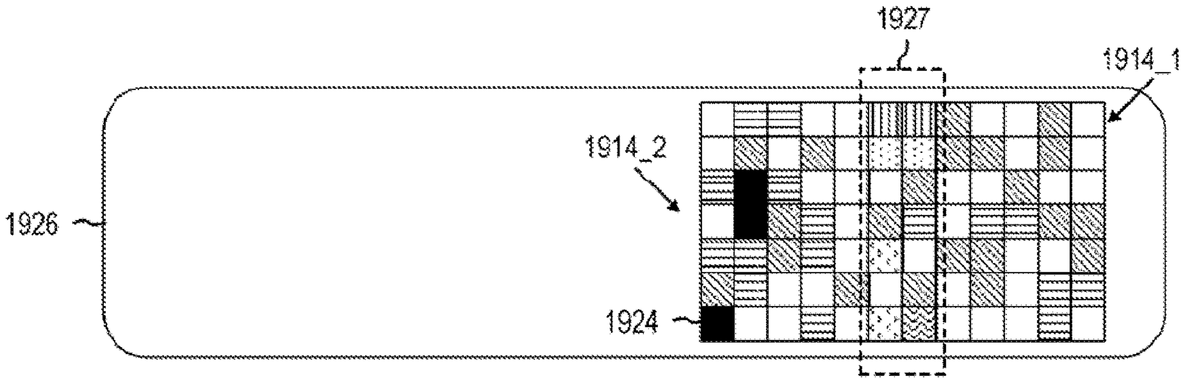
Figure 19C:
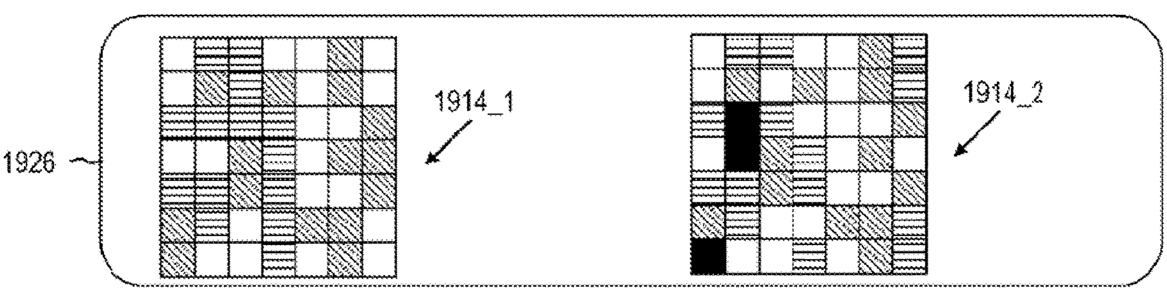

FIG. 19A-19C illustrate another example, according to at least one embodiment, of encoding data to a set of encoded spatiotemporal patterns, including two or more of the different encoding mechanisms described in connection with FIGS. 5-11. The first set of encoded spatiotemporal patterns 1914_1 has a 7×7 code symbol with three different colors, and the second set of encoded spatiotemporal patterns 1914_2 has a 7×7 code symbol with three different visible light colors and near-visible light 1924. The first set of encoded spatiotemporal patterns 1914_1 moves in space relative to time, while the second set of encoded spatiotemporal patterns 1914_2 has a fixed location. In the embodiment shown in FIGS. 19A-19C, every other location of the first set of encoded spatiotemporal patterns 1914_1 is on the left side of the display 1926, while every other location is on the right side of the display 1926. At t=1, the first set of encoded spatiotemporal patterns 1914_1 and the second set of encoded spatiotemporal patterns 1914_2 overlap partially, as shown by the dashed rectangle 1927. The colors at the overlapping area could be any of the examples provided in connection with FIG. 15.

Figure 20A:
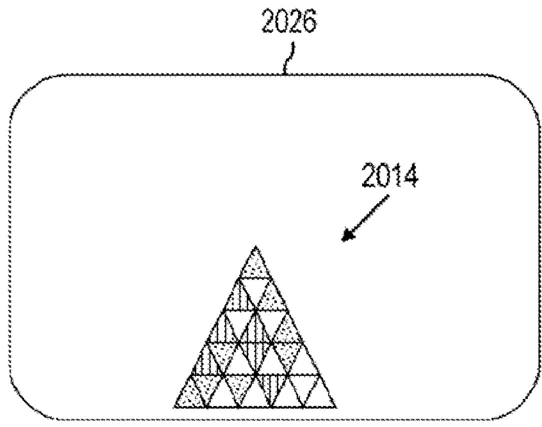
FIGS. 20A-20D illustrate a set of encoded spatiotemporal patterns moving in space relative to time
Figure 20B:
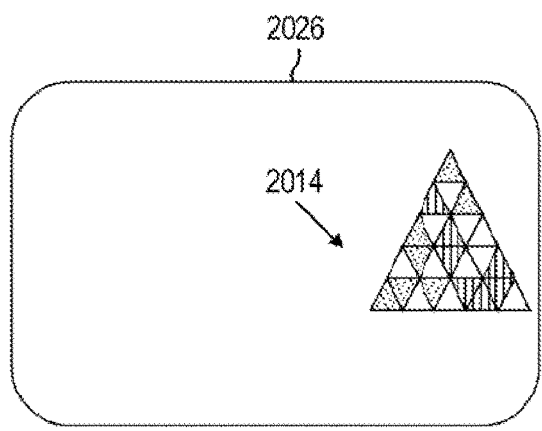
Figure 20C:
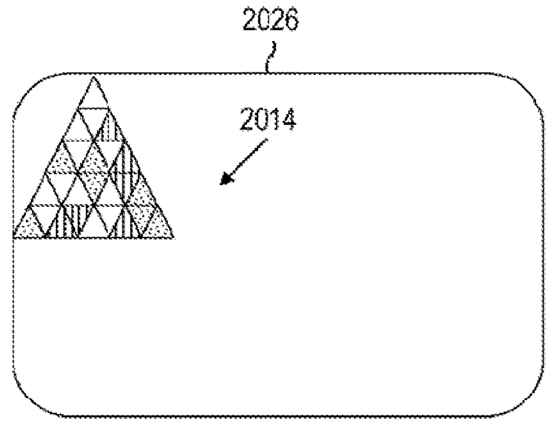
Figure 20D:
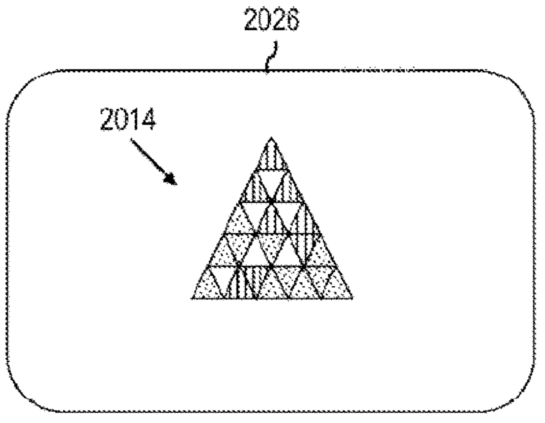

FIGS. 20A-20D illustrate an example, according to at least one embodiment, of encoding data to a set of encoded spatiotemporal patterns, moving in space relative to time. In the embodiment shown in FIG. 20A at t=0, a first encoded spatiotemporal pattern, shaped as a triangle, in the set of encoded spatiotemporal patterns 2014 has a first location in relation to the display 2026. As shown in FIG. 20B at t=1, a second encoded spatiotemporal pattern in the set of an encoded spatiotemporal pattern 2014 has a second location in relation to the display 2026, wherein the first location and the second location are different. As shown in FIG. 20C at t=2, a third encoded spatiotemporal pattern in the set of an encoded spatiotemporal pattern 2014 has a third location in relation to the display 2026, wherein the third location is different than any of the preceding locations. As shown in FIG. 20D at t=3, a fourth encoded spatiotemporal pattern in the set of an encoded spatiotemporal pattern 2014 has a fourth location in relation to the display 2026, wherein the fourth location is different than any of the preceding locations. In the embodiment shown in FIGS. 20A-20D, the encoded spatiotemporal pattern seems to move randomly between locations at each time interval. As long as the decoder will know the intended movement of each encoded spatiotemporal pattern in relation to time, the decoder can detect if they have missed one or more of the encoded spatiotemporal patterns. For example, if the decoder receives the encoded spatiotemporal patterns shown in FIGS. 20A, 20B, and 20D, the decoder can detect that they have missed the pattern shown in 20C as the third encoded spatiotemporal pattern should have been at the top left corner, but instead the third pattern received (FIG. 20D) is at the middle of the screen, which they know the fourth spatiotemporal pattern should be at.

The present disclosure includes a number of practical applications that provide benefits and/or solve problems associated with methods for transmitting data via free space spatiotemporal patterns. For example, bandwidth flexibility may be achieved by changing one or more of the number of pixels, the number of colors, the levels of intensity, and the frequency within one data frame. In another example, architectural flexibility may be achieved when a single screen/display can be seen by several receiving nodes, or when a single transmitting node can transmit to several screens/displays, allowing a single node to choose to be connected to various other nodes.

Figure 21:
FIG. 21 is a thread diagram illustrating a method of transmitting data in a datacenter, according to at least one embodiment.
Figure 21:
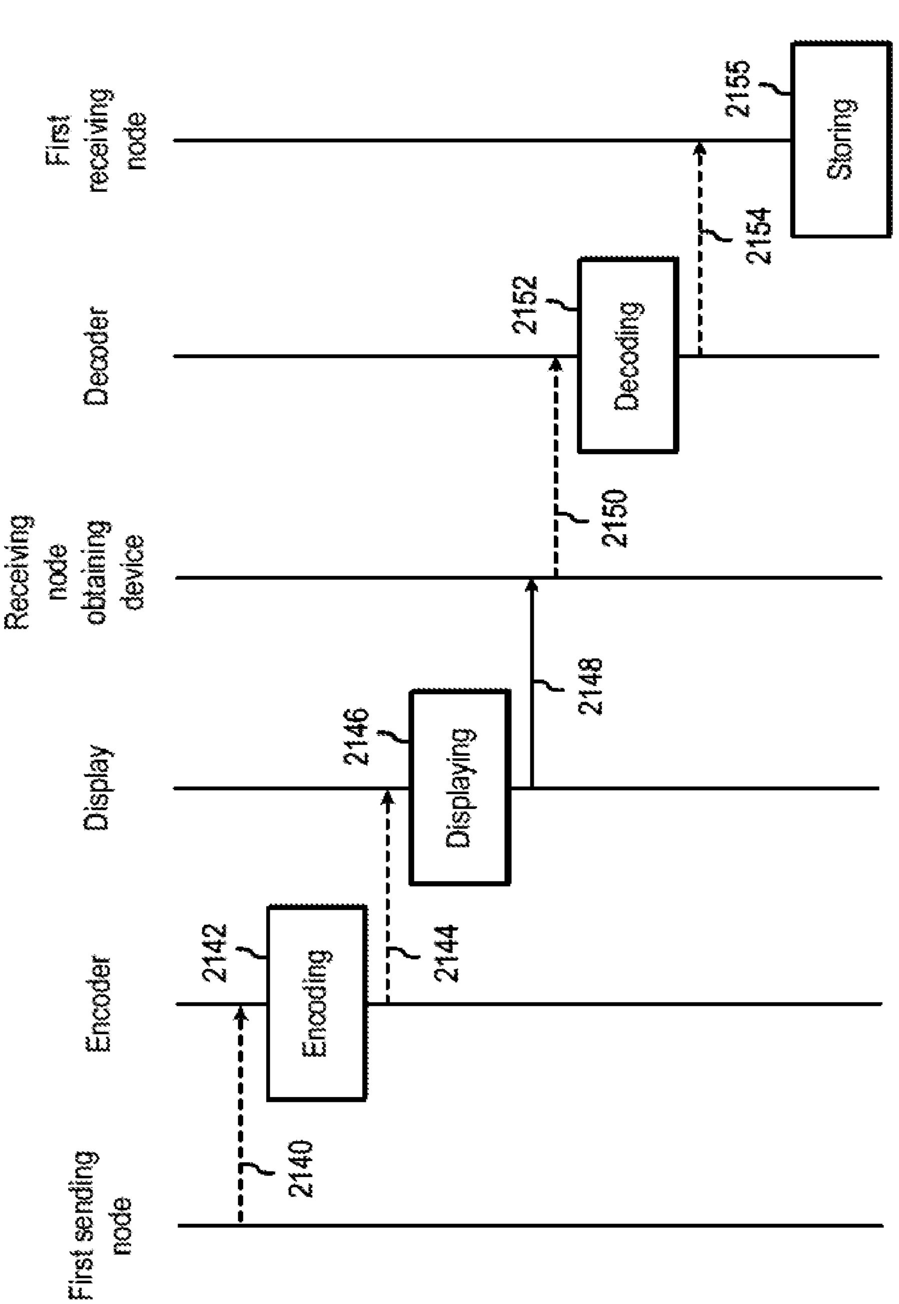

FIG. 21 is a thread diagram illustrating a method 2100 of transmitting data in a datacenter. Various optional steps have been provided in this description. In some embodiments, one or more or all optional steps are to be included. In some embodiments, no optional steps are included. The method 2100 may include transmitting data to an encoder at optional stage 2140. The data may be of a particular data type. For example, the data type can be numeric, alphanumeric, binary, kanji, any other type of data, or combinations thereof. In some embodiments, transmitting data to an encoder includes transmitting the data from a first sending node (as described in more detail below). In some embodiments, the data includes data and header information. For example, it may include one or more of data, destination information, sender information, timing, error correction code, and any other information typically stored in a packet header. In some embodiments, the data includes only the data without any header information.

In some embodiments, the first sending node may be a server including virtual machines, as described above. In some embodiments, one or more applications may reside on the first sending node. For example, the application transmitting the data may be a word processor, a media player, an email application, an accounting software, or any other type of application that is designed to carry out specific tasks. In some embodiments, the first sending node may be a storage device. For example, a storage device may include an HDD, SSD, optical storage devices, any other type of non-volatile storage device for storing data for long- or short-term retention, or combinations thereof. In some embodiments, obtaining data may include obtaining data from a memory device residing at the first sending node. For example, a memory device may be a ROM, RAM, DRAM, SRAM, or other suitable volatile memory device for storing data temporarily.

In some embodiments, transmitting data to be encoded includes transmitting two different sets of data. For example, a first set of data and a second set of data may be transmitted from the first sending node to the encoder.

As shown in FIG. 21, the method 2100 includes encoding a data to a set of spatiotemporal patterns at stage 2142. The spatiotemporal pattern may be a pattern observed in both space and time. In some embodiments, the spatiotemporal pattern may be formed of visible light. For example, a light having a wavelength from 400 to 700 nanometers. In some embodiments, the spatiotemporal pattern may be formed of near-visible light. For example, a light having a wavelength from 780 nanometers to 1 mm (Infrared) or light having a wavelength from 100 to 400 nanometers (ultraviolet). In some embodiments, the spatiotemporal pattern may be formed of other spatial signals, also called as non-visible signals. For example, non-visible spatial signals produced as spatiotemporal patterns may be formed by electromagnetic waves, microwaves, and/or sound waves.

The set of encoded spatiotemporal patterns may include one or more spatiotemporal patterns. In some embodiments, each spatiotemporal pattern in the set of encoded spatiotemporal patterns is a data packet, wherein each spatiotemporal pattern is transmitted in a sequence.

Encoding the data to a set of encoded spatiotemporal patterns may include encoding a first and second set of data to a first set and a second set of encoded spatiotemporal patterns (as shown in FIG. 1E at stage 104E) and/or the encoded spatiotemporal patterns may include at least three colors (as shown in FIG. 1B at stage 104B), a first level of intensity and a second level of intensity (as shown in FIG. 1C at stage 104C), visible and near-visible light (as shown in FIG. 1D at stage 104D), or combinations thereof. In some embodiments, the set (or first and second set) of encoded spatiotemporal patterns include two colors. In some embodiments, the set (or first and second set) of encoded spatiotemporal patterns include one color.

In some embodiments, the data is not serialized before it is encoded, instead the data can be sent as non-serialized data in a matrix form. One possible benefit of transmitting non-serialized data is that there is no need to go through multiple physical or software component layers between applications, saving time on data transmission. Another possible benefit of transmitting non-serialized data is that data corruption, data theft, and data throttling possibilities may be minimized.

In some embodiments, the encoding of data to a set of encoded spatiotemporal patterns includes encoding the data into code symbols. The code symbols may be organized into the encoded spatiotemporal patterns. For example, an encoded spatiotemporal pattern may include 7×7 code symbols, as previously discussed in connection with FIG. 5. In another example, an encoded spatiotemporal pattern may include 6×9 code symbols, as previously discussed in connection with FIG. 11. In a further example, an encoded spatiotemporal pattern may be otherwise organized, including encoding into shapes that do not have straight edges or typical geometric shapes.

In some embodiments, encoding the data into code symbols may further include a step of encoding the data into a bit stream, and further encoding the bit stream into code symbols. A bit stream typically includes one or more bits that may have a value of, for example, 1 or 0.

In some embodiments, spatiotemporal patterns may include one or more colors. In some embodiments, the spatiotemporal patterns may include one or more colors producible by visible light (e.g., light having a wavelength from 400 to 700 nanometers). In some embodiments, first color may be a color 'ON', and second color may be a color 'OFF'. For example, in a two-color system, the first color may be white (color 'ON'), and the second color may be black (color 'OFF'). In another example, in a two-color system, the first color may be red (color 'ON') and the second color may be green (color 'ON'). In yet another example, in a three-color system, the first color may be green ('color 'ON'), the second color may be red (color 'ON'), and the third color may be black (color 'OFF'). In yet another example, in a three-color system, the first color may be blue (color 'ON'), the second color may be red (color 'ON'), and the third color may be green (color 'ON'). In some embodiments where the set of encoded spatiotemporal patterns includes at least three colors, at least two of the at least three colors are used for encoding the data. For example, at least two of the at least three colors provide values (such as 1 and 0) that are encodable by the encoder for encoding the data.

In some embodiments where the set of encoded spatiotemporal patterns includes at least three colors, all three or more colors may be used for encoding the data. For example, instead of using a typical two-bit encoding system (1 and 0), the system could use three or more bit-indicators, where each color represents a unique bit (such as a three-color system, or a four-color system when using three or four bit-indicators, respectively). In at least one embodiment, where at least three different colors are used for encoding data, one possible benefit of using higher than two-bit encoding allows data to be encoded more efficiently and outputting the encoded data more rapidly than with a two-bit encoding system. Another possible benefit of using three or more colors is to provide flexibility on bandwidth, as the more colors used provides higher bandwidth for the data transmission.

In some embodiments where the set of encoded spatiotemporal patterns includes a first intensity level and a second intensity level, the two different intensity levels are used for encoding the data. For example, the first level of intensity and the second level of intensity provide values (such as 1 and 0) that are encodable by the encoder for encoding the data. For example, the set of encoded spatiotemporal patterns may include a red color in a first intensity level, having a value of 1, and a red color in a second intensity level, having a value of 0, as previously discussed in connection to FIG. 7.

In some embodiments, where the set of encoded spatiotemporal patterns includes a first intensity level and a second intensity level and at least two colors, the two colors are used for encoding the data. For example, a first color and a second color provide values (such as 1 and 0) that are encodable by the encoder for encoding the data. For example, the set of encoded spatiotemporal patterns may include a red color having a value of 1, and a blue color having a value of 0, as previously discussed in connection to FIG. 8.

In some embodiments, where the set of encoded spatiotemporal patterns includes both visible and near-visible light, at least two colors are used for encoding the data and the near-visible light is used as header information. For example, a first color and a second color provide values (such as 1 and 0) that are encodable by the encoder for encoding the data. For example, the set of encoded spatiotemporal patterns may include white color having a of value 1, and black color having a value of 0, as previously discussed in connection to FIG. 10.

In some embodiments where the set of encoded spatiotemporal patterns includes at least three colors, at least one of the at least three colors is used for providing header information without the need to include the header information in the encoded data itself, and at least two of the at least three different colors are used for encoding the data. For example, header information may include the recipient for the data, the sender of the data, routing information, priority level information, any other header information, or combinations thereof. In some embodiments where the set of encoded spatiotemporal patterns includes at least three colors, at least one of the at least three colors may include header information indicating the intended recipient for the data, as further discussed in connection to FIG. 5. One possible advantage of using a color to identify the intended recipient is that it provides a much faster way for the receiving node to decide if the data is meant for it or if it can ignore at least a portion of the data without the need for decoding the set of encoded spatiotemporal patterns to read the header information in the data. In some embodiments, at least one of the at least three colors may include header information indicating a level of priority for the data, as further discussed in connection to FIG. 5.

In some embodiments where the set of encoded spatiotemporal patterns include a first level of intensity and a second level of intensity, at least one intensity level is used for providing header information without the need to include the header information in the encoded data itself, and at least two colors are used for encoding the data. In some embodiments where the set of encoded spatiotemporal patterns include a first level of intensity and a second level of intensity, at least one color is used for providing header information without the need to include the header information in the encoded data itself, and the first level of intensity and the second level of intensity are used for encoding the data. For example, header information may include the recipient for the data, the sender of the data, routing information, priority level information, any other header information, or combinations thereof.

Although the header information may indicate a requirement for a use of a header, the claims are so not limited. In some embodiments, the set of encoded spatiotemporal patterns does not include header information. In some embodiments, the data to be encoded does not include a header but does include header information.

In some embodiments, at least one of the code symbols in an encoded spatiotemporal pattern may include a different level of intensity than another code symbol. For example, the different level of intensity may include header information that indicates the intended recipient of at least a portion of the data, as further discussed in connection to FIG. 6. In some embodiments, the different level of intensity may include header information that indicates a level of priority for the data, as further discussed in connection to FIG. 6.

In some embodiments, the spatiotemporal patterns may further include near-visible light patterns, such as infrared (IR) light (e.g., light having a wavelength from 780 nanometers to 1 millimeter), or ultraviolet (UV) light (e.g., light having a wavelength from 100 to 400 nanometers). In some embodiments, the use of near-visible light may indicate the intended recipient for the encoded data, as further discussed in connection to FIG. 9. In some embodiments, the use of near-visible light may indicate the level of priority for the data, as further discussed in connection to FIG. 9. In some embodiments, the near-visible light may be used for encoding the data.

In some embodiments, the encoded spatiotemporal pattern may include a shape factor. For example, the shape factor may indicate the intended recipient for the data, as further discussed in connection to FIG. 11. In another example, the shape factor may indicate the level of priority for the data, as further discussed in connection to FIG. 11. In a further example, the shape factor may be used for encoding the data.

In some embodiments, the encoded spatiotemporal pattern may include a location factor. For example, the location factor may indicate the intended recipient for the data, as further discussed in connection to FIG. 11. In another example, the location factor may indicate the level of priority for the data, as further discussed in connection to FIG. 11. In some embodiments, the encoded spatiotemporal pattern may include a size factor, as further discussed in connection with FIG. 13. In a further example, the size factor may be used for encoding the data. One possible benefit of using a different size of a spatiotemporal pattern is to provide flexibility on bandwidth, as using bigger size spatiotemporal pattern provides higher bandwidth for the data transmission.

In some embodiments, the encoded spatiotemporal pattern may include a timing factor, as further discussed in connection with FIGS. 14A-14B. For example, the timing factor may indicate the intended recipient for the data, as further discussed in connection to FIGS. 14A-14B. In some embodiments, the encoded spatiotemporal patterns may move in space relative to time, as further discussed in connection with FIG. 17A-17C.

The method 2100 may include transmitting the set of encoded spatiotemporal patterns to a display at optional stage 2144. For example, the set of encoded spatiotemporal patterns may be transmitted to the display wirelessly, via a cable or via fiber.

The method 2100 then includes displaying the set of encoded spatiotemporal patterns at stage 2146. In some embodiments, the method 2100 includes displaying the first and the second set of encoded spatiotemporal patterns at stage 2146.

In some embodiments, the set of encoded spatiotemporal patterns may be displayed by at least one device able to display, reflect, or pass and reflect light. For example, a display device able to reflect light may be a projector screen, and a display device able to pass and reflect light may be a rear projecting screen. Furthermore, a display device able to display light may be a computer screen, a TV monitor, or any other display device able to display light. In some embodiments, the set of encoded spatiotemporal patterns may be displayed by a display device that is not optimized for human vision. For example, as technology improves, spatiotemporal patterns may be displayed by a display device capable of displaying microwaves, infrared, ultraviolet, x-rays, gamma rays or any other electromagnetic wave.

One limit of a display device able to display or projector able to project is the device refresh rate. A typical TVs refresh rate is between 60-120 Hz, while a projector may reach 120-240 Hz. Gaming monitors typically need to have high refresh rate, some reaching 360 Hz. Currently, the highest non-commercially available known experimental monitor has a refresh rate of 10 kHz, but it is expected that these rates will increase in the future, as technology improves. One possible advantage of having a higher refresh rate on at least one embodiment of a display device, is that more data may be output faster and may therefore increase the bandwidth of the communication channel.

In some embodiments, displaying the set of encoded spatiotemporal patterns further includes displaying at least a portion of the set of encoded patterns to a display device with a two-way screen. A two-way screen, such as a projector screen, enables information transmission both away from the sending projector and the sending node, and back at the sending node and the associated obtaining device as further discussed in connection to FIG. 4. One possible advantage of using two-way screens is that it enables the sending node to verify that the data transmission was sent successfully (e.g., without any corruption, overlap with other transmission, or any other aberrations). In some embodiments, a sending node may observe from the two-way screen that there is extra bandwidth available, in the form of blank screen space, and expand its transmission size to increase transmission rate.

In some embodiments, the projector screen is a rear projection screen, wherein the projected image is viewable on both sides of the screen. The rear projector screen can both reflect the light and pass the light. The reflection of the light occurs on the same side of the screen where the projector is located, whereas when the screen passes the light, the image is viewable on the opposite side of the screen. This increases the receiving node pool. One possible advantage of using a rear projection screens is that it enables the sending node to verify that the data transmission was sent successfully (e.g., without any corruption, overlap with other transmission, or any other aberrations). Another possible advantage of using rear projection screen is that it may enable a larger pool of sending nodes and receiving nodes to send and receive data. For example, data may be transmitted from the sending node to a receiving node, wherein the receiving node may be anywhere behind, adjacent, or in front of the sending node. In some embodiments, a sending node may observe from the rear projection screen that there is extra bandwidth available, in the form of blank screen space, and expand its transmission size to increase transmission rate.

In some embodiments, displaying the set of encoded spatiotemporal patterns further includes displaying the outputted set of encoded spatiotemporal patterns on two or more display devices, as previously discussed in connection with FIG. 3A-3B.

In some embodiments, two or more sets of encoded spatiotemporal patterns are displayed. In some embodiments, the two or more sets of encoded spatiotemporal patterns overlap at least partially, as previously discussed in connection with FIG. 15.

As shown in FIG. 21, the method 2100 includes spatiotemporally obtaining the set (or a first set and a second set) of encoded spatiotemporal patterns (e.g., the set of encoded spatiotemporal patterns encoded at stage 2142) at stage 2148. Spatiotemporally obtaining a set of encoded spatiotemporal patterns may include spatiotemporally obtaining a first set and a second set of encoded spatiotemporal patterns and/or the spatiotemporal patterns may include at least three colors, a first level of intensity and a second level of intensity, visible and near-visible light, or combinations thereof. In some embodiments, the set (or first and second set) of encoded spatiotemporal patterns includes two colors. In some embodiments, the set (or first and second set) of encoded spatiotemporal patterns includes one color.

In some embodiments, spatiotemporally obtaining a set of encoded spatiotemporal patterns includes spatiotemporally obtaining the set of encoded spatiotemporal patterns outputted by at least one display device able to display or pass and reflect light, as described herein. In some embodiments, spatiotemporally obtaining a set (or first and second set) of encoded spatiotemporal patterns includes spatiotemporally obtaining (e.g., capturing, detecting, identifying), via an obtaining device. For example, an obtaining device may be a camera, a video camera, an image sensor, or any other device capable of obtaining spatiotemporal images, either alone or in combination with other devices.

In some embodiments, an obtaining device may capture at least the same (or greater) framerate(s) as the display device is capable of outputting to reduce or prevent data loss. In some embodiments, the obtaining device may have a higher framerate than the display device, which may facilitate data transmission at the maximum framerate of the display device.

In some embodiments, there may be more than one obtaining device obtaining the set of encoded spatiotemporal patterns, as previously discussed in connection to FIGS. 3A-3B. For example, in some embodiments, where data is intended to be broadcast to multiple nodes, the first sending node may output the data, and multiple receiving nodes may obtain the broadcast data simultaneously from a display device (e.g., a single display device), without the need for the data to go through a central router. In some embodiments, only one (e.g., a single) obtaining device may be used for only one (e.g., a single) display device (e.g., a 1:1 ratio of obtaining device to display device). In some embodiments, there may be two or more obtaining devices for a single display device, as previously discussed in connection with FIGS. 3A-3B. In some embodiments, the obtaining device can capture both visible light and near-visible (such as IR and UV) light. In some embodiments, there may be a first obtaining device that is able to capture visible light and a second obtaining device that is able to capture near-visible light.

The method 2100 may then include transmitting the set of encoded spatiotemporal patterns including at least three different colors from the obtaining device (such as camera) to a decoder at optional stage 2150.

As shown in FIG. 21, the method 2100 then includes decoding the set (or first and second sets) of encoded spatiotemporal patterns into data at stage 2152. In some embodiments, decoding the set of encoded spatiotemporal patterns include decoding at least three colors, as previously discussed in connection to FIG. 2B. In some embodiments, decoding the set of encoded spatiotemporal patterns includes decoding a first level of intensity and a second level of intensity as previously discussed in connection to FIG. 2C. In some embodiments, the decoding the set of encoded spatiotemporal patterns includes decoding visible and near-visible light, as previously discussed in connection to FIG. 2D. In some embodiments, decoding the set of encoded spatiotemporal patterns includes decoding two colors. In some embodiments, decoding the set of encoded spatiotemporal patterns includes decoding one color. In some embodiments, decoding the first and second set of encoded spatiotemporal patterns includes decoding to the first and the second set of decoded data as previously discussed in connection to FIG. 2E.

In some embodiments, the decoded data is non-serialized data in a matrix form. One possible benefit of transmitting non-serialized data is that there is no need to go through multiple physical or software component layers between applications, saving time on data transmission. Another possible benefit of transmitting non-serialized data is that data corruption, data theft, and data throttling possibilities may be minimized.

In some embodiments, decoding the one or more sets of encoded spatiotemporal patterns into decoded data includes decoding one or more of the encoded spatiotemporal patterns disclosed herein.

In some embodiments, decoding the set of encoded spatiotemporal patterns into decoded data includes decoding the code symbols into decoded data. The code symbols may be organized into the encoded spatiotemporal patterns, as described herein. In some embodiments, decoding the code symbols into data may further include decoding the code symbols into a bit stream and decoding the bit stream into data, as described herein.

The method 2100 may further include transmitting the decoded data to a first receiving node at optional stage 2154. In some embodiment, two or more sets of data are transmitted to a first receiving node. The first receiving node may be a server including virtual machines that provide web searching, website hosting, system updates, application development and testing, or other suitable computing services to users. In some embodiments one or more applications may reside on the first receiving node. For example, the application receiving the data may be a word processor, a media player, an email application, an accounting software, or any other type of application that is designed to carry out specific tasks. In some embodiments, the first receiving node may be a storage device.

The method 2100 may further include storing the decoded data (or the first and second decoded data) the first receiving node at optional stage 2155. In some embodiments, storing the decoded data includes storing the data to a storage device residing at one or more receiving nodes, as previously discussed in connection with FIGS. 3A-3B. For example, a storage device may include an HDD, SSD, optical storage devices, any other type of non-volatile storage device for storing data for long- or short-term retention, or combinations thereof. In some embodiments, storing data may include storing data to a memory device residing at the first receiving node. For example, a memory device may be a ROM, RAM, DRAM, SRAM, or other suitable volatile memory device for storing data temporarily, or combinations thereof. In some embodiments, storing the decoded data further includes storing the decoded data into a buffer and further transmitting the data to yet another receiving node.

In some embodiments, the first sending node and the encoder may be a same physical network device. In some embodiments, the first sending node and the encoder may be separate physical network devices. In some embodiments, the first receiving node and the decoder may be a same physical network device. In some embodiments, the first receiving node and the decoder may be separate physical network devices.

Figure 22:
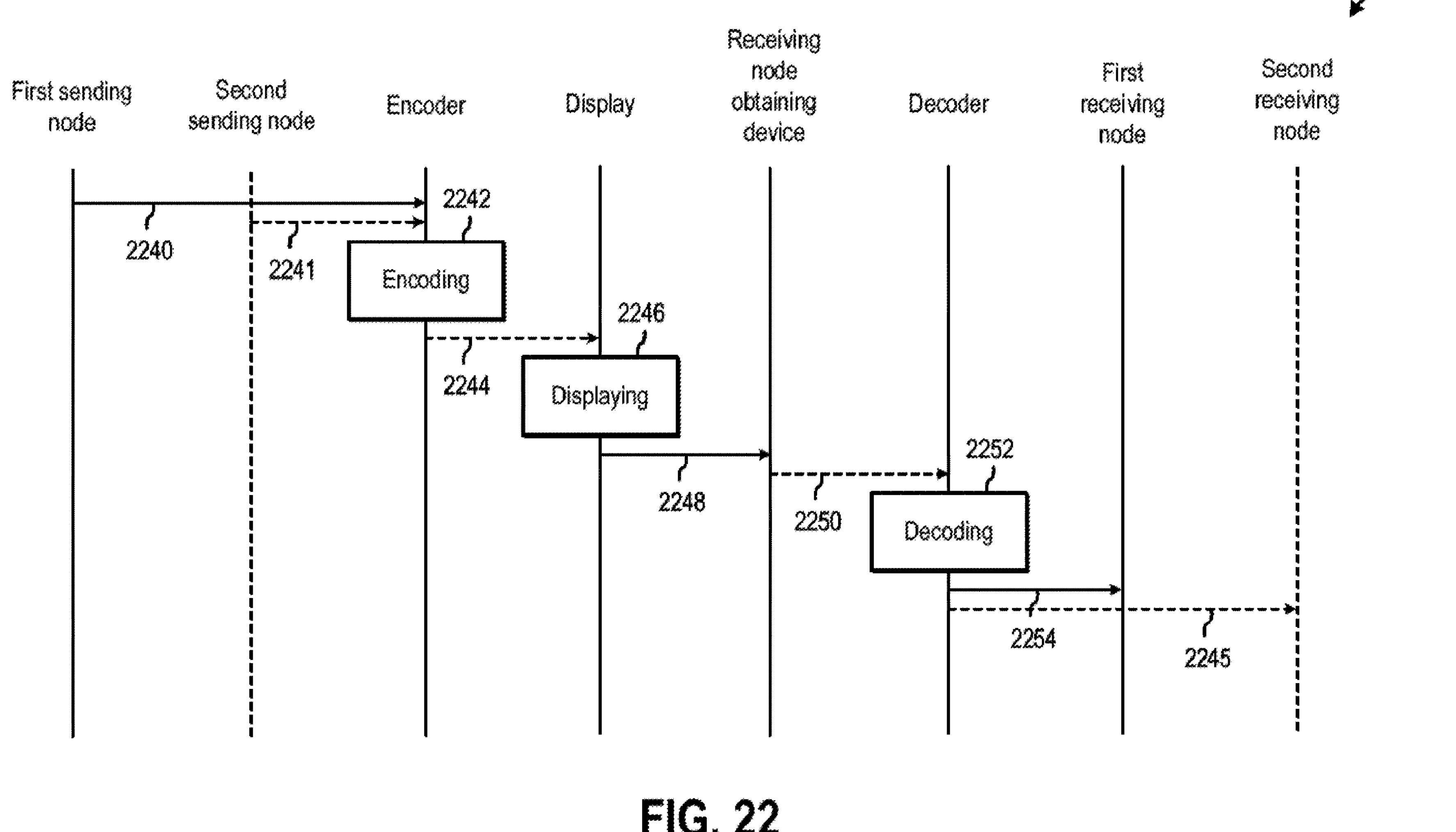
FIG. 22 is a thread diagram illustrating a method of transmitting two or more sets of data in a datacenter.

FIG. 22 is a thread diagram illustrating a method 2200 of transmitting two or more sets of data in a datacenter. The method 2200 may include transmitting a first set of data and a second set of data from a first sending node to an encoder at optional stage 2240 (similar to the stage 2140 as explained in connection to FIG. 21). In some embodiments, the method 2200 may include transmitting a first set of data from a first sending node to an encoder at stage 2240 and transmitting a second set of data from a second sending node to an encoder at an optional stage 2241. In some embodiments, the first set of data could be transmitted to a first encoder and the second set of data could be transmitted to a second encoder.

As shown in FIG. 22, the method 2200 then includes the encoder encoding the first and second set of data to a first and second set of encoded spatiotemporal patterns in stage 2242. In some embodiments, the method of encoding may be similar to the step of encoding 2142 as discussed in connection with FIG. 21.

The method 2200 may include transmitting a first set of data and a second set of data from the encoder to display device at optional stage 2244 (similar to the stage 2144 as explained in connection to FIG. 21). As shown in FIG. 22, the method 2200 then includes the display device to display the first and second set of encoded spatiotemporal patterns in stage 2246. In some embodiments, the method of displaying may be similar to the step of displaying 2146 as discussed in connection with FIG. 21. As shown in FIG. 22, the method 2200 then includes obtaining the first and second set of encoded spatiotemporal patterns from the display device in stage 2248. In some embodiments, the method of obtaining may be similar to the step of obtaining 2148 as discussed in connection with FIG. 21. In some embodiments, there may be two or more obtaining devices to obtain one or more of the first and second set of encoded spatiotemporal patterns.

The method 2200 may include transmitting a first set of data and a second set of data from the obtaining device to decoder at optional stage 2250 (similar to the stage 2150 as explained in connection to FIG. 21). In some embodiments, the first set of encoded spatiotemporal patterns is transmitted to first decoder and the second set of encoded spatiotemporal patterns is transmitted to second decoder.

As shown in FIG. 22, the method 2200 then includes the decoder decoding the first and second set of encoded spatiotemporal patterns into the first set of decoded data and the second set of decoded data in stage 2252. In some embodiments, the method of decoding may be similar to the stage 2150 of decoding as discussed in connection with FIG. 21.

The method 2200 may include transmitting the first set of data and a second set of data from the decoder to a first receiving node at optional stage 2254 (similar to the stage 2154 as explained in connection to FIG. 21). In some embodiments, the first set of data is transmitted to a first receiving node at stage 2254 and the second set of data is transmitted to a second receiving node at stage 2245.

Figure 23:
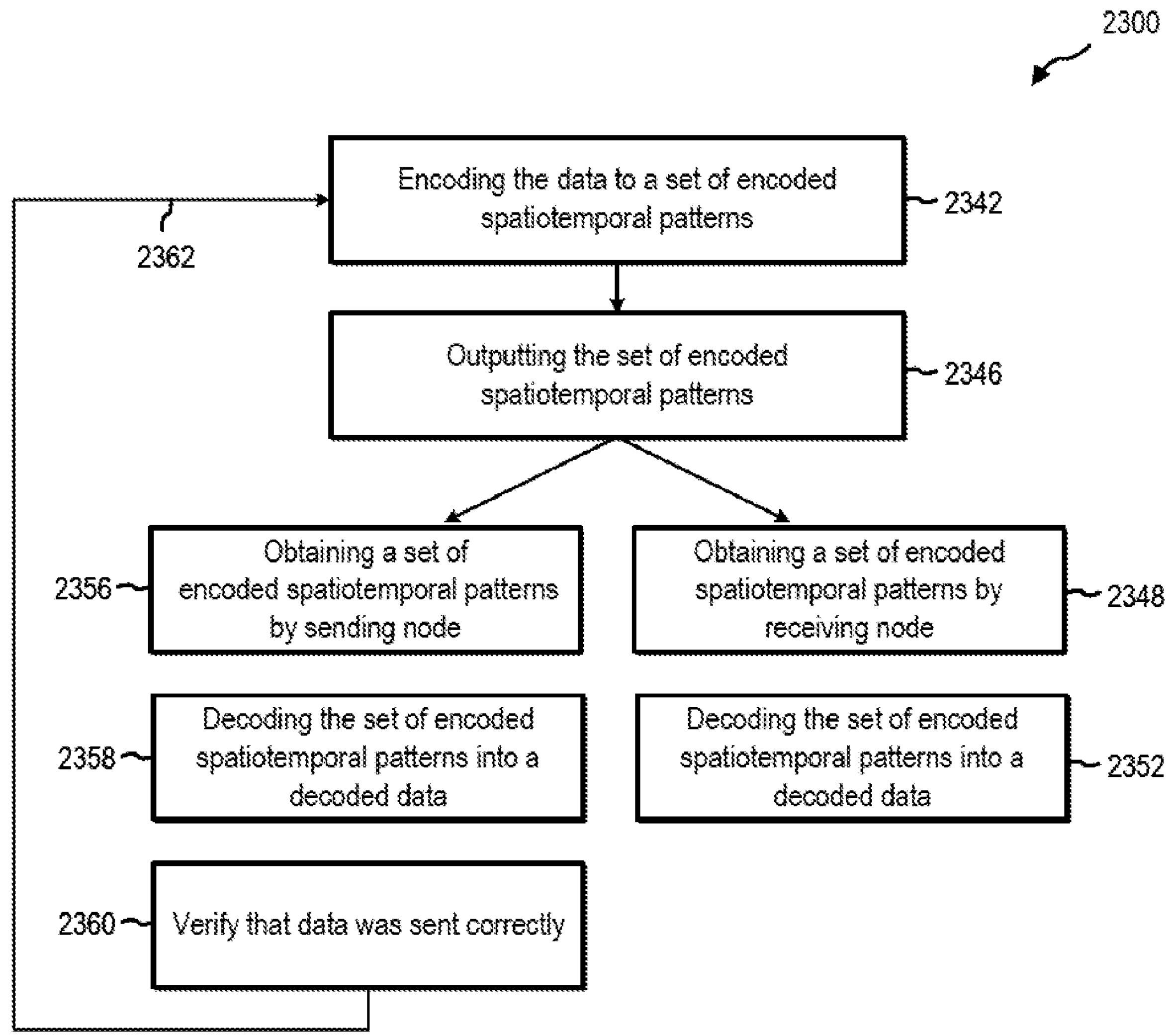
FIG. 23 is a flowchart illustrating a method of transmitting data in a datacenter wherein the sending node is able to verify that the data was sent correctly.

FIG. 23 is a flow diagram illustrating a method of transmitting data in a datacenter wherein the sending node is able to verify that the data was sent correctly. As shown in FIG. 23, the method 2300 includes the encoder encoding the data to a set of encoded spatiotemporal patterns in stage 2342. In some embodiments, the method of encoding is similar to the step of encoding 2142 as discussed in connection with FIG. 21. The method 2300 then includes outputting the set of encoded spatiotemporal patterns in stage 2346. In some embodiments, the method of outputting is similar to the step of displaying 2146 as discussed in connection with FIG. 21.

In the flow chart shown in FIG. 23, the set of encoded spatiotemporal patterns outputted at stage 2346 is then captured by the sending node obtaining device at stage 2356 and by the receiving node obtaining device at stage 2348. One possible benefit of allowing the sending node to capture the data transmission is to verify that the data was outputted correctly and that there were no collisions with other transmissions without the need for the receiving node to inform the sending node that there was an error in the data transfer. Another possible benefit of allowing the sending node to capture the data transmission is to enable transmission corrections, such as moving the location of the spatiotemporal pattern to avoid overlap with other spatiotemporal patterns. The method 2300 further includes decoding the set of encoded spatiotemporal patterns into a decoded data at stage 2358. For example, the sending node obtaining device may decode the set of encoded spatiotemporal patterns or it may deliver the captured set of encoded spatiotemporal patterns to a decoder for decoding. Once the sending node has decoded the set of encoded spatiotemporal patterns it may either take no action, if the data was outputted correctly, or resent the data to the encoder at stage 2362 if the data was outputted incorrectly.

In some embodiments, a datacenter includes a plurality of spatiotemporal communication devices including optical transmitters, optical receivers, optical transceivers, other spatiotemporal communication devices, and combinations thereof. A datacenter with a plurality of optical communication devices allows for communication between computing devices (e.g., server computers, network switches, power distribution units), between sets of computing devices, between racks of computing devices, between rows of computing devices, between rooms of computing devices, or computing devices in other remote locations.

For example, spatiotemporal communication devices according to the present disclosure allow communication between one computing device to another computing device ("one-to-one"), between one computing device and a plurality of computing devices ("one-to-many"), between a plurality of computing devices to another plurality of computing devices ("many-to-many"), or between a plurality of computing devices to one computing device ("many-to-one"). Optical communication devices provide optical signals through free space that do not substantially interact with one another during transmission, allowing the optical signals to cross and pass through each other in free space.

In a crowded environment with a plurality of spatiotemporal communication devices, unintended transmission between devices may be possible. For example, in a crowded environment, an optical transmitter may be visible by a camera of the intended communication pair, while also being visible to other cameras in the environment. Systems and methods described herein may limit the transmission of spatiotemporal patterns to unintended recipients by controlling the generation of the spatiotemporal patterns, the capture of the spatiotemporal pattern, or the transmission (or attenuation) of the spatiotemporal patterns during movement through the free space. By controlling and/or coordinating the spatiotemporal communications, a density of a spatiotemporal communication system can be increased. In some embodiments, a computing system includes a plurality of computing devices that, in different topologies, can more efficiently perform certain calculations.

In some embodiments, a datacenter computing system includes spatiotemporal communication devices that are configured, arranged, coordinated, positioned, and combinations thereof to allows selective communication with little or no cross-talk between spatiotemporal communication devices. For example, a one-to-many system configuration may allow a single optical transmitter (e.g., screen) to provide a spatiotemporal pattern that is visible to a plurality of optical receivers (e.g., cameras) that receive and collect the spatiotemporal pattern. In some embodiments, a spatiotemporal transmitter is moveable to selectively display the spatiotemporal pattern(s) to different receivers. In some embodiments, one or more filters selectively pass portions of the spatiotemporal pattern generated by the transmitter. For example, polarization filters selectively pass polarized light relative to a relative angular alignment of the filter and the direction of polarization of the light. Wavelength filters selectively pass or attenuate signals (or portions of signals) based on wavelength. An array of spatiotemporal communication devices may be in communication with a controller that coordinates the serial transmission and/or capture of spatiotemporal patterns to temporally multiplex spatiotemporal patterns to communicate across a plurality of data channels in a shared free space.

Figure 24:
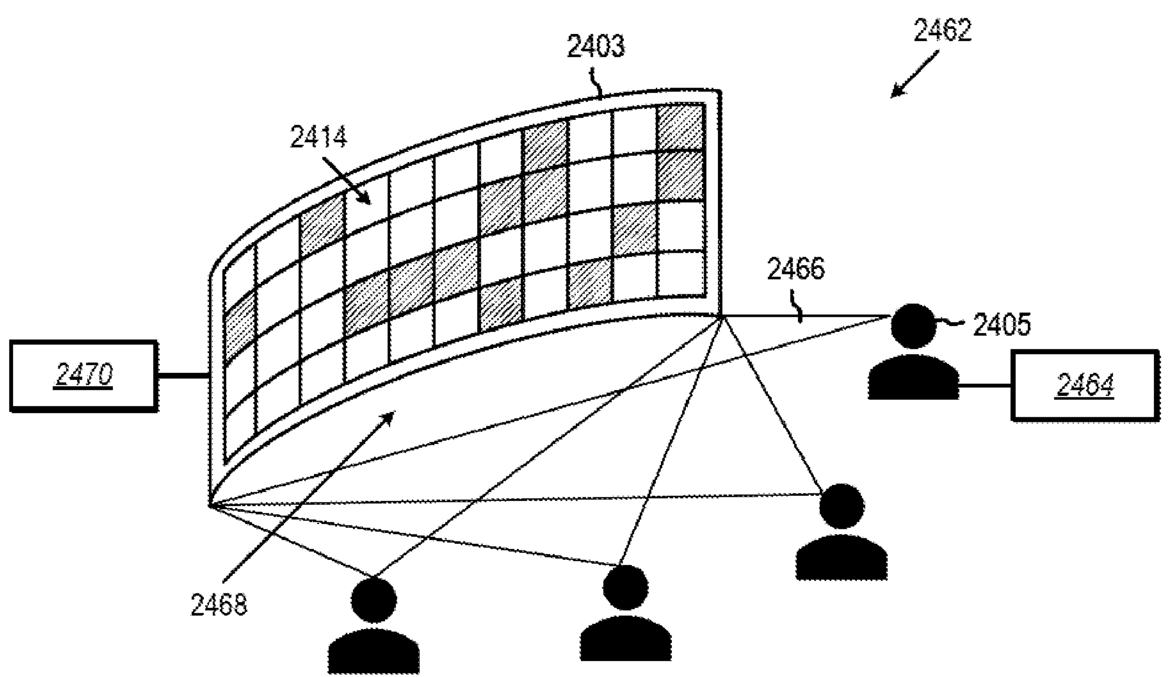
FIG. 24 is a perspective view of a datacenter computing system with a one-to-many spatiotemporal communication topology.

Referring now to FIG. 24, in some embodiments, a computing system 2462 includes a plurality of nodes including spatiotemporal communication devices 2403, 2405. The receiver nodes 2464 are arranged in a curved configuration to orient a field of view (FOV) 2466 of a plurality of cameras 2405 with an overlapping region 2468. At least one transmitter node 2470 (e.g., including a display device 2403) is positioned in the overlapping region 2468, and the plurality of receiver nodes 2464 image or receive a spatiotemporal pattern 2414 from the single transmitter node 2470. For example, a plurality of cameras 2405 are arranged with respective FOVs 2466 in an overlapping region 2468 to image a single screen or display device 2403 providing the spatiotemporal pattern 2414. In some embodiments, the transmitter node includes a curved display or screen to improve the view of spatiotemporal pattern by the receiver nodes. For example, the transmitter node may be curved in a convex direction with respect to the receiver nodes. In another example, the transmitter node is curved in a concave direction with respect to the receiver nodes. In yet another example, the display has a convex or concave lens positioned in front of the display to direct the spatiotemporal pattern toward the receiver nodes.

In some embodiments, the transmitter node projects or otherwise directs the spatiotemporal pattern toward a curved surface, from which the receiver node(s) can image the spatiotemporal pattern. For example, the transmitter node may project onto a projection surface or onto a mirrored surface from which at least one receiver node images or otherwise receives the spatiotemporal pattern. In some embodiments, the projection surface is a partially mirrored and/or partially transparent surface that allows partial reflection from and partial transmission through the projection surface. The spatiotemporal pattern projected to the projection surface may therefore be imaged from a front surface and aback surface of the projection surface.

In some embodiments, a transmitter node includes a display that is curved in two directions. For example, a curved display may be oriented in a concave direction relative to the receiver node(s), such as a domed display at least partially around a camera. In some embodiments, the display is curved in two directions to present a convex surface toward the receiver node(s). In some embodiments, the curvature (such as a constant or varying radius of curvature) is the same in both orthogonal directions (such as a spherical or partially spherical display surface). In some embodiments, the curvature is different in a first direction than in a second direction orthogonal to the first.

Figure 25:
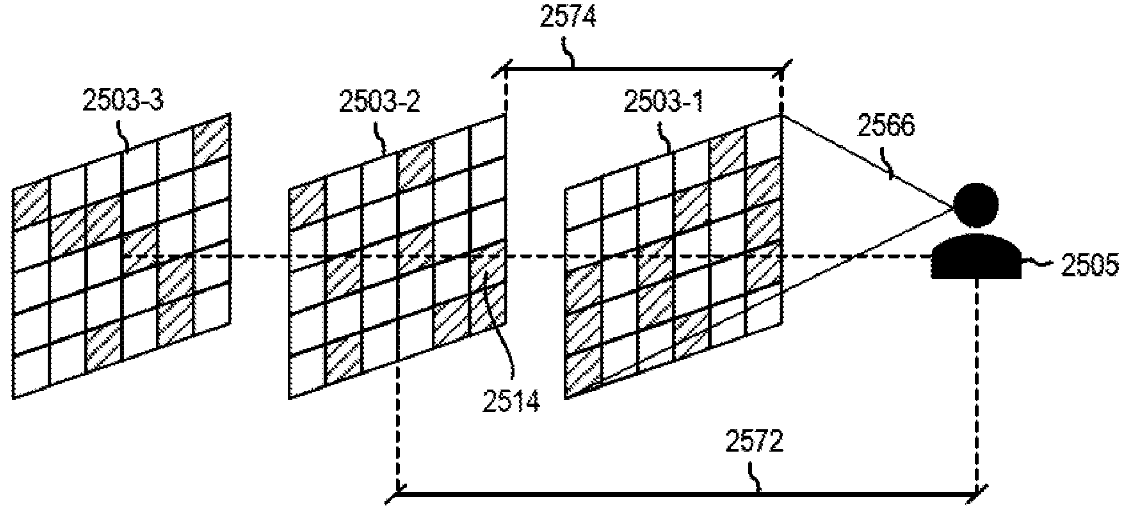
FIG. 25 is a perspective view of a datacenter computing system with a many-to-one spatiotemporal communication topology.

Referring now to FIG. 25, in some embodiments, a crowded environment causes a plurality of different displays 2503-1, 2503-2, 2503-3 to be within the FOV 2566 of a camera 2505 or other receiver node, while only one display (or one display at a time) is desired for imaging. In a particular example, three displays 2503-1, 2503-2, 2503-3 are positioned at various distances in a series within the FOV 2566 of a single camera 2505. It may be desirable to image the spatiotemporal pattern 2514 provided by the center display 2505-2 of the three displays. In some embodiments, the camera 2505 includes a lens to adjust the focal length 2572 of the camera 2505. For example, the camera 2505 may image the environment with a relatively short depth of field. In at least one embodiment, the depth of field is less than a distance 2574 from a first display 2503-1 to a second display 2503-2 in the series. Changing the focal length of the camera allows a receiver node to image only one display in focus at a time, sufficiently limiting and/or preventing cross-talk between channels.

In some embodiments, a series of displays includes transparent displays that illuminate portions of the display while allowing light transmission through the display. In some examples, a series of transparent displays aligned with a camera of the receiver node cause the transparent displays to overlap one another with a plurality of planes of the series of displays. Focusing the camera (e.g., moving or changing a lens thereof) can focus the camera on one display (e.g., one plane) of the series while defocusing the other displays causes the camera to only image the spatiotemporal pattern of the focused display.

Figure 26:
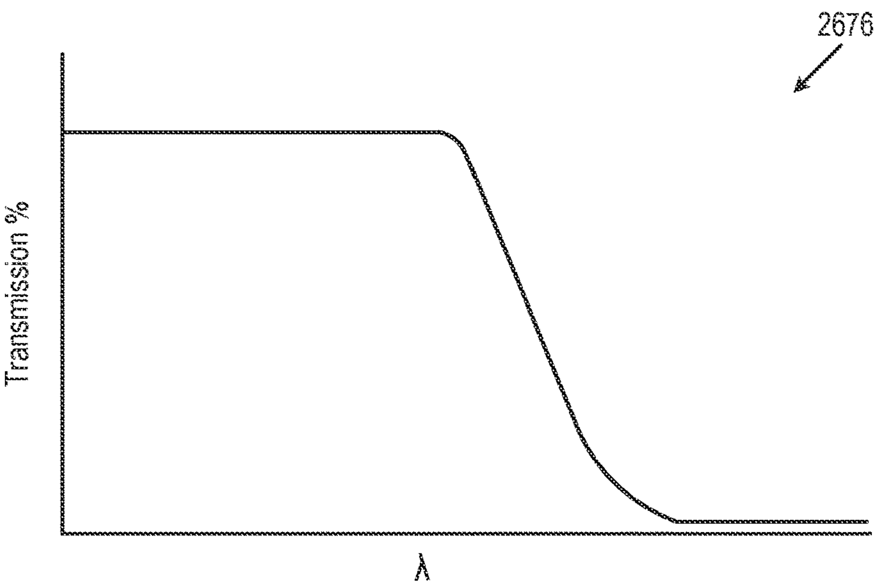
FIG. 26 is an embodiment of a transmission graph of a wavelength filter.

In some embodiments, spatiotemporal communications in a datacenter are managed and/or coordinated by wavelength-specific transmission and/or reception. In the above example, light from the spatiotemporal patterns may pass through a wavelength filter to selectively pass light to a receiver node. Referring to FIG. 26, in at least one example, a receiver node may include a wavelength filter 2676 that selectively passes light from the spatiotemporal pattern to the photoreceptor or other receiver of the receiver node. In another example, a wavelength filter 2676 is positioned in the environment between the transmitter node and the receiver node. In yet another example, the receiver node is sensitive to a particular wavelength or range of wavelengths, such as an IR-photoreceptor described herein. In some embodiments, the wavelength filter 2676 attenuates longer wavelengths, such as the IR spectrum, to selectively pass shorter wavelengths, such as illustrated in FIG. 26.

In at least one embodiment, the receiver node is a broad-spectrum receiver that is configured to receive light from UV to IR light, or any range of wavelengths therebetween, and a wavelength filter selects a portion of the light within the FOV of the receiver node. For example, a plurality of spatiotemporal patterns may each include a different wavelength or range of wavelengths, and the wavelength filter may selectively attenuate and/or pass portions of the spatiotemporal patterns. In at least one example, a receiver node is positioned with an FOV encompassing a first spatiotemporal pattern with a first wavelength (e.g., red), a second spatiotemporal pattern with a second wavelength (e.g., green), and a third spatiotemporal pattern with a third wavelength (e.g., blue). By applying a wavelength filter between a photoreceptor of the receiver node and the spatiotemporal patterns, the system can selectively limit the receiver node's ability to image one or more of the spatiotemporal patterns and/or portions of the spatiotemporal patterns.

In another example, a transmitter node generates and/or displays a spatiotemporal pattern including a plurality of wavelengths, such as an RGB spatiotemporal pattern. An array of receiver nodes configured to image the RGB spatiotemporal pattern has a plurality of wavelength filters. In some examples, each receiver node has one or more wavelength filters applied thereto to selectively image a portion of the RGB spatiotemporal pattern. In a specific example, the wavelength filters are adjustable or selectable to change the portion(s) of the spatiotemporal pattern imaged by the receiver node.

In some embodiments, a wavelength filter is a cut filter. For example, a cut filter passes signals with a frequency lower than a selected cutoff frequency and attenuates signals with frequencies higher than the cutoff frequency. In another example, a cut filter passes signals with a frequency higher than a selected cutoff frequency and attenuates signals with frequencies lower than the cutoff frequency.

In some embodiments, a wavelength filter is a band-pass filter. For example, the band-pass filter passes signals in a selected range of wavelengths and attenuates signals outside of the selected range. In some embodiments, a low-pass cut filter and a high-pass cut filter are used in conjunction to function as a band-pass filter. In some embodiments, a wavelength filter is a band-stop filter or notch filter. For example, the band-stop filter attenuates signals in a selected range of wavelengths and passes signals outside of the selected range.

Transmission of spatiotemporal signals through free space allows for nodes to be added or removed from the system for one-to-one, many-to-one, one-to-many, or many-to-many communications without requiring cabling or physical connections. In some embodiments, transmission of spatiotemporal signals through free space can allow a plurality of data channels within a single spatiotemporal pattern by multiplexing of signals.

Figure 27:
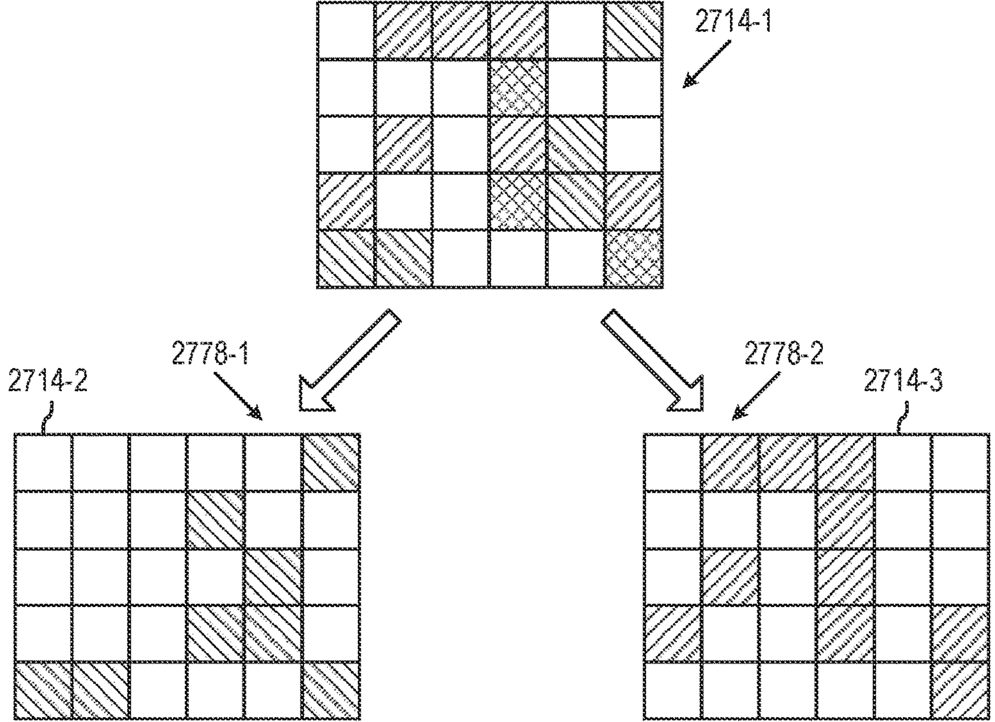
FIG. 27 is a flowchart illustrating decomposition of a multiplexed spatiotemporal pattern.

In some embodiments, the spatiotemporal pattern multiplexes data channels through discrete wavelength channels of the spatiotemporal signal. As described herein, spatiotemporal patterns can include a plurality of wavelengths of light (visible or not visible) and filters applied to the spatiotemporal signal can selectively pass one or more wavelengths of the spatiotemporal signal to the receiver node. FIG. 27 illustrates a spatiotemporal pattern 2714-1 with a plurality of wavelength channels multiplexed therein. For example, the multiplexed first spatiotemporal pattern 2714-1 includes a second spatiotemporal pattern 2714-2 of a first wavelength data channel 2778-1 and a third spatiotemporal pattern 2714-3 of the second wavelength data channel 2778-2.

In another example, image processing of the captured spatiotemporal pattern can allow for the selection or identification of wavelength channels in a spatiotemporal pattern with a plurality of wavelengths of light. For example, the captured image containing the spatiotemporal pattern may be decoded, such as described in relation to FIG. 12, to identify the information encoded in each wavelength channel (e.g., 2778-1, 2778-2) of the multiplexed spatiotemporal pattern (e.g., 2714-1).

In some embodiments, the spatiotemporal pattern multiplexes data channels through polarization channels of the spatiotemporal signal. For example, an optical signal including a spatiotemporal pattern may be or include polarized light. The polarized light is, in some embodiments, attenuated and/or passed by a polarized filter positioned between the transmitter node and the receiver node. In an example, a first display emits a first spatiotemporal pattern with light polarized at a first angle, and a second display emits a second spatiotemporal pattern with light polarized at a second angle different from the first angle. A polarization filter positioned between the displays and the receiving node can selectively attenuate and/or pass the first spatiotemporal pattern and the second spatiotemporal pattern proportionally to the angular alignment of the polarization filter to the polarization direction of the light.

Figures 1, 28:
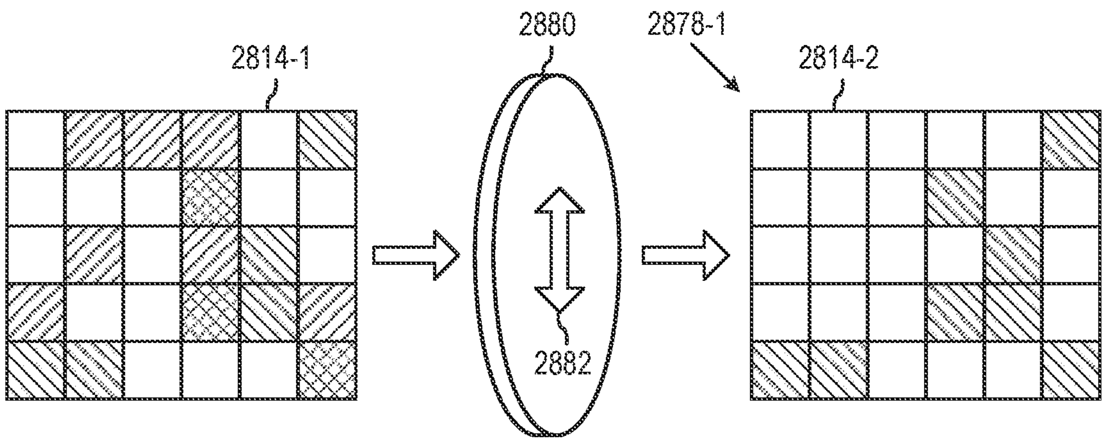
FIGS. 28-1 and 28-2 illustrate selectively transmission of a multiplexed spatiotemporal pattern through a polarization filter.
Figures 2, 28:
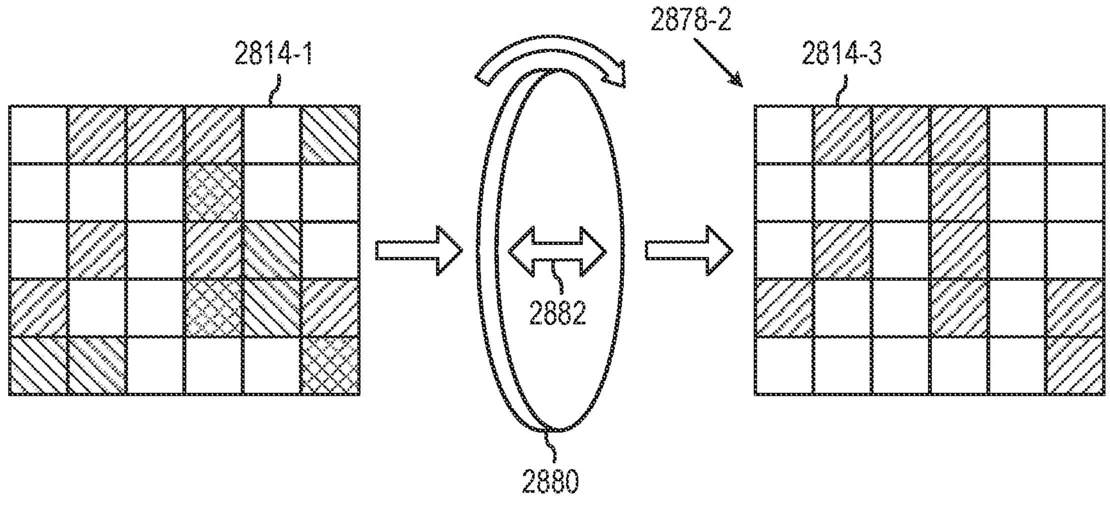

FIG. 28-1 and FIG. 28-2 illustrate an example of polarization data channels 2878-1, 2878-2 in a multiplexed first spatiotemporal pattern 2814-1. In a particular example, the first spatiotemporal pattern is generated with polarized light in a first polarization direction, and the second spatiotemporal pattern is generated with polarized light in a second polarization direction that is orthogonal to the first polarization direction. In such an example, a polarization filter 2880 angularly aligned with the first polarization direction 2882 of FIG. 28-1 will attenuate substantially all of the second spatiotemporal pattern, and a polarization filter angularly aligned with the second polarization direction 2882 of FIG. 28-2 will attenuate substantially all of the first spatiotemporally pattern. Rotation or replacement of the polarization filter 2880, therefore, allows the selection of one of the spatiotemporal patterns 2814-2, 2814-3 for passing to the receiver node(s) while both spatiotemporal patterns are emitted.

In some embodiments, spatiotemporal patterns are temporally multiplexed at the display device and/or projection surface. For example, a first temporal data channel and a second temporal data channel are interlaced in a feed or stream of spatiotemporal patterns. In such an example, the receiver nodes include cameras that are configured to image one of the temporal data streams.

Figures 1, 29:
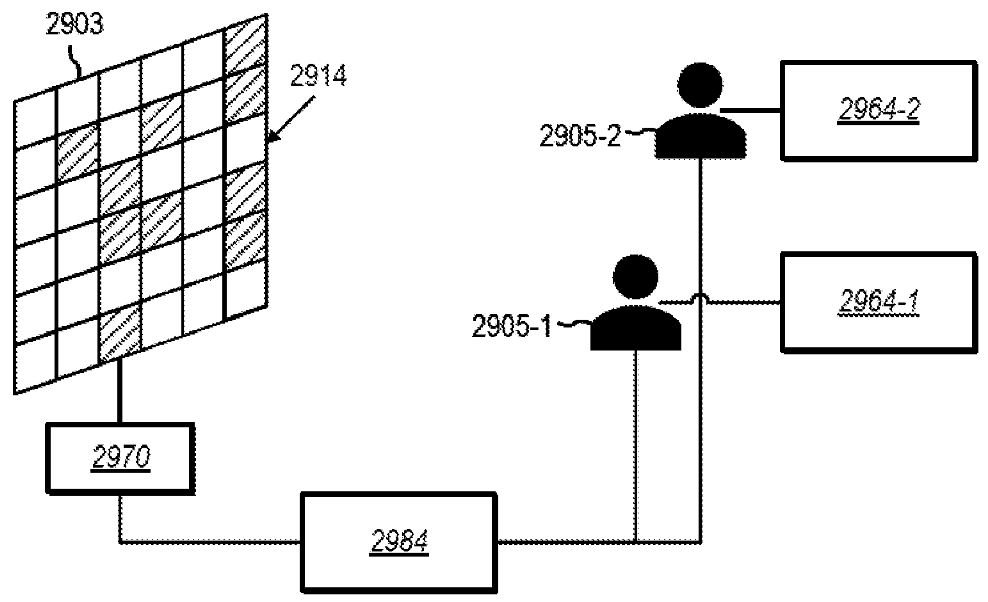
Figures 2, 29:
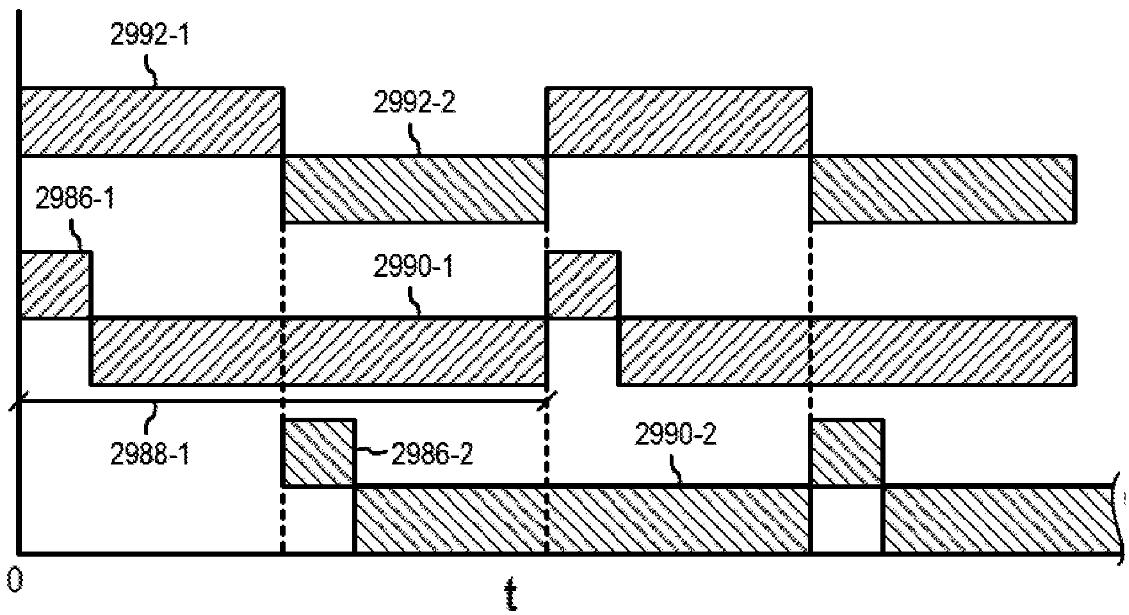

Referring now to FIG. 29-1, in some embodiments, a synchronization controller 2984 is in data communication with the transmitter node 2970 and in data communication with a first camera 2905-1 and a second camera 2905-2 of receiver nodes 2964-1, 2964-2. In some embodiments, the synchronization controller 2984 communicates with the nodes, and in some embodiments, the synchronization controller 2984 communicates with the spatiotemporal communication devices (e.g., display device 2903, cameras 2905-1, 2905-2). The synchronization controller communicates with the transmitter node and the cameras of the receiver node(s) to coordinate and synchronize the display and capture of a series of spatiotemporal patterns. For example, the transmitter node includes a 240 Hz display configured to display 240 spatiotemporal patterns in a second. The first camera is a 120 Hz camera configured to capture 120 images in a second, and the second camera is a 120 Hz camera configured to capture 120 images in a second.

However, while the frame time of the first camera and second camera are 8.33 milliseconds, respectively, the exposure duration within the frame time is less than the total frame time. For example, the exposure duration may be less than half of the frame time. In an embodiment illustrated in FIG. 29-2, the first temporal data channel and the second temporal data channel are interlaced on the display device. In some embodiments, the exposure duration 2986 is approximately 2 ms (while the remaining 6.33 ms of the frame time 2988 includes readout to memory and resetting of the photoreceptor 2990-1). The synchronization controller sets a timing of the first camera and the second camera with an offset of the 240 Hz (4.16 ms) display timing. In other words, the display device produces a first spatiotemporal pattern of a first temporal data channel for a display duration 2992-1 of approximately 4.16 ms, and the first camera images the spatiotemporal pattern for a 2-ms first exposure duration 2986-1. While the first camera reads out 2990-1 the captured image and resets the photoreceptor of the first camera, the display device produces a first spatiotemporal pattern of a second temporal data channel for a display duration 2992-2 of approximately 4.16 ms, and the second camera images the spatiotemporal pattern for a 2-ms exposure duration 2986-2. While the second camera reads out 2990-2 the captured image and resets the photoreceptor of the second camera, the display device produces a second spatiotemporal pattern of the first temporal data channel for a display duration of approximately 4.16 ms, and the first camera images the spatiotemporal pattern for a 2-ms exposure duration. While the first camera reads out the captured image and resets the photoreceptor of the first camera, the display device produces a second spatiotemporal pattern of the second temporal data channel for a display duration of approximately 4.16 ms, and the second camera images the spatiotemporal pattern for a 2-ms exposure duration. In doing so, the first camera captures only spatiotemporal patterns from the first temporal data channel, and the second camera captures only spatiotemporal patterns from the second temporal data channel, allowing for the selective transmission to different cameras and/or different receiving nodes without the need for headers in the spatiotemporal pattern or in the information encoded in the spatiotemporal pattern. In other examples, the display device generates a stream of spatiotemporal patterns in a single temporal data channel, and the first camera and second camera image each spatiotemporal pattern in the data channel, despite the display device generating spatiotemporal patterns at a higher rate than the cameras, individually, can capture.

In another example, display devices generate spatiotemporal patterns at a lower frame rate than a camera imaging the display devices. For example, each display device in an array of 4 display devices generates 60 spatiotemporal patterns per second (60 Hz), and a camera images the array at 240 Hz. In some embodiments, a synchronization controller in data communication with the display devices and in data communication with camera synchronizes the displays with an offset per display frame equal to an inverse of the display duration for each frame. In other words, each display generates a spatiotemporal pattern for 16.67 ms, and the synchronization controller instructs each of the 4 displays in the array to refresh at 4.16 ms offsets. When the camera captures a frame every 4.16 ms, the camera will capture each update of the array.

In some embodiments, a display device and/or a camera (or other receiving device) of a system are movable to orient toward different display devices and/or cameras in a datacenter. For example, some machine learning computing systems (or other advanced computing systems) use a plurality of specialized processors to which specific computational tasks are assigned. Specialized processors can allow more energy and computationally efficient calculations in demanding tasks, such as large language model training or large simulations. In conventional systems, network switches route information between the computational nodes of the advanced computing system, which can introduce significant latency and potential inefficiencies. In some embodiments, an advanced computing system, according to the present disclosure, can move one or more of a display device (e.g., display or projection surface) or receiving device (e.g., camera) to alter the communication topology of the computing system and provide direct spatiotemporal communication between processors of the advanced computing system.

In some embodiments, the communication between processors using spatiotemporal patterns provides direct network connections (e.g., topology) without needing switches and with a higher data density than a conventional network connection (e.g., ethernet). Physically moving or changing the orientation of the nodes in a spatiotemporal communication system of an advanced computing system can allow faster and more efficient communication of data between nodes to complete complex computational tasks with less energy and faster. In some embodiments, different stages of the computational task require communication between different processors in the computing system. As such, changing the topology of the spatiotemporal communications, can provide efficient network configurations for direct and high data density communication between processors at each stage of a computational task.

The pathing of the light or other signal medium may be altered by one or more mechanisms to alter the position and/or orientation of the nodes, or the pathing of the light or other signal medium may be altered by one or more mechanisms to alter the position and/or orientation of surfaces, lenses, or other elements in the path of the signal medium to direct the signal medium.

In some embodiments, a display that generates a spatiotemporal pattern, according to the present disclosure, is coupled to a motorized mount that allows for rotation and/or translation of the display relative to one or more receiver nodes. For example, a display may be oriented toward a first camera in a first configuration, and the display is rotated and/or translated about one or more axes to project the spatiotemporal pattern toward a second camera in a second configuration. In some embodiments, a display may be oriented toward a first projection surface in a first configuration, and the display is rotated and/or translated to project the spatiotemporal pattern onto a second projection surface. In such embodiments, different cameras image the first projection surface and the second projection surface.

Figures 1, 30:
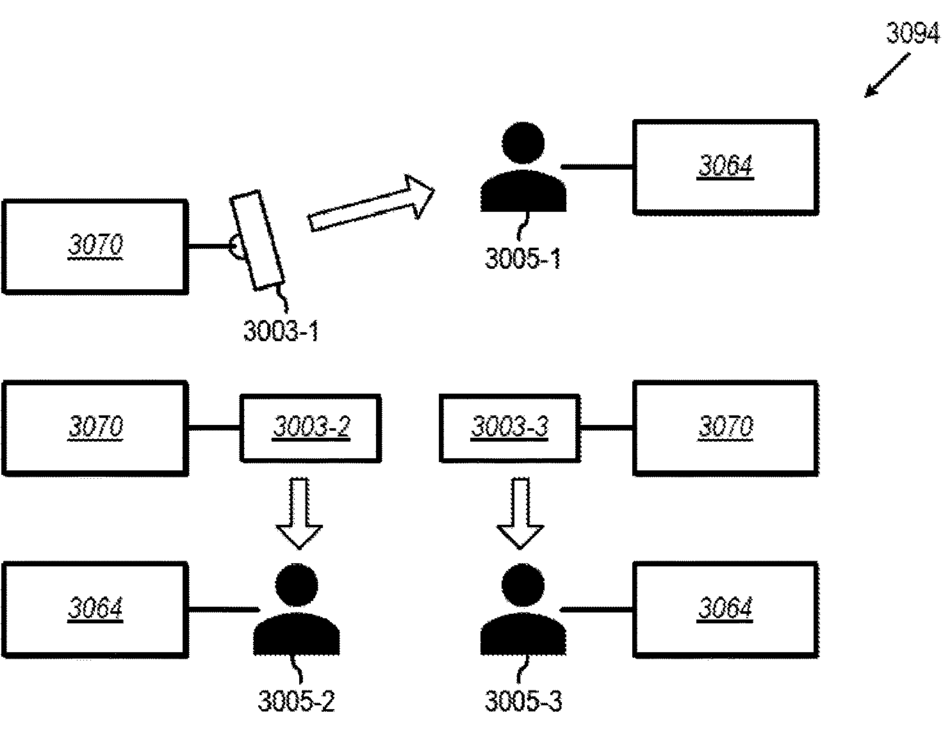
Figures 2, 30:
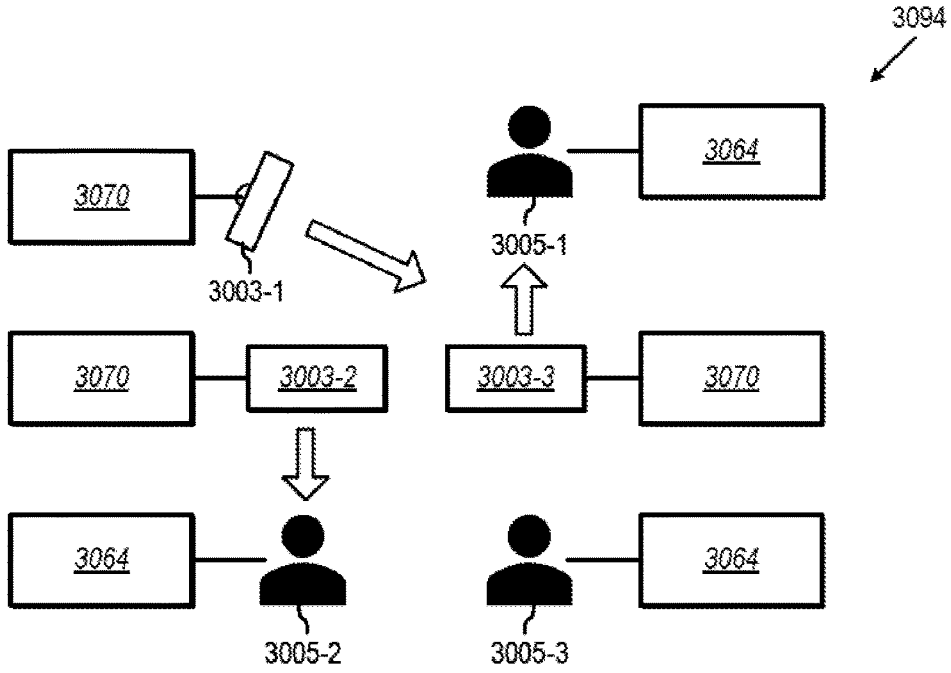

FIG. 30-1 is a schematic representation of a reconfigurable network 3094 with spatiotemporal communications according to some embodiments of the present disclosure. In some embodiments, a plurality of transmitter nodes 3070 and a plurality of receiver nodes 3064 have spatiotemporal communication devices that allow reconfiguration of the network topology between the nodes 3064, 3070. For example, a transmitter node 3070 is in data communication with a first display device 3003-1 and encodes information into spatiotemporal patterns that are displayed on the first display device 3003-1 and imaged by a first camera 3005-1 of a receiving node 3064. The receiving node 3064 decodes the spatiotemporal pattern and stores the decoded information, as described herein. Similarly, a second display device 3003-2 generates spatiotemporal patterns that are imaged by a second camera 3005-2, and a third display device 3003-3 generates spatiotemporal patterns that are imaged by a third camera 3005-3.

Upon completion on an initial stage of a computation task or upon another reconfiguration trigger, the reconfigurable network 3094 changes communication paths by moving one or more of the display devices and/or cameras. For example, FIG. 30-2 illustrates the network 3094 of FIG. 30-1 with at least some of the transmitter nodes 3070 transmitting information to different receiver nodes 3064 through spatiotemporal communication. For example, the first display device 3003-1 is rotated toward the third camera 3005-3.

In some embodiments, a camera that images a spatiotemporal pattern is coupled to a motorized mount that allows for rotation and/or translation of the camera relative to one of more displays and/or projection surfaces. The camera is rotated and/or translated to image a plurality of displays. In some embodiments, the third camera 3005-3 is also rotated to image the first display device 3003-1, while in other embodiments, the FOV of the third camera 3005-3 allows the third camera 3005-3 to image the first display device 3003-1 without additional movement. In some embodiments, the third display device 3003-3 is rotated to transmit spatiotemporal patterns toward the first camera 3005-1.

In some embodiments, a network controller (such as will be described in relation to FIG. 31) coordinates the network topology based on signal headers and/or physical reconfiguration of transmission nodes, receiver nodes, and projection surfaces in the spatiotemporal communication network. For example, a network controller may broadcast a new topology and/or node repositioning coordinates relative to an existing configuration, which instructs a device or a motorized mount of a device to physically reconfigure the position and/or orientation of devices in the network.

In some embodiments, one or more network topologies is pre-loaded and/or communicated to the nodes in anticipation of predicted computational task or traffic demand. For example, the positions could also be pre-loaded to change with predicted network traffic during the day and at night or on a weekday and a weekend have different optimal configurations. With a pre-loaded and/or pre-scheduled network topology, a topology broadcast could very infrequent. In some embodiments, links in the topology are autonomously determined. For example, cameras, when not in use and/or periodically, can sweep through or change to a wider FOV to look for the highest priority transmission. In other examples, using feedback from the camera, the screen could sweep once to find a connection.

In some embodiments, the network controller broadcasts new topology and/or detailed peripheral positions on an out-of-band control channel that has dedicated hardware. For example, the out-of-band control channel may use a non-visible light when the spatiotemporal communications use visible light. In some examples, the out-of-band control channel uses electromagnetic frequencies outside of the light spectrum (visible or non-visible light), such as RF signals. In some examples, the out-of-band control channel uses non-electromagnetic signals, such as sound waves.

In some embodiments, a network has a plurality of predetermined or predefined topologies (i.e., "innate" topologies), where each server and/or node is encoded with peripheral positions for each of the innate topologies. In some examples, a network controller or device in the network transmits a topology request or command that instructs the other devices of the network to reconfigure to a selected innate topology.

In some embodiments, one or more projection surfaces, lenses, or other optical element (e.g., prism) is altered to change a path of the spatiotemporal signal in the system. For example, a mirror may be rotated and/or translated by a motorized mount from a first position to a second position. In the first position, the mirror reflects a spatiotemporal pattern from a transmitter node toward a first receiver node, and in the second position, the mirror reflects the spatiotemporal pattern toward a second receiver node. In another embodiment, a projection surface has a variable reflectivity and/or transmissivity, such as based on an electrical voltage applied thereto. In such an embodiment, a first electrical voltage applied to the projection surface renders the projection surface substantially opaque and a second electrical voltage renders the projection surface substantially transparent. In some examples, a first camera images the spatiotemporal pattern on the opaque projection surface, and a second camera images the spatiotemporal pattern at a different location after transmission through the transparent projection surface.

Figure 31:
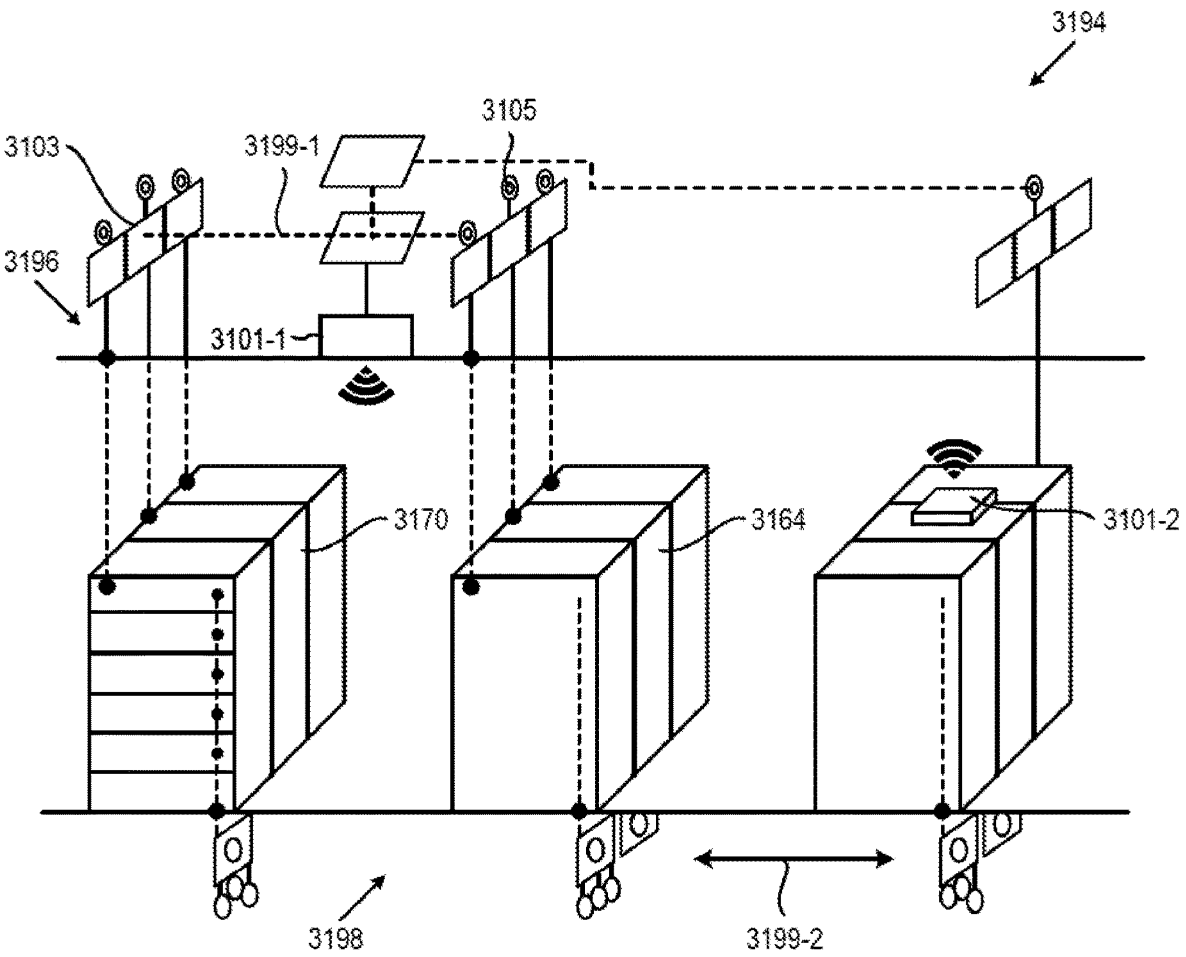
FIG. 31 is a perspective view of isolated communication paths in a datacenter.

FIG. 31 is a schematic representation of a datacenter room with a network 3194 of nodes that communicate through spatiotemporal patterns projected in a variety of pathways. In some embodiments, the transmitter nodes 3170 and receiver nodes 3164 are in data communication with display devices 3103 and cameras 3105, respectively, to communicate through spatiotemporal patterns. In some embodiments, a display device 3103 and a camera 3105 are positioned in a drop ceiling 3196, air duct, raised floor 3198, or other region of a datacenter room that is substantially isolated from optical interferences. For example, a first optical path 3199-1 is located in a drop ceiling 3196, and a second optical path 3199-2 in a raised floor 3198 to optically isolate the paths 3199-1, 3199-2 from one another to increase security and/or privacy and reduce cross-talk and/or interference in the spatiotemporal communications. In addition to reducing cross-talk within the spatiotemporal communication network, a benefit of an isolated communication corridor is reduced interference from external sources such as other light sources like room lights, status lights (blinking server LEDs, etc.); equipment/racks causing physical obstructions, and/or people causing physical obstructions.

In some embodiments, the network topology and/or synchronization of the spatiotemporal communications are controlled and/or coordinated through network controllers 3101-1, 3101-2. In some embodiments, the network controllers 3101-1, 3101-2 communicate via non-light communications that allow the network controllers 3101-1, 3101-2 to coordinate between the optically isolated regions of the rooms. For example, the network controllers 3101-1, 3101-2, in some embodiments, communicate via sound, RF signals (such as WiFi, Bluetooth, or other RF communication protocols that do not require line-of-sight), other networking protocols, and additional non-light control signals for coordinating or controlling optical communications.

For example, the first network controller 3101-1 of FIG. 31 is in communication with a projection surface that receives projected signals from the display device 3103 in the first optical path 3199-1. Movement of and/or changes to the transparency and/or reflectivity of the projection surface can alter the first optical path 3199-1 in the drop ceiling to transmit spatiotemporal patterns from the display device 3103 to cameras 3105 in data communication with the receiver nodes 3164 proximate the second network controller 3101-2. The network controller 3101-1, 3101-2 can, thereby, manipulate and reconfigure the optical paths of the network 3194 without requiring optical communication and/or line-of-sight to the specific paths.

FIG. 31 illustrates an embodiment of spatiotemporal communications in a conventional datacenter rack and/or room configuration. In some embodiments, a plurality of spatiotemporal communications are integrated into a computing system with a plurality of processors. The spatiotemporal communications provide rapid and efficient networking between the processors of the advanced computing system.

Figure 32:
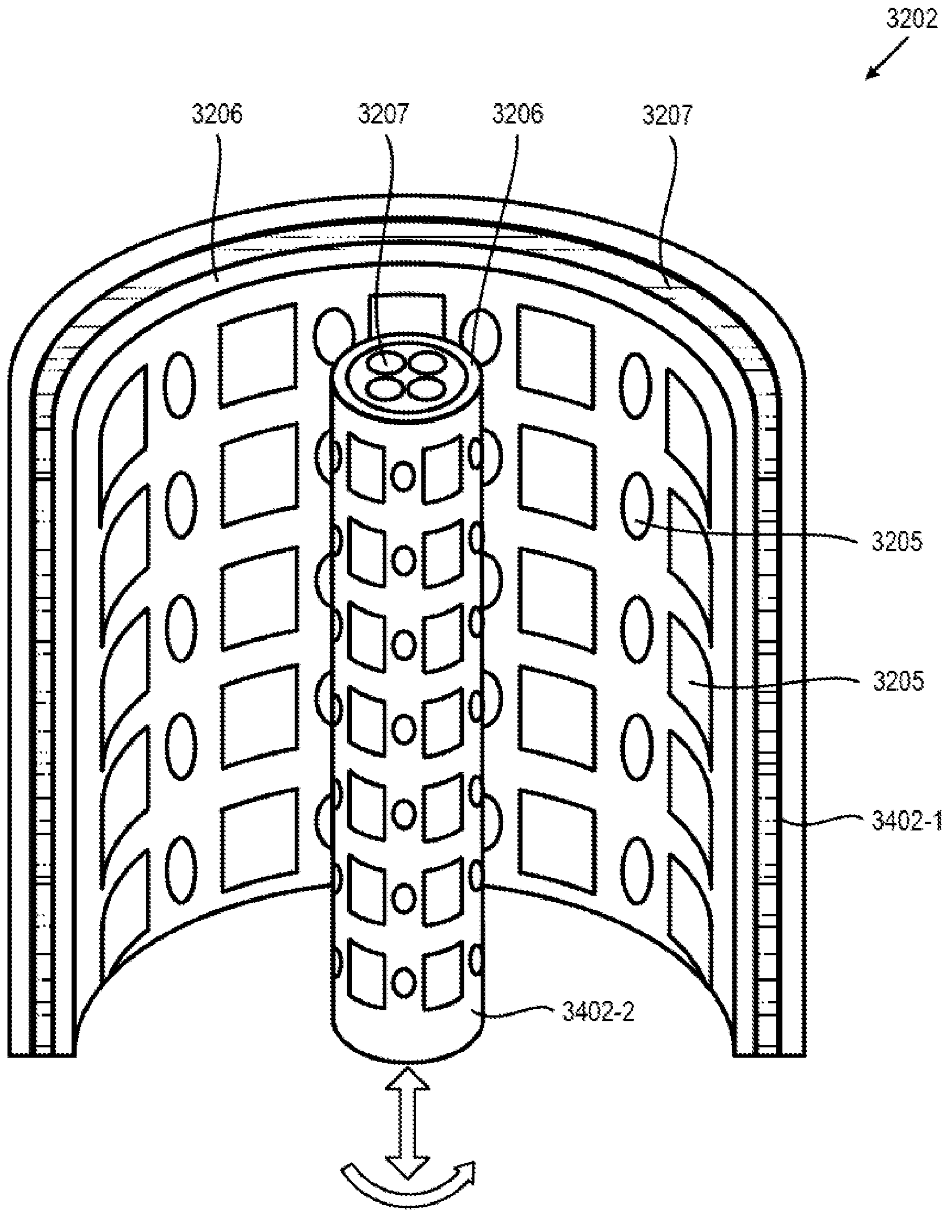
FIG. 32 is a partial cutaway view of a computing system with an inner cylinder and an outer cylinder.

FIG. 32 is a partially cutaway of a computing system 3202 with a plurality of display devices 3203 and cameras 3205 that are each associated with embedded processors 3206. The computing system 3202 includes an outer cylinder 3204-1 and an inner cylinder 3204-2. In some embodiments, the inner cylinder 3204-2 is a movable cylinder that is movable in a rotational direction and/or an axial direction to alter network topology between the spatiotemporal communication devices (e.g., display devices 3203 and cameras 3205) coupled to the inner cylinder 3204-2 and the spatiotemporal communication devices coupled to the outer cylinder 3204-1.

In some embodiments, the spatiotemporal communication devices of the inner cylinder 3204-2 receive and relay (e.g., transmit with display devices 3203) spatiotemporal patterns received from the outer cylinder 3204-1. For example, the spatiotemporal communication devices of the inner cylinder 3204-2 allows for relayed communications between any of the processors 3206 of the outer cylinder 3204-1.

In some embodiments, the outer cylinder 3204-1 and the inner cylinder 3204-2 both include processors 3206 therein. The spatiotemporal communication devices of the inner cylinder 3204-2 and the spatiotemporal communication devices of the outer cylinder 3204-1 communicate information between the processors 3206. In some embodiments, the inner cylinder 3204-2 moves in a rotational direction and/or an axial direction to align the spatiotemporal communication devices in various pairs or with various FOVs to change network topologies. The computing system 3202 thereby has a variable network topology of direct data communication between processors 3206.

The computing system 3202, in some embodiments, includes liquid cooling and/or liquid power to support the processors 3206 and/or other electronic components in the outer cylinder 3204-1 and/or inner cylinder 3204-2. In some embodiments, liquid channels 3207 in the outer cylinder 3204-1 and/or inner cylinder 3204-2 provide thermal management to the outer cylinder 3204-1 and/or inner cylinder 3204-2. In some embodiments, the liquid channels 3207 carry a catholyte and/or anolyte through the outer cylinder 3204-1 and/or inner cylinder 3204-2 for electrochemical power generation proximate the processors 3206.

In some embodiments, the liquid channels 3207 can be coupled to an external liquid manifold through a rotatable coupling. Rotatable liquid couplings allow flow through the coupling during rotation of, for example, the inner cylinder 3204-2 relative to the outer cylinder 3204-1. With a liquid-based thermal management system and a liquid-based power generation system, the processors 3206 and other electronic components of the inner cylinder 3204-2 operate without solid wires, cabling, or heat pipes. Conventional data communication imposes a limit on the rotation and/or axial movement of the outer cylinder 3204-1 and/or inner cylinder 3204-2 relative one another, but with spatiotemporal communication, according to the present disclosure, only optical communication or other transmission through free space is needed to allow network communication within the computing system 3202. A faster, more flexible computing system 3202 is therefore possible.

Following are sections in accordance with embodiments of the present disclosure:

A1. A method for encoding data in a datacenter comprising:
obtaining the data to be encoded;
encoding the data to a set of encoded spatiotemporal patterns, including at least three colors; and
outputting the set of encoded spatiotemporal patterns.

A2. The method of section A1, wherein the data is obtained from a first sending node.

A3. The method of section A2, wherein the first sending node includes at least one of a server, an application, a storage device, and a memory.

A4. The method of any of sections A1-A3, wherein the data includes a first set of data and a second set of data.

A5. The method of section A4, wherein the first set of data and the second set of data are obtained from a first sending node.

A6. The method of any of sections A4 or A5, wherein the first set of data is obtained from a first sending node and the second set of data is obtained from a second sending node.

A7. The method of any of sections A1-A6, wherein the data is non-serialized data.

A8. The method of any of sections A1-A7, wherein encoding the data to the set of encoded spatiotemporal patterns includes encoding the data into code symbols.

A9. The method of section A8, wherein the code symbols are organized into encoded spatiotemporal patterns.

A10. The method of any of sections A8 or A9, wherein encoding the data into the code symbols further includes encoding the data into bit stream and encoding the bit stream into the code symbols.

A11. The method of section A8, wherein a first code symbol includes a first level of intensity, and a second code symbol includes a second level of intensity.

A12. The method of section A1 l, wherein at least one of the first level or the second level of intensity is used for providing header information.

A13. The method of section A12, wherein the header information indicates intended recipient for the data.

A14. The method of section A12, wherein the header information indicates level of priority for the data.

A15. The method of any of sections A1-A14, wherein the set of encoded spatiotemporal patterns includes colors producible by visible light.

A16. The method of any of sections A1-A15, wherein at least two of the at least three colors are used for encoding the data.

A17. The method of any of sections A1-A10 and A15-16, wherein at least one of the at least three colors are used for providing header information.

A18. The method of section A17, wherein the header information indicates intended recipient for the data.

A19. The method of any of sections A17 or A18, wherein the header information indicates level of priority for the data.

A20. The method of any of sections A1-A19, wherein the set of encoded spatiotemporal patterns includes one or more of a visible light and a near-visible light.

A21. The method of section A20, wherein the near-visible light is one or more of an UV light and an IR light.

A22. The method of any of sections A20 or A21, wherein the near-visible light indicates intended recipient for the data.

A23. The method of any of sections A20-A22, wherein the near-visible light indicates level of priority for the data.

A24. The method of any of sections A1-A23, wherein the set of encoded spatiotemporal patterns further includes at least one of a shape factor, a location factor, a size factor, and a timing factor.

A25. The method of section A24, wherein at least one of the shape factors, the location factor, the size factor, and the timing factor indicates intended recipient for the data.

A26. The method of any of section A24 or A25, wherein at least one of the shape factors, the location factor, and the size factor indicates level of priority for the data.

A27. The method of any of sections A1-A26, wherein the set of encoded spatiotemporal patterns move in space relative to time.

A28. The method of section A27, wherein the set of encoded spatiotemporal patterns move in a predetermined pattern.

A29. The method of any of sections A1-A28, further including displaying outputted set of encoded spatiotemporal patterns.

A30. The method of section A29, wherein displaying the outputted set of encoded spatiotemporal patterns includes displaying by a projector to a screen.

A31. The method of any of sections A29 or A30, wherein displaying the outputted set of encoded spatiotemporal patterns includes displaying by at least one of a computer screen, and a TV monitor.

A32. The method of any of sections A29-A31, wherein displaying the outputted set of encoded spatiotemporal patterns includes displaying on two or more displays.

A33. The method of any of sections A29-A32, wherein displaying the outputted set of encoded spatiotemporal patterns includes displaying two or more sets of encoded spatiotemporal patterns.

A34. The method of section A33, wherein the two or more sets of encoded spatiotemporal patterns overlap at least partially.

B1. A method for decoding data in a datacenter comprising:

spatiotemporally obtaining a set of encoded spatiotemporal patterns including at least three colors;

decoding the set of encoded spatiotemporal patterns into a decoded data; and storing the decoded data.

B2. The method of section B1, wherein spatiotemporally obtaining the set of encoded spatiotemporal patterns includes obtaining from at least one of a display and a projector screen.

B3. The method of section B2, wherein the display is at least one of a computer screen and a TV monitor.

B4. The method of any of sections B1-B3, wherein spatiotemporally obtaining the set of encoded spatiotemporal patterns includes obtaining by at least one of a camera, a video camera, and an image sensor.

B5. The method of section B4, wherein at least one of the camera, the video camera and the image sensor is able to capture visible light and near-visible light.

B6. The method of any of sections B1-B5, wherein spatiotemporally obtaining the set of encoded spatiotemporal patterns includes obtaining by a first camera and a second camera.

B7. The method of section B6, wherein the first camera is able to capture visible light and the second camera is able to capture near-visible light.

B8. The method of any of sections B1-B7, wherein the decoded data is non-serialized data in a matrix form.

B9. The method of any of sections B1-B8, wherein the set of encoded spatiotemporal patterns includes code symbols.

B10. The method of section B9, wherein decoding the set of encoded spatiotemporal patterns into the decoded data includes decoding the code symbols into the data.

B11. The method of section B10, wherein decoding the code symbols into the decoded data further includes decoding the code symbols into a bit stream and decoding the bit stream into the data.

B12. The method of any of sections B1-B11, wherein the set of encoded spatiotemporal patterns includes colors producible by visible light.

B13. The method of any of sections B1-B12, wherein at least two of the at least three colors are used for decoding the data.

B14. The method of any of sections B1-B12, wherein at least one of the at least three colors are used for providing header information.

B15. The method of section B14, wherein the header information indicates intended recipient for the data.

B16. The method of section B14, wherein the header information indicates level of priority for the data.

B17. The method of any of sections B9-B11, wherein at least one code symbol includes a different level of intensity than another code symbol.

B18. The method of section B17, wherein at least one level of intensity is used for providing header information.

B19. The method of section B18, wherein the header information indicates intended recipient for the data.

B20. The method of section B18, wherein the header information indicates level of priority for the data.

B21. The method of any of sections B1-B20, wherein the set of encoded spatiotemporal patterns includes one or more of a visible light and a near-visible light.

B22. The method of section B21, wherein the near-visible light is one or more of an UV light and an IR light.

B23. The method of any of sections B21 or B22, wherein the near-visible light indicates intended recipient for the data.

B24. The method of any of sections B21 or B22, wherein the near-visible light indicates level of priority for the data.

B25. The method of any of sections B1-B24, wherein the set of encoded spatiotemporal patterns further includes at least one of a shape factor, a location factor, a size factor, and a timing factor.

B26. The method of section B25, wherein at least one of the shape factors, the location factor, the size factor, and the timing factor indicates intended recipient for the data.

B27. The method of section B25, wherein at least one of the shape factors, the location factor, and the size factor indicates level of priority for the data.

B28. The method of any of sections B1-B27, wherein the set of encoded spatiotemporal patterns move in space relative to time.

B29. The method of section B28, wherein the set of encoded spatiotemporal patterns move in a predetermined pattern.

B30. The method of any of sections B1-B29, wherein storing the decoded data includes storing to a storage device.

C1. A method for transmitting data in a datacenter comprising:

encoding the data to a set of encoded spatiotemporal patterns, including at least three colors;

displaying the set of encoded spatiotemporal patterns;

spatiotemporally obtaining the set of encoded spatiotemporal patterns; and decoding the set of encoded spatiotemporal patterns into the data.

C2. The method of section C1, further including obtaining the data from a first sending node.

C3. The method of section C2, wherein the first sending node includes at least one of a server, an application, a storage device, and a memory.

C4. The method of any of sections C1-C3, wherein the data includes a first set of data and a second set of data.

C5. The method of section C4, wherein the first set of data and the second set of data are obtained from a first sending node.

C6. The method of any of sections C4 or C5, wherein the first set of data are further obtained from a first sending node and the second set of data is obtained from a second sending node.

C7. The method of any of sections C1-C6, wherein the data is non-serialized data.

C8. The method of any of sections C1-C7, wherein encoding the data to the set of encoded spatiotemporal patterns includes encoding the data into code symbols.

C9. The method of section C8, wherein the code symbols are organized into the set of encoded spatiotemporal patterns.

C10. The method of any of sections C8 or C9, wherein encoding the data into the code symbols further includes encoding the data into bit stream and encoding the bit stream into the code symbols.

C11. The method of any of sections C1-C10, wherein the set of encoded spatiotemporal patterns includes colors producible by visible light.

C12. The method of any of sections C1-C11, wherein at least two of the at least three colors are used for encoding the data.

C13. The method of any of sections C1-C12, wherein at least one of the at least three colors are used for providing header information.

C14. The method of section C13, wherein the header information indicates intended recipient for the data.

C15. The method of section C13, wherein the header information indicates level of priority for the data.

C16. The method of any of sections C8-C10, wherein at least one code symbol includes a different level of intensity than another code symbol.

C17. The method of section C16, wherein at least one level of intensity is used for providing header information.

C18. The method of section C17, wherein the header information indicates intended recipient for the data.

C19. The method of section C17, wherein the header information indicates level of priority for the data.

C20. The method of any of sections C1-C19, wherein the set of encoded spatiotemporal patterns includes one or more of a visible light and a near-visible light.

C21. The method of section C20, wherein the near-visible light is one or more of an UV light and an IR light.

C22. The method of any of sections C20 or C21, wherein the near-visible light indicates intended recipient for the data.

C23. The method of any of sections C20 or C21, wherein the near-visible light indicates level of priority for the data.

C24. The method of any of sections C1-C23, wherein the set of encoded spatiotemporal patterns further includes at least one of a shape factor, a location factor, a size factor, and a timing factor.

C25. The method of section C24, wherein at least one of the shape factors, the location factor, the size factor, and the timing factor indicates intended recipient for the data.

C26. The method of any of sections C24 or C25, wherein at least one of the shape factors, the location factor, and the size factor indicates level of priority for the data.

C27. The method of any of sections C1-C26, wherein the set of encoded spatiotemporal patterns in the set of encoded spatiotemporal patterns move in space relative to time.

C28. The method of section C27, wherein the set of encoded spatiotemporal patterns in the set of encoded spatiotemporal patterns move in a predetermined pattern.

C29. The method of any of sections C1-C28, wherein displaying the set of encoded spatiotemporal patterns includes displaying by a projector to a screen.

C30. The method of any of sections C1-C28, wherein displaying the set of encoded spatiotemporal patterns includes displaying by at least one of a computer screen, and a TV monitor.

C31. The method of any of sections C1-C30, wherein displaying the set of encoded spatiotemporal patterns includes displaying on two or more displays.

C32. The method of any of sections C1-C31, wherein displaying the set of encoded spatiotemporal patterns includes displaying two or more sets of encoded spatiotemporal patterns.

C33. The method of section C32, wherein the two or more sets of encoded spatiotemporal patterns overlap at least partially.

C34. The method of any of sections C1-C33, wherein spatiotemporally obtaining the set of encoded spatiotemporal patterns includes obtaining by at least one of a camera, a video camera, and an image sensor.

C35. The method of section C34, wherein at least one of the camera, the video camera and the image sensor is able to capture visible light and near-visible light.

C36. The method of any of sections C1-C35, wherein spatiotemporally obtaining the set of encoded spatiotemporal patterns includes obtaining by a first camera and a second camera.

C37. The method of section C36, wherein the first camera is able to capture visible light and the second camera is able to capture near-visible light.

C38. The method of any of sections C8-C10, wherein decoding the set of encoded spatiotemporal patterns into the data includes decoding the code symbols into the data.

C39. The method of section C38, wherein decoding the code symbols into the data further includes decoding the code symbols into a bit stream and decoding the bit stream into the data.

C40. The method of any of sections C1-C39, further includes storing decoded data to a storage device.

C41. The method of section C2, wherein the first sending node is configured to obtain the set of encoded spatiotemporal patterns.

C42. The method of section C41, further including the first sending node configured to verify from obtained set of encoded spatiotemporal patterns that the data was outputted correctly.

C43. The method of section C42, wherein the first sending node is configured to resend the data if the data was outputted incorrectly.

D1. A method for encoding data in a datacenter comprising:

obtaining the data to be encoded;

encoding the data to a set of encoded spatiotemporal patterns, including a first level of intensity and a second level of intensity; and outputting the set of encoded spatiotemporal patterns.

D2. The method of section D1, wherein the data is obtained from a first sending node.

D3. The method of section D2, wherein the first sending node includes at least one of a server, an application, a storage device, and a memory.

D4. The method of any of sections D1-D3, wherein the data includes a first set of data and a second set of data.

D5. The method of section D4, wherein the first set of data and the second set of data are obtained from a first sending node.

D6. The method of section D4, wherein the first set of data is obtained from a first sending node and the second set of data is obtained from a second sending node.

D7. The method of any of sections D1-D6, wherein the data is non-serialized data.

D8. The method of any of sections D1-D7, wherein encoding the data to a set of encoded spatiotemporal patterns includes encoding the data into code symbols.

D9. The method of section D8, wherein the code symbols are organized into encoded spatiotemporal patterns.

D10. The method of any of sections D8 or D9, wherein encoding the data into the code symbols further includes encoding the data into bit stream and encoding the bit stream into the code symbols.

D11. The method of any of sections D1-D10, wherein the set of encoded spatiotemporal patterns includes at least one color producible by visible light.

D12. The method of any of sections D1-D10, wherein the set of encoded spatiotemporal patterns includes at least two colors producible by visible light.

D13. The method of any of sections D1-D12, wherein the first level of intensity and the second level of intensity are used for encoding the data.

D14. The method of section D12, wherein the at least two colors are used for encoding the data.

D15. The method of any of sections D1-D12, wherein at least one level of intensity is used for providing header information.

D16. The method of section D11, wherein the at least one color is used for providing header information.

D17. The method of any of sections D15 or D16, wherein the header information indicates intended recipient for the data.

D18. The method of any of sections D15 or D16, wherein the header information indicates level of priority for the data.

D19. The method of any of sections D1-D18, wherein the set of encoded spatiotemporal patterns further includes a near-visible light.

D20. The method of section D19, wherein the near-visible light is one or more of an UV light and an IR light.

D21. The method of any of sections D19-D20, wherein the near-visible light indicates intended recipient for the data.

D22. The method of any of sections D19-D20, wherein the near-visible light indicates level of priority for the data.

D23. The method of any of sections D1-D22, wherein the set of encoded spatiotemporal patterns further includes at least one of a shape factor, a location factor, a size factor, and a timing factor.

D24. The method of section D23, wherein at least one of the shape factors, the location factor, the size factor, and the timing factor indicates intended recipient for the data.

D25. The method of any of sections D23-D24, wherein at least one of the shape factors, the location factor, and the size factor indicates level of priority for the data.

D26. The method of any of sections D1-D25, wherein the set of encoded spatiotemporal patterns in the set of encoded spatiotemporal patterns move in space relative to time.

D27. The method of section D26, wherein the set of encoded spatiotemporal patterns in the set of encoded spatiotemporal patterns move in a predetermined pattern.

D28. The method of any of sections D1-D27, wherein outputting the set of encoded spatiotemporal patterns further includes displaying outputted set of encoded spatiotemporal patterns.

D29. The method of section D28, wherein displaying the outputted set of encoded spatiotemporal patterns includes displaying by a projector to a screen.

D30. The method of any of sections D28 or D29, wherein displaying the outputted set of encoded spatiotemporal patterns includes displaying by at least one of a computer screen, and a TV monitor.

D31. The method of any of sections D28-D30, wherein displaying the outputted set of encoded spatiotemporal patterns includes displaying on two or more displays.

D32. The method of any of sections D28-D31, wherein displaying the outputted set of encoded spatiotemporal patterns includes displaying two or more sets of encoded spatiotemporal patterns.

D33. The method of section D32, wherein the two or more sets of encoded spatiotemporal patterns overlap at least partially.

E1. A method for decoding data in a datacenter comprising:

spatiotemporally obtaining a set of encoded spatiotemporal patterns including a first level of intensity and a second level of intensity;

decoding the set of encoded spatiotemporal patterns into a decoded data; and storing the decoded data.

E2. The method of section E1, wherein spatiotemporally obtaining a set of encoded spatiotemporal patterns includes obtaining from at least one of a display and a projector screen.

E3. The method of section E2, wherein the display is at least one of a computer screen and a TV monitor.

E4. The method of any of sections E1-E3, wherein spatiotemporally obtaining a set of encoded spatiotemporal patterns includes obtaining by at least one of a camera, a video camera, and an image sensor.

E5. The method of section E4, wherein at least one of the camera, the video camera and the image sensor is able to capture visible light and near-visible light.

E6. The method of any of sections E1-E5, wherein spatiotemporally obtaining a set of encoded spatiotemporal patterns includes obtaining by a first camera and a second camera.

E7. The method of section E6, wherein the first camera is able to capture visible light and the second camera is able to capture near-visible light.

E8. The method of any of sections E1-E7, wherein decoded data is non-serialized data in a matrix form.

E9. The method of any of sections E1-E8, wherein the set of encoded spatiotemporal patterns includes code symbols.

E10. The method of section E9, wherein decoding the set of encoded spatiotemporal patterns into the decoded data includes decoding the code symbols into the data.

E11. The method of section E10, wherein decoding the code symbols into the data further includes decoding the code symbols into a bit stream and decoding the bit stream into the data.

E12. The method of any of sections E1-E11, wherein the set of encoded spatiotemporal patterns includes colors producible by visible light.

E13. The method of section E12, wherein at least two colors are used for decoding the data.

E14. The method of any of sections E1-E13, wherein the first level of intensity and the second level of intensity are used for decoding the data.

E15. The method of any of sections E12-E14, wherein at least one color is used for providing header information.

E16. The method of section E15, wherein the header information indicates intended recipient for the data.

E17. The method of section E15, wherein the header information indicates level of priority for the data.

E18. The method of any of sections E1-E17, wherein at least one level of intensity is used for providing header information.

E19. The method of section E18, wherein the header information indicates intended recipient for the data.

E20. The method of section E18, wherein the header information indicates level of priority for the data.

E21. The method of any of sections E1-E20, wherein the set of encoded spatiotemporal patterns includes one or more of a visible light and a near-visible light.

E22. The method of section E21, wherein the near-visible light is one or more of an UV light and an IR light.

E23. The method of any of sections E21 or E22, wherein the near-visible light indicates intended recipient for the data.

E24. The method of any of sections E21 or E22, wherein the near-visible light indicates level of priority for the data.

E25. The method of any of sections E1-E24, wherein the set of encoded spatiotemporal patterns further includes at least one of a shape factor, a location factor, a size factor, and a timing factor.

E26. The method of section E25, wherein at least one of the shape factors, the location factor, the size factor, and the timing factor indicates intended recipient for the data.

E27. The method of any of sections E25 or E26, wherein at least one of the shape factors, the location factor, and the size factor indicates level of priority for the data.

E28. The method of any of sections E1-E27, wherein the set of encoded spatiotemporal patterns in the set of encoded spatiotemporal patterns move in space relative to time.

E29. The method of section E28, wherein the set of encoded spatiotemporal patterns in the set of encoded spatiotemporal patterns move in a predetermined pattern.

E30. The method of any of sections E1-E29, wherein storing the decoded data includes storing to a storage device.

F1. A method for transmitting data in a datacenter comprising:

encoding the data to a set of encoded spatiotemporal patterns, including a first level of intensity and a second level of intensity;

displaying the set of encoded spatiotemporal patterns;

spatiotemporally obtaining the set of encoded spatiotemporal patterns; and decoding the set of encoded spatiotemporal patterns into the data.

F2. The method of section F1, further including obtaining the data from a first sending node.

F3. The method of section F2, wherein the first sending node includes at least one of a server, an application, a storage device, and a memory.

F4. The method of any of sections F1-F3, wherein the data includes a first set of data and a second set of data.

F5. The method of section F4, wherein the first set of data and the second set of data are obtained from a first sending node.

F6. The method of any of sections F4 or F5, wherein the first set of data are further obtained from a first sending node and the second set of data is obtained from a second sending node.

F7. The method of any of sections F1-F6, wherein the data is non-serialized data.

F8. The method of any of sections F1-F7, wherein encoding the data to a set of encoded spatiotemporal patterns includes encoding the data into code symbols.

F9. The method of section F8, wherein the code symbols are organized into encoded spatiotemporal patterns.

F10. The method of any of sections F8 or F9, wherein encoding the data into the code symbols further includes encoding the data into bit stream and encoding the bit stream into the code symbols.

F11. The method of any of sections F1-F10, wherein the set of encoded spatiotemporal patterns includes at least one color producible by visible light.

F12. The method of any of sections F1-F 11, wherein the set of encoded spatiotemporal patterns includes at least two colors producible by visible light.

F13. The method of section F12, wherein the at least two colors are used for encoding the data.

F14. The method of any of sections F1-F13, wherein the first level of intensity and the second level of intensity are used for encoding the data.

F15. The method of section F12, wherein at least one color is used for providing header information.

F16. The method of section F15, wherein the header information indicates intended recipient for the data.

F17. The method of section F15, wherein the header information indicates level of priority for the data.

F18. The method of any of sections F1-F14, wherein at least one level of intensity is used for providing header information.

F19. The method of section F18, wherein the header information indicates intended recipient for the data.

F20. The method of section F18, wherein the header information indicates level of priority for the data.

F21. The method of any of sections F1-F20, wherein the set of encoded spatiotemporal patterns includes one or more of a visible light and a near-visible light.

F22. The method of section F21, wherein the near-visible light is one or more of an UV light and an IR light.

F23. The method of any of sections F21 or F22, wherein the near-visible light indicates intended recipient for the data.

F24. The method of any of sections F21 or F22, wherein the near-visible light indicates level of priority for the data.

F25. The method of any of sections F1-F24, wherein the set of encoded spatiotemporal patterns further includes at least one of a shape factor, a location factor, a size factor, and a timing factor.

F26. The method of section F25, wherein at least one of the shape factors, the location factor, the size factor, and the timing factor indicates intended recipient for the data.

F27. The method of section F25, wherein at least one of the shape factors, the location factor, and the size factor indicates level of priority for the data.

F28. The method of any of sections F1-F27, wherein the set of encoded spatiotemporal patterns in the set of encoded spatiotemporal patterns move in space relative to time.

F29. The method of section F28, wherein the set of encoded spatiotemporal patterns in the set of encoded spatiotemporal patterns move in a predetermined pattern.

F30. The method of any of sections F1-F29, wherein displaying the set of encoded spatiotemporal patterns includes displaying by a projector to a screen.

F31. The method of any of sections F1-F29, wherein displaying the set of encoded spatiotemporal patterns includes displaying by at least one of a computer screen, and a TV monitor.

F32. The method of any of sections F1-F31, wherein displaying the set of encoded spatiotemporal patterns includes displaying on two or more displays.

F33. The method of any of sections F1-F32, wherein displaying the set of encoded spatiotemporal patterns includes displaying two or more sets of encoded spatiotemporal patterns.

F34. The method of section F33, wherein the two or more sets of encoded spatiotemporal patterns overlap at least partially.

F35. The method of any of sections F1-F34, wherein spatiotemporally obtaining the set of encoded spatiotemporal patterns includes obtaining by at least one of a camera, a video camera, and an image sensor.

F36. The method of section F35, wherein at least one of the camera, the video camera and the image sensor is able to capture visible light and near-visible light.

F37. The method of any of sections F1-F36, wherein spatiotemporally obtaining the set of encoded spatiotemporal patterns includes obtaining by a first camera and a second camera.

F38. The method of section F37, wherein the first camera is able to capture visible light and the second camera is able to capture near-visible light.

F39. The method of any of sections F8-F10, wherein decoding the set of encoded spatiotemporal patterns into the data includes decoding the code symbols into the data.

F40. The method of section F39, wherein decoding the code symbols into the data further includes decoding the code symbols into a bit stream and decoding the bit stream into the data.

F41. The method of any of sections F1-F40, further includes storing the data to a storage device.

F42. The method of section F2, wherein the first sending node is configured to obtain displayed set of encoded spatiotemporal patterns.

F43. The method of section F42, further including the first sending node to verify from obtained displayed set of encoded spatiotemporal patterns that the data was outputted correctly.

F44. The method of section F43, wherein the first sending node is configured to resend the data if the data was outputted incorrectly.

G1. A method for encoding data in a datacenter comprising:

obtaining the data to be encoded;

encoding the data to a set of encoded spatiotemporal patterns, including visible light and near-visible light; and outputting the set of encoded spatiotemporal patterns.

G2. The method of section G1, wherein the data is obtained from a first sending node.

G3. The method of section G2, wherein the first sending node includes at least one of a server, an application, a storage device, and a memory.

G4. The method of any of section G1-G3, wherein the data includes a first set of data and a second set of data.

G5. The method of section G4, wherein the first set of data and the second set of data are obtained from a first sending node.

G6. The method of section G4, wherein the first set of data is obtained from a first sending node and the second set of data is obtained from a second sending node.

G7. The method of any of sections G1-G6, wherein the data is non-serialized data.

G8. The method of any of section G1-G7, wherein encoding the data to the set of encoded spatiotemporal patterns includes encoding the data into code symbols.

G9. The method of section G8, wherein the code symbols are organized into encoded spatiotemporal patterns.

G10. The method of any of sections G8 of G9, wherein encoding the data into the code symbols further includes encoding the data into bit stream and encoding the bit stream into the code symbols.

G11. The method of any of sections G1-G10, wherein the set of encoded spatiotemporal patterns includes at least two colors.

G12. The method of section G11, wherein the at least two colors are used for encoding the data.

G13. The method of section G11, wherein at least one of the at least two colors are used for providing header information.

G14. The method of section G13, wherein the header information indicates intended recipient for the data.

G15. The method of section G13, wherein the header information indicates level of priority for the data.

G16. The method of section G8, wherein at least one code symbol includes a different level of intensity than another code symbol.

G17. The method of section G16, wherein at least one level of intensity is used for providing header information.

G18. The method of section G17, wherein the header information indicates intended recipient for the data.

G19. The method of section G17, wherein the header information indicates level of priority for the data.

G20. The method of any of sections G1-G19, wherein the near-visible light is one or more of an UV light and an IR light.

G21. The method of any of sections G1-G20, wherein the near-visible light indicates intended recipient for the data.

G22. The method of any of sections G1-G20, wherein the near-visible light indicates level of priority for the data.

G23. The method of any of sections G1-G22, wherein the set of encoded spatiotemporal patterns further includes at least one of a shape factor, a location factor, a size factor, and a timing factor.

G24. The method of section G23, wherein at least one of the shape factors, the location factor, the size factor, and the timing factor indicates intended recipient for the data.

G25. The method of any of sections G23 or G24, wherein at least one of the shape factors, the location factor, and the size factor indicates level of priority for the data.

G26. The method of any of sections G1-G25, wherein the set of encoded spatiotemporal patterns in the set of encoded spatiotemporal patterns move in space relative to time.

G27. The method of section G26, wherein the set of encoded spatiotemporal patterns in the set of encoded spatiotemporal patterns move in a predetermined pattern.

G28. The method of any of sections G1-G27, wherein outputting the set of encoded spatiotemporal patterns further includes displaying the set of encoded spatiotemporal patterns.

G29. The method of section G28, wherein displaying the set of encoded spatiotemporal patterns includes displaying by a projector to a screen.

G30. The method of any of sections G28, wherein displaying the set of encoded spatiotemporal patterns includes displaying by at least one of a computer screen, and a TV monitor.

G31. The method of any of sections G28 or G30, wherein displaying the set of encoded spatiotemporal patterns includes displaying on two or more displays.

G32. The method of any of sections G28-G31, wherein displaying the set of encoded spatiotemporal patterns includes displaying two or more sets of encoded spatiotemporal patterns.

G33. The method of section G32, wherein the two or more sets of encoded spatiotemporal patterns overlap at least partially.

H1. A method for decoding data in a datacenter comprising:

spatiotemporally obtaining a set of encoded spatiotemporal patterns including visible light and near-visible light;

decoding the set of encoded spatiotemporal patterns into a decoded data; and storing the decoded data.

H2. The method of section H1, wherein spatiotemporally obtaining the set of encoded spatiotemporal patterns includes obtaining from at least one of a display and a projector screen.

H3. The method of section H2, wherein the display is at least one of a computer screen and a TV monitor.

H4. The method of any of sections H1-H3, wherein spatiotemporally obtaining the set of encoded spatiotemporal patterns includes obtaining by at least one of a camera, a video camera, and an image sensor.

H5. The method of section H4, wherein at least one of the camera, the video camera and the image sensor is able to capture visible light and near-visible light.

H6. The method of any of sections H1-H5, wherein spatiotemporally obtaining the set of encoded spatiotemporal patterns includes obtaining by a first camera and a second camera.

H7. The method of section H6, wherein the first camera is able to capture visible light and the second camera is able to capture near-visible light.

H8. The method of any of sections H1-H7, wherein the decoded data is non-serialized data in a matrix form.

H9. The method of any of sections H1-H8, wherein the set of encoded spatiotemporal patterns includes code symbols.

H10. The method of section H9, wherein decoding the set of encoded spatiotemporal patterns into a decoded data includes decoding the code symbols into the data.

H11. The method of section H10, wherein decoding the code symbols into the data further includes decoding the code symbols into a bit stream and decoding the bit stream into the data.

H12. The method of any of sections H1-H11, wherein the set of encoded spatiotemporal patterns includes at least two colors.

H13. The method of section H12, wherein the at least two colors are used for decoding the data.

H14. The method of any of sections H12 or H13, wherein at least one of the at least two colors are used for providing header information.

H15. The method of section H14, wherein the header information indicates intended recipient for the data.

H16. The method of section H14, wherein the header information indicates level of priority for the data.

H17. The method of any of sections H9-H11, wherein at least one code symbol includes a different level of intensity than another code symbol.

H18. The method of section H17, wherein at least one level of intensity is used for providing header information.

H19. The method of section H18, wherein the header information indicates intended recipient for the data.

H20. The method of section H18, wherein the header information indicates level of priority for the data.

H21. The method of any of sections H1-H20, wherein the near-visible light is one or more of an UV light and an IR light.

H22. The method of any of sections H1-H21, wherein the near-visible light indicates intended recipient for the data.

H23. The method of any of sections H1-H21, wherein the near-visible light indicates level of priority for the data.

H24. The method of any of sections H1-H23, wherein the set of encoded spatiotemporal patterns further includes at least one of a shape factor, a location factor, a size factor, and a timing factor.

H25. The method of section H24, wherein at least one of the shape factors, the location factor, the size factor, and the timing factor indicates intended recipient for the data.

H26. The method of section H24, wherein at least one of the shape factors, the location factor, and the size factor indicates level of priority for the data.

H27. The method of any of sections H1-H26, wherein the set of encoded spatiotemporal patterns in the set of encoded spatiotemporal patterns move in space relative to time.

H28. The method of section H27, wherein the set of encoded spatiotemporal patterns in the set of encoded spatiotemporal patterns move in a predetermined pattern.

H29. The method of any of sections H1-H28, wherein storing the decoded data includes storing to a storage device.

I1. A method for transmitting data in a datacenter comprising:

encoding the data to a set of encoded spatiotemporal patterns, including visible light and near-visible light;

displaying the set of encoded spatiotemporal patterns;

spatiotemporally obtaining the set of encoded spatiotemporal patterns; and decoding the set of encoded spatiotemporal patterns into the data.

I2. The method of section I1, further including obtaining the data from a first sending node.

I3. The method of section I2, wherein the first sending node includes at least one of a server, an application, a storage device, and a memory.

I4. The method of any of sections I1-I3, wherein the data includes a first set of data and a second set of data.

I5. The method of section I4, wherein the first set of data and the second set of data are obtained from a first sending node.

I6. The method of any of sections I4 or I5, wherein the first set of data are further obtained from a first sending node and the second set of data is obtained from a second sending node.

I7. The method of any of sections I1-I6, wherein the data is non-serialized data.

I8. The method of any of sections I1-I7, wherein encoding the data to the set of encoded spatiotemporal patterns includes encoding the data into code symbols.

I9. The method of section I8, wherein the code symbols are organized into encoded spatiotemporal patterns.

I10. The method of any of sections I8 or I9, wherein encoding the data into the code symbols further includes encoding the data into bit stream and encoding the bit stream into the code symbols.

I11. The method of any of sections I1-I10, wherein the set of encoded spatiotemporal patterns includes at least two colors.

I12. The method of section I11, wherein the at least two colors are used for encoding the data.

I13. The method of section I11, wherein at least one of the at least two colors are used for providing header information.

I14. The method of section I13, wherein the header information indicates intended recipient for the data.

I15. The method of section I13, wherein the header information indicates level of priority for the data.

I16. The method of any of sections I8-I10, wherein at least one code symbol includes a different level of intensity than another code symbol.

I17. The method of any of sections I16-I16, wherein at least one level of intensity is used for providing header information.

I18. The method of section I17, wherein the header information indicates intended recipient for the data.

I19. The method of section I17, wherein the header information indicates level of priority for the data.

I20. The method of any of sections I1-I19, wherein the near-visible light is one or more of an UV light and an IR light.

I21. The method of any of sections I1-I20, wherein the near-visible light indicates intended recipient for the data.

I22. The method of any of sections I1-I20, wherein the near-visible light indicates level of priority for the data.

I23. The method of any of sections I1-I22, wherein the set of encoded spatiotemporal patterns further includes at least one of a shape factor, a location factor, a size factor, and a timing factor.

I24. The method of section I23, wherein at least one of the shape factors, the location factor, the size factor, and the timing factor indicates intended recipient for the data.

I25. The method of any of sections I23 or I24, wherein at least one of the shape factors, the location factor, and the size factor indicates level of priority for the data.

I26. The method of any of sections I1-I25, wherein the set of encoded spatiotemporal patterns in the set of encoded spatiotemporal patterns move in space relative to time.

I27. The method of section I26, wherein the set of encoded spatiotemporal patterns in the set of encoded spatiotemporal patterns move in a predetermined pattern.

I28. The method of any of sections I1-I27, wherein displaying the set of encoded spatiotemporal patterns includes displaying by a projector to a screen.

I29. The method of any of sections I1-I28, wherein displaying the set of encoded spatiotemporal patterns includes displaying by at least one of a computer screen, and a TV monitor.

I30. The method of any of sections I1-I29, wherein displaying the set of encoded spatiotemporal patterns includes displaying on two or more displays.

I31. The method of any of sections I1-I30, wherein displaying the set of encoded spatiotemporal patterns includes displaying two or more sets of encoded spatiotemporal patterns.

I32. The method of section I31, wherein the two or more sets of encoded spatiotemporal patterns overlap at least partially.

I33. The method of any of sections I1-I32, wherein spatiotemporally obtaining the set of encoded spatiotemporal patterns includes obtaining by at least one of a camera, a video camera, and an image sensor.

I34. The method of section I33, wherein at least one of the camera, the video camera and the image sensor is able to capture visible light and near-visible light.

I35. The method of any of sections I1-I34, wherein spatiotemporally obtaining the set of encoded spatiotemporal patterns includes obtaining by a first camera and a second camera.

I36. The method of section I35, wherein the first camera is able to capture visible light and the second camera is able to capture near-visible light.

I37. The method of any of sections I8-I10, wherein decoding the set of encoded spatiotemporal patterns into the data includes decoding the code symbols into the data.

I38. The method of section I37, wherein decoding the code symbols into the data further includes decoding the code symbols into a bit stream and decoding the bit stream into the data.

I39. The method of any of sections I1-I38, further includes storing decoded data to a storage device.

I40. The method of section I2, wherein the first sending node is configured to obtain the set of encoded spatiotemporal patterns.

I41. The method of section I40, further including the first sending node to verify from obtained set of encoded spatiotemporal patterns that the data was displayed correctly.

I42. The method of section I41, wherein the first sending node is configured to resend the data if the data was displayed incorrectly.

J1. A method for encoding data in a datacenter comprising:

obtaining a first and a second set of data to be encoded;

encoding the first and the second set of data to a first and a second set of encoded spatiotemporal patterns; and outputting the first and the second set of encoded spatiotemporal patterns.

J2. The method of section J1, wherein the first and the second set of data is obtained from a first sending node.

J3. The method of section J2, wherein the first sending node includes at least one of a server, an application, a storage device, and a memory.

J4. The method of any of sections J1-J3, wherein the first set of data is obtained from a first sending node and the second set of data is obtained from a second sending node.

J5. The method of any of sections J1-J4, wherein at least one of the first and the second set of data is non-serialized data.

J6. The method of any of sections J1-J5, wherein encoding the first and the second set of data to the first and the second set of encoded spatiotemporal patterns includes encoding the first and the second set of data into code symbols.

J7. The method of section J6, wherein the code symbols are organized into the first and the second set of encoded spatiotemporal patterns.

J8. The method of any of sections J6 or J7, wherein encoding the first and the second set of data into code symbols further includes encoding the first and the second set of data into bit stream and encoding the bit stream into code symbols.

J9. The method of any of sections J1-J8, wherein the first and the second set of encoded spatiotemporal patterns includes at least two colors producible by visible light.

J10. The method of section J9, wherein the at least two colors are used for encoding at least one of the first and the second set of data.

J11. The method of section J9, wherein at least one of the at least two colors are used for providing header information.

J12. The method of section J11, wherein the header information indicates intended recipient for the data.

J13. The method of section J11, wherein the header information indicates level of priority for the data.

J14. The method of any of sections J6-J8, wherein at least one code symbol includes a different level of intensity than another code symbol.

J15. The method of section J14, wherein at least one level of intensity is used for providing header information.

J16. The method of section J15, wherein the header information indicates intended recipient for the data.

J17. The method of section J15, wherein the header information indicates level of priority for the data.

J18. The method of any of sections J1-J17, wherein at least one of the first and the second set of encoded spatiotemporal patterns includes a near-visible light.

J19. The method of section J18, wherein the near-visible light is one or more of an UV light and an IR light.

J20. The method of any of sections J18 or J19, wherein the near-visible light indicates intended recipient for the data.

J21. The method of any of sections J18 or J19, wherein the near-visible light indicates level of priority for the data.

J22. The method of any of sections J1-J21, wherein at least one of the first and the second set of encoded spatiotemporal patterns further includes at least one of a shape factor, a location factor, a size factor, and a timing factor.

J23. The method of section J22, wherein at least one of the shape factors, the location factor, the size factor, and the timing factor indicates intended recipient for the data.

J24. The method of any of sections J22 or J23, wherein at least one of the shape factors, a location factor, and a size factor indicates level of priority for the data.

J25. The method of any of sections J1-J24, wherein at least one of the first and the second set of encoded spatiotemporal patterns move in space relative to time.

J26. The method of section J25, wherein at least one of the first and the second set of encoded spatiotemporal patterns move in a predetermined pattern.

J27. The method of any of sections J1-J26, wherein outputting the first and the second set of encoded spatiotemporal patterns further includes outputting on a display.

J28. The method of any of sections J1-J26, wherein outputting the first and the second set of encoded spatiotemporal patterns further includes outputting by a projector on a screen.

J29. The method of section J27, wherein the display is at least one of a computer screen, and a TV monitor.

J30. The method of any of sections J1-J27 or J29, wherein outputting the first and the second set of encoded spatiotemporal patterns includes displaying on two or more displays.

J31. The method of section J30, wherein displaying on two or more displays further includes displaying the first set of encoded spatiotemporal patterns on a first display and displaying the second set of encoded spatiotemporal patterns on a second display.

J32. The method of any of sections J1-J31, wherein the first and the second set of encoded spatiotemporal patterns overlap at least partially.

K1. A method for decoding data in a datacenter comprising:

spatiotemporally obtaining a first and a second set of encoded spatiotemporal patterns;

decoding the first and the second set of encoded spatiotemporal patterns into a first and a second set of decoded data; and storing the first and the second set of decoded data.

K2. The method of section K1, wherein spatiotemporally obtaining the first and the second set of encoded spatiotemporal patterns includes obtaining from at least one of a display and a projector screen.

K3. The method of section K2, wherein the display is at least one of a computer screen and a TV monitor.

K4. The method of any of sections K1-K3, wherein spatiotemporally obtaining the first and the second set of encoded spatiotemporal patterns includes obtaining by at least one of a camera, a video camera, and an image sensor.

K5. The method of section K4, wherein at least one of the camera, the video camera and the image sensor is able to capture visible light and near-visible light.

K6. The method of any of sections K1-K5, wherein spatiotemporally obtaining the first and the second set of encoded spatiotemporal patterns includes obtaining by a first camera and a second camera.

K7. The method of section K6, wherein the first camera is able to capture visible light and the second camera is able to capture near-visible light.

K8. The method of any of sections K1-K7, wherein the first and the second set of decoded data is non-serialized data in a matrix form.

K9. The method of any of sections K1-K8, wherein the first and the second set of encoded spatiotemporal patterns includes code symbols.

K10. The method of section K9, wherein decoding the first and the second set of encoded spatiotemporal patterns into the first and the second set of decoded data includes decoding the code symbols into data.

K11. The method of section K10, wherein decoding the code symbols into data further includes decoding the code symbols into a bit stream and decoding the bit stream into data.

K12. The method of any of sections K1-K11, wherein the first and the second set of encoded spatiotemporal patterns includes at least two colors producible by visible light.

K13. The method of section K12, wherein at least two colors are used for decoding the data.

K14. The method of section K12, wherein at least one color is used for providing header information.

K15. The method of section K14, wherein the header information indicates intended recipient for the data.

K16. The method of section K14, wherein the header information indicates level of priority for the data.

K17. The method of any of sections K9-K11, wherein at least one code symbol includes a different level of intensity than another code symbol.

K18. The method of section K17, wherein at least one level of intensity is used for providing header information.

K19. The method of section K18, wherein the header information indicates intended recipient for the data.

K20. The method of section K18, wherein the header information indicates level of priority for the data.

K21. The method of any of sections K1-K20, wherein at least one of the first and the second set of encoded spatiotemporal patterns includes a near-visible light.

K22. The method of section K21, wherein the near-visible light is one or more of an UV light and an IR light.

K23. The method of any of sections K21 or K22, wherein the near-visible light indicates intended recipient for the data.

K24. The method of any of sections K21 or K22, wherein the near-visible light indicates level of priority for the data.

K25. The method of any of sections K1-K24, wherein at least one of the first and the second set of encoded spatiotemporal pattern further includes at least one of a shape factor, a location factor, a size factor, and a timing factor.

K26. The method of section K25, wherein at least one of the shape factors, the location factor, the size factor, and the timing factor indicates intended recipient for the data.

K27. The method of section K25, wherein at least one of the shape factors, the location factor, and the size factor indicates level of priority for the data.

K28. The method of any of sections K1-K27, wherein at least one of the first and the second set of encoded spatiotemporal patterns move in space relative to time.

K29. The method of section K28, wherein at least one of the first and the second set of encoded spatiotemporal patterns move in a predetermined pattern.

K30. The method of any of sections K1-K29, wherein storing the first and the second set of decoded data includes storing to a storage device.

L1. A method for transmitting data in a datacenter comprising:

encoding a first and a second set of data to a first and a second set of encoded spatiotemporal patterns;

displaying the first and the second set of encoded spatiotemporal patterns;

spatiotemporally obtaining the first and the second set of encoded spatiotemporal patterns; and decoding the first and the second set of encoded spatiotemporal patterns into the first and the second set of data.

L2. The method of section L1, further including obtaining the first and the second set of data from a first sending node.

L3. The method of section L2, wherein the first sending node includes at least one of a server, an application, a storage device, and a memory.

L4. The method of any of sections L1-L3, wherein the first set of data is obtained from a first sending node and the second set of data is obtained from a second sending node.

L5. The method of any of sections L1-L4, wherein at least one of the first and the second set of data is non-serialized data.

L6. The method of any of sections L1-L5, wherein encoding the first and the second set of data to a first and the second set of encoded spatiotemporal patterns includes encoding the first and the second set of data into code symbols.

L7. The method of section L6, wherein the code symbols are organized into encoded spatiotemporal patterns.

L8. The method of any of sections L6 or L7, wherein encoding the first and the second set of data into code symbols further includes encoding the first and the second set of data into bit stream and encoding the bit stream into code symbols.

L9. The method of any of sections L1-L8, wherein the first and the second set of encoded spatiotemporal patterns includes at least two colors producible by visible light.

L10. The method of section L9, wherein at least two of the colors are used for encoding the data.

L11. The method of section L9, wherein at least one of the colors are used for providing header information.

L12. The method of section L11, wherein the header information indicates intended recipient for the data.

L13. The method of section L11, wherein the header information indicates level of priority for the data.

L14. The method of any of sections L6-L8, wherein at least one code symbol includes a different level of intensity than another code symbol.

L15. The method of section L14, wherein at least one level of intensity is used for providing header information.

L16. The method of section L15, wherein the header information indicates intended recipient for the data.

L17. The method of section L15, wherein the header information indicates level of priority for the data.

L18. The method of any of sections L1-L17, wherein at least one of the first and the second set of encoded spatiotemporal patterns includes a near-visible light.

L19. The method of section L18, wherein the near-visible light is one or more of an UV light and an IR light.

L20. The method of any of sections L18 or L19, wherein the near-visible light indicates intended recipient for the data.

L21. The method of any of sections L18 or L19, wherein the near-visible light indicates level of priority for the data.

L22. The method of any of sections L1-L21, wherein at least one of the first and the second set of encoded spatiotemporal pattern further includes at least one of a shape factor, a location factor, a size factor, and a timing factor.

L23. The method of section L22, wherein at least one of the shape factors, the location factor, the size factor, and the timing factor indicates intended recipient for the data.

L24. The method of any of sections L22 or L23, wherein at least one of the shape factors, the location factor, and the size factor indicates level of priority for the data.

L25. The method of any of sections L1-L24, wherein at least one of the first and the second set of encoded spatiotemporal patterns move in space relative to time.

L26. The method of section L25, wherein at least one of the first and the second set of encoded spatiotemporal patterns move in a predetermined pattern.

L27. The method of any of sections L1-L26, wherein displaying the first and the second set of encoded spatiotemporal patterns includes displaying by a projector to a screen.

L28. The method of any of sections L1-L26, wherein displaying the first and the second set of encoded spatiotemporal patterns includes displaying by at least one of a computer screen, and a TV monitor.

L29. The method of any of sections L1-L28, wherein displaying the first and the second set of encoded spatiotemporal patterns includes displaying on two or more displays.

L30. The method of any of sections L1-L29, wherein displaying the first and the second set of encoded spatiotemporal patterns includes displaying the first set of encoded spatiotemporal pattern on a first display and displaying the second set of encoded spatiotemporal patterns on a second display.

L31. The method of any of sections L1-L30, wherein the first and the second set of encoded spatiotemporal patterns overlap at least partially.

L32. The method of any of sections L1-L31, wherein spatiotemporally obtaining the first and the second set of encoded spatiotemporal patterns includes obtaining by at least one of a camera, a video camera, and an image sensor.

L33. The method of section L32, wherein at least one of the camera, the video camera and the image sensor is able to capture visible light and near-visible light.

L34. The method of any of sections L1-31, wherein the spatiotemporally obtaining the first and the second set of encoded spatiotemporal patterns includes obtaining by a first camera and a second camera.

L35. The method of section L34, wherein the first camera is able to capture visible light and the second camera is able to capture near-visible light.

L36. The method of any of sections L6-L8, wherein decoding the first and the second set of encoded spatiotemporal patterns into the first and the second set of data includes decoding the code symbols into data.

L37. The method of section L36, wherein decoding the code symbols into data further includes decoding the code symbols into a bit stream and decoding the bit stream into data.

L38. The method of any of sections L1-L37, further includes storing the first and the second set of decoded data to a storage device.

L39. The method of section L2, wherein the first sending node is configured to obtain displayed first and the second set of encoded spatiotemporal patterns.

L40. The method of section L39, wherein the first sending node verifies from obtained displayed first and the second set of encoded spatiotemporal patterns that the first and the second set of data was outputted correctly.

L41. The method of section L40, wherein the first sending node is configured to resend the first or the second set of data if the data was displayed incorrectly.

M1. A datacenter computing system comprising:

a first node having a first display device configured to display a first spatiotemporal pattern;

a second node having a second display device configured to display a second spatiotemporal pattern;

a camera; and a means for selectively imaging one of the first spatiotemporal pattern and the second spatiotemporal pattern with the camera.

M2. The datacenter computing system of section M1, wherein the means for selectively imaging includes a wavelength filter.

M3. The datacenter computing system of section M2, wherein the wavelength filter is a band-stop filter.

M4. The datacenter computing system of section M2, wherein the wavelength filter is a band-pass filter.

M5. The datacenter computing system of section M2, wherein the wavelength filter is a cut filter.

M6. The datacenter computing system of any of sections M1-M5, wherein:

the first spatiotemporal pattern includes polarized light polarized at a first angle and the second spatiotemporal pattern includes polarized light polarized at a second angle, and the means for selectively imaging includes a polarization filter.

M7. The datacenter computing system of section M6, wherein the polarization filter is a rotatable polarization filter.

M8. The datacenter computing system of any of sections M1-M7, wherein the means for selectively imaging includes a lens with a focal length.

M9. The datacenter computing system of section M8, wherein the camera has a depth of field less than a difference of a first distance from the camera to the first spatiotemporal pattern and a second distance from the camera to the second spatiotemporal pattern.

M10. The datacenter computing system of any of sections M1-M9, wherein the means for selectively imaging includes a motorized mount to move a field of view of the camera relative to the first display device and the second display device.

M11. The datacenter computing system of any of sections M1-M10 further comprising a projection surface configured to receive the first spatiotemporal pattern and display the first spatiotemporal pattern in a field of view of the camera.

M12. The datacenter computing system of section M11, wherein the projection surface has a transparency based at least partially on an applied voltage.

M13. The datacenter computing system of section M11, wherein the projection surface is a partially mirrored surface.

M14. The datacenter computing system of any of sections M1-M13, wherein the means for selectively imaging includes a synchronization controller configured to instruct the camera to capture a frame of the first spatiotemporal pattern during a first exposure duration and readout the frame of the first spatiotemporal pattern during a second display duration of the second spatiotemporal pattern.

N1. A datacenter computing device including:

a display device configured to display a first spatiotemporal pattern with a first display duration and a second spatiotemporal pattern after the first spatiotemporal pattern with a second display duration;

a first camera;

a second camera; and a synchronization controller in data communication with the display device and with the first camera and second camera, wherein the synchronization controller is configured to:

instruct the first camera to capture the first spatiotemporal pattern during the first display duration, and instruct the second camera to capture the second spatiotemporal pattern during the second display duration.

N2. The datacenter computing system of section N1, wherein the first camera has a frame time greater than the first display duration.

N3. The datacenter computing system of section N1 or N2, wherein the first camera has an exposure duration less than half of the frame time.

N4. The datacenter computing system of any of sections N1 through N3, wherein:

the first spatiotemporal pattern is part of a first temporal data channel including a plurality of spatiotemporal patterns, the second spatiotemporal pattern is part of a second temporal data channel including a plurality of spatiotemporal patterns, and the first temporal data channel and second temporal data channel are interlaced on the display device.

O1. A datacenter computing system including:

an outer cylinder including:

a first plurality of processors, a first plurality of display devices, and a first plurality of cameras, an inner cylinder including:

a second plurality of display devices, and a second plurality of cameras.

O2. The datacenter computing system of section O1, wherein the inner cylinder further comprises a second plurality of processors.

O3. The datacenter computing system of section O1 or O2, wherein the inner cylinder is movable relative to the outer cylinder.

O4. The datacenter computing system of section O3, wherein the inner cylinder is rotatable relative to the outer cylinder.

O5. The datacenter computing system of section O3 or O4, wherein the inner cylinder is axially movable relative to the outer cylinder.

O6. The datacenter computing system of any of sections O1-O5, wherein the outer cylinder includes a liquid electrochemical generator.

O7. The datacenter computing system of any of sections O1-O6, wherein the inner cylinder includes a liquid electrochemical generator.

O8. The datacenter computing system of any of sections O1-O7, wherein the second plurality of cameras is configured to receive a spatiotemporal pattern from first plurality of display devices and display the spatiotemporal pattern to the first plurality of cameras using the second plurality of display devices.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A datacenter computing system comprising:

a first node having a first display device configured to display a first spatiotemporal pattern;

a second node having a second display device configured to display a second spatiotemporal pattern;

a camera; and a means for selectively imaging one of the first spatiotemporal pattern and the second spatiotemporal pattern with the camera, wherein the means for selectively imaging includes a synchronization controller configured to instruct the camera to capture a frame of the first spatiotemporal pattern during a first exposure duration and readout the frame of the first spatiotemporal pattern during a second display duration of the second spatiotemporal pattern.

2. The datacenter computing system of claim 1, wherein the means for selectively imaging includes a wavelength filter.

3. The datacenter computing system of claim 2, wherein the wavelength filter is a band-stop filter.

4. The datacenter computing system of claim 2, wherein the wavelength filter is a band-pass filter.

5. The datacenter computing system of claim 2, wherein the wavelength filter is a cut filter.

6. The datacenter computing system of claim 1, wherein:

the first spatiotemporal pattern includes polarized light polarized at a first angle and the second spatiotemporal pattern includes polarized light polarized at a second angle, and the means for selectively imaging includes a polarization filter.

7. The datacenter computing system of claim 6, wherein the polarization filter is a rotatable polarization filter.

8. The datacenter computing system of claim 1, wherein the means for selectively imaging includes a lens with a focal length.

9. The datacenter computing system of claim 8, wherein the camera has a depth of field less than a difference of a first distance from the camera to the first spatiotemporal pattern and a second distance from the camera to the second spatiotemporal pattern.

10. The datacenter computing system of claim 1, wherein the means for selectively imaging includes a motorized mount to move a field of view of the camera relative to the first display device and the second display device.

11. The datacenter computing system of claim 1 further comprising a projection surface configured to receive the first spatiotemporal pattern and display the first spatiotemporal pattern in a field of view of the camera.

12. The datacenter computing system of claim 11, wherein the projection surface has a transparency based at least partially on an applied voltage.

13. The datacenter computing system of claim 11, wherein the projection surface is a partially mirrored surface.

14. A datacenter computing system comprising:

a display device configured to display a first spatiotemporal pattern with a first display duration and a second spatiotemporal pattern after the first spatiotemporal pattern with a second display duration;

a first camera;

a second camera; and a synchronization controller in data communication with the display device and with the first camera and second camera, wherein the synchronization controller is configured to:

instruct the first camera to capture the first spatiotemporal pattern during the first display duration, and instruct the second camera to capture the second spatiotemporal pattern during the second display duration.

15. The datacenter computing system of claim 14, wherein the first camera has a frame time greater than the first display duration.

16. The datacenter computing system of claim 15, wherein the first camera has an exposure duration less than half of the frame time.

17. The datacenter computing system of claim 14, wherein:

the first spatiotemporal pattern is part of a first temporal data channel including a plurality of spatiotemporal patterns, the second spatiotemporal pattern is part of a second temporal data channel including a plurality of spatiotemporal patterns, and the first temporal data channel and second temporal data channel are interlaced on the display device.

18. A datacenter computing system comprising:

an outer cylinder including:

a first plurality of processors, a first plurality of display devices, and a first plurality of cameras; and an inner cylinder including:

a second plurality of display devices, and a second plurality of cameras.

19. The datacenter computing system of claim 18, wherein the second plurality of cameras is configured to receive a spatiotemporal pattern from first plurality of display devices and display the spatiotemporal pattern to the first plurality of cameras using the second plurality of display devices.

20. The datacenter computing system of claim 18, wherein the inner cylinder further comprises a second plurality of processors.

21. The datacenter computing system of claim 18, wherein the inner cylinder is movable relative to the outer cylinder.

22. The datacenter computing system of claim 21, wherein the inner cylinder is rotatable relative to the outer cylinder.

23. The datacenter computing system of claim 21, wherein the inner cylinder is axially movable relative to the outer cylinder.

24. The datacenter computing system of claim 18, wherein the outer cylinder includes a liquid electrochemical generator.

25. The datacenter computing system of claim 18, wherein the inner cylinder includes a liquid electrochemical generator.

* * * * *